(12) United States Patent
Perry et al.

(10) Patent No.: US 11,710,196 B2
(45) Date of Patent: Jul. 25, 2023

(54) INFORMATION TRANSLATION IN AN ONLINE AGRICULTURAL SYSTEM

(71) Applicant: Indigo Ag, Inc., Boston, MA (US)

(72) Inventors: David Patrick Perry, Memphis, TN (US); Barry Loyd Knight, Cordova, TN (US); Eric Michael Jeck, San Mateo, CA (US); Rachel Ariel Raymond, Memphis, TN (US); Neal Hitesh Rajdev, Lincoln, MA (US); Geoffrey Albert von Maltzahn, Boston, MA (US); Robert Berendes, Riehen (CH); Nathan Post, Cambridge, MA (US); Philip Gabriel Sheets-Poling, Arlington, MA (US); Rodney Connor, Dwight, IL (US); Jonathan Hennek, Medford, MA (US)

(73) Assignee: INDIGO AG, INC., Boston, MA (US)

(*) Notice: Subject to any disclaimer, the term of this patent is extended or adjusted under 35 U.S.C. 154(b) by 59 days.

(21) Appl. No.: 16/393,329

(22) Filed: Apr. 24, 2019

(65) Prior Publication Data
US 2019/0325492 A1 Oct. 24, 2019

Related U.S. Application Data

(60) Provisional application No. 62/662,209, filed on Apr. 24, 2018, provisional application No. 62/668,247, (Continued)

(51) Int. Cl.
*G06Q 50/02* (2012.01)
*G06Q 10/0631* (2023.01)
(Continued)

(52) U.S. Cl.
CPC ............. *G06Q 50/02* (2013.01); *G01W 1/10* (2013.01); *G05D 1/0214* (2013.01);
(Continued)

(58) Field of Classification Search
CPC ........ G06Q 10/00; G06Q 10/06; G06Q 30/02; G06Q 30/0283; G06Q 30/06;
(Continued)

(56) References Cited

U.S. PATENT DOCUMENTS 4,674,044 A 6/1987 Kalmus et al.
4,677,552 A 6/1987 Sibley, Jr.
(Continued)

FOREIGN PATENT DOCUMENTS

EP 1389767 2/2004
EP 3046066 A1 7/2016
(Continued)

OTHER PUBLICATIONS

Meymandpour et al., The impacts of Electronic Marketplaces in globalization age Examples from agricultural web portals, Aug. 1, 2009, 2009 2nd IEEE International conference on Computer Science and information Technology, pp. 109-113 (Year: 2009).*
(Continued)

Primary Examiner — Robert D Rines
(74) Attorney, Agent, or Firm — Fenwick & West LLP

(57) ABSTRACT

An online agricultural system manages and optimizes interactions of entities within the system to enable the execution of transaction and the transportation of crop products. The online agricultural system accesses historic and environmental data describing factors that may impact crop product transactions and/or transportation to determine market prices for crop products and crop product transportation. Responsive to receiving a request from an entity, the online agricultural system determines an optimal transaction for the
(Continued)

entity, such as a price for selling a crop product, an available crop product for purchase, or a transportation opportunity to transport a crop product.

23 Claims, 24 Drawing Sheets

Related U.S. Application Data filed on May 7, 2018, provisional application No. 62/703,846, filed on Jul. 26, 2018.

(51) Int. Cl.

| | | |
|---|---|---|
| *G06Q 30/0202* | (2023.01) | |
| *G06F 3/0482* | (2013.01) | |
| *G06Q 10/087* | (2023.01) | |
| *G06Q 30/0601* | (2023.01) | |
| *G01W 1/10* | (2006.01) | |
| *G06Q 10/0832* | (2023.01) | |
| *G06Q 10/0833* | (2023.01) | |
| *G06Q 10/0835* | (2023.01) | |
| *G08G 1/0968* | (2006.01) | |
| *G06Q 10/0834* | (2023.01) | |
| *G06Q 10/0836* | (2023.01) | |
| *G06Q 30/0201* | (2023.01) | |
| *G06N 20/00* | (2019.01) | |
| *G06F 9/451* | (2018.01) | |
| *G06Q 30/0283* | (2023.01) | |
| *G06Q 40/04* | (2012.01) | |
| *G06V 20/10* | (2022.01) | |
| *G05D 1/02* | (2020.01) | |
| *G06Q 50/30* | (2012.01) | |
| *G16Y 10/05* | (2020.01) | |

(52) U.S. Cl.
CPC ............ *G06F 3/0482* (2013.01); *G06F 9/451* (2018.02); *G06N 20/00* (2019.01); *G06Q 10/06315* (2013.01); *G06Q 10/087* (2013.01); *G06Q 10/0832* (2013.01); *G06Q 10/0833* (2013.01); *G06Q 10/0836* (2013.01); *G06Q 10/08345* (2013.01); *G06Q 10/08355* (2013.01); *G06Q 30/0202* (2013.01); *G06Q 30/0206* (2013.01); *G06Q 30/0283* (2013.01); *G06Q 30/0605* (2013.01); *G06Q 30/0641* (2013.01); *G06Q 40/04* (2013.01); *G06V 20/188* (2022.01); *G08G 1/096805* (2013.01); *G06Q 50/30* (2013.01); *G16Y 10/05* (2020.01)

(58) Field of Classification Search
CPC .. G06Q 30/0202; G06Q 40/025; G06Q 50/02; G06T 7/11; G06T 2207/10032

See application file for complete search history.

(56) References Cited

U.S. PATENT DOCUMENTS

| | | |
|---|---|---|
| 4,903,201 A | 2/1990 | Wagner et al. |
| 5,063,507 A | 11/1991 | Lindsey et al. |
| 5,077,665 A | 12/1991 | Silverman et al. |
| 5,136,501 A | 8/1992 | Silverman et al. |
| 5,285,383 A | 2/1994 | Lindsey et al. |
| 5,297,031 A | 3/1994 | Gutterman et al. |
| 5,706,442 A | 1/1998 | Anderson et al. |
| 5,715,402 A | 2/1998 | Popolo |
| 5,727,165 A | 3/1998 | Ordish et al. |
| 5,732,400 A | 3/1998 | Mandler et al. |
| 5,775,734 A | 7/1998 | George, Jr. |
| 5,787,156 A | 7/1998 | Katz |
| 5,794,207 A | 8/1998 | Walker et al. |
| 5,845,266 A | 12/1998 | Lupien et al. |
| 5,873,071 A | 2/1999 | Ferstenberg et al. |
| 5,884,286 A | 3/1999 | Daughtery, III |
| 5,924,082 A | 7/1999 | Silverman et al. |
| 5,930,767 A | 7/1999 | Reber et al. |
| 5,960,411 A | 9/1999 | Hartman et al. |
| 5,970,479 A | 10/1999 | Shepherd |
| 6,104,643 A | 1/2000 | Minton |
| 6,058,379 A | 5/2000 | Odom et al. |
| 6,131,087 A | 10/2000 | Luke et al. |
| 6,134,535 A | 10/2000 | Belzberg |
| 6,242,474 B1 | 8/2001 | Garcia |
| 6,317,728 B1 | 11/2001 | Kane |
| 6,338,050 B1 | 1/2002 | Conklin et al. |
| 6,390,472 B1 | 5/2002 | Vinarsky |
| 6,393,406 B1 | 5/2002 | Eder |
| 6,401,041 B1 | 5/2002 | Peterson |
| 6,418,419 B1 | 7/2002 | Nieboer et al. |
| 6,422,508 B1 | 7/2002 | Barnes |
| 6,584,451 B1 | 6/2003 | Shoham et al. |
| 6,598,027 B1 | 7/2003 | Breen et al. |
| 6,622,129 B1 | 9/2003 | Whitworth |
| 6,673,479 B2 | 1/2004 | McArthur et al. |
| 6,865,582 B2 | 3/2005 | Obradovic et al. |
| 6,988,083 B2 | 1/2006 | Dines et al. |
| 7,076,452 B2 | 7/2006 | Florence et al. |
| 7,080,034 B1 | 7/2006 | Reams |
| 7,318,045 B2 | 1/2008 | Baecker et al. |
| 7,349,879 B2 | 3/2008 | Alsberg et al. |
| 7,418,423 B2 | 8/2008 | Reding et al. |
| 7,742,979 B2 | 6/2010 | Reding et al. |
| 8,019,694 B2 | 9/2011 | Fell et al. |
| 8,965,812 B2 | 2/2015 | Linville |
| 9,113,590 B2 | 8/2015 | Johnson |
| 9,381,646 B1 | 7/2016 | Fryshman |
| 9,489,576 B2 | 11/2016 | Johnson et al. |
| 9,519,861 B1 | 12/2016 | Gates et al. |
| 9,563,945 B2 | 2/2017 | Fryshman |
| 9,582,002 B2 | 2/2017 | Cavender-Bares |
| 9,582,873 B2 | 2/2017 | Ulman |
| 9,629,306 B2 | 4/2017 | Sauder et al. |
| 9,658,201 B2 | 5/2017 | Redden et al. |
| 9,745,060 B2 | 8/2017 | O'Connor et al. |
| 9,756,844 B2 | 9/2017 | Groeneveld |
| 9,974,226 B2 | 5/2018 | Rupp et al. |
| RE46,968 E * | 7/2018 | Linville ................ G01C 21/20 |
| RE47,742 E | 11/2019 | Linville |
| 10,564,316 B2 | 2/2020 | Xu et al. |
| 11,069,005 B2 * | 7/2021 | Ethington ........ G06Q 10/06375 |
| 11,100,579 B1 | 8/2021 | Raguse et al. |
| 11,263,707 B2 | 3/2022 | Perry et al. |
| 2001/0032162 A1 | 10/2001 | Alsberg et al. |
| 2001/0032165 A1 | 10/2001 | Friend et al. |
| 2001/0034663 A1 | 10/2001 | Teveler et al. |
| 2002/0025330 A1 | 1/2002 | May |
| 2002/0023038 A1 | 2/2002 | Fritsch et al. |
| 2002/0023039 A1 | 2/2002 | Fritsch et al. |
| 2002/0032644 A1 | 3/2002 | Corby et al. |
| 2002/0059091 A1 | 5/2002 | Hay et al. |
| 2002/0065765 A1 | 5/2002 | Shuler et al. |
| 2002/0087453 A1 | 7/2002 | Nicolaisen et al. |
| 2002/0095369 A1 | 7/2002 | Kaplan et al. |
| 2002/0120555 A1 | 8/2002 | Lerner |
| 2002/0138393 A1 | 9/2002 | Tatge |
| 2002/0147670 A1 | 10/2002 | Lange |
| 2002/0183867 A1 | 12/2002 | Gupta et al. |
| 2002/0184135 A1 | 12/2002 | Zakaria |
| 2002/0194115 A1 | 12/2002 | Nordicht et al. |
| 2003/0019408 A1 | 1/2003 | Fraisse et al. |
| 2003/0050901 A1 | 3/2003 | Jester et al. |
| 2003/0084791 A1 | 5/2003 | Trenhaile et al. |
| 2003/0195822 A1 | 10/2003 | Tatge |
| 2003/0236738 A1 | 12/2003 | Lange et al. |
| 2004/0024648 A1 | 2/2004 | Tatge |
| 2005/0114252 A1 | 5/2005 | Beurskens |
| 2005/0137964 A1 | 6/2005 | Nordlicht et al. |
| 2005/0234691 A1 | 10/2005 | Singh et al. |
| 2006/0111845 A1 | 5/2006 | Forbis et al. |

(56) References Cited

U.S. PATENT DOCUMENTS

| | | |
|---|---|---|
| 2006/0259417 A1 | 11/2006 | Marynowski et al. |
| 2006/0271262 A1 | 11/2006 | McLain |
| 2008/0033864 A1 | 2/2008 | McDonough |
| 2008/0215167 A1 | 9/2008 | Beck |
| 2008/0313013 A1* | 12/2008 | Fell .................... G06Q 30/02 |
| | | 705/400 |
| 2010/0106653 A1 | 4/2010 | Sandholm et al. |
| 2010/0114753 A1 | 5/2010 | Osmanski et al. |
| 2010/0332430 A1 | 12/2010 | Caraviello et al. |
| 2011/0208636 A1* | 8/2011 | Bachu .................... G06Q 40/04 |
| | | 705/37 |
| 2011/0290873 A1 | 12/2011 | Nishiguchi et al. |
| 2012/0116943 A1 | 5/2012 | Abramson |
| 2012/0246050 A1* | 9/2012 | McNew ................ G06Q 40/00 |
| | | 705/37 |
| 2013/0197814 A1 | 8/2013 | McBratney et al. |
| 2013/0332205 A1 | 12/2013 | Friedberg et al. |
| 2014/0039967 A1 | 2/2014 | Scharf et al. |
| 2014/0095261 A1 | 4/2014 | Johnson |
| 2014/0222374 A1 | 8/2014 | Lock et al. |
| 2014/0263822 A1 | 9/2014 | Malveaux |
| 2015/0371324 A1 | 12/2015 | Kumar |
| 2016/0050840 A1 | 2/2016 | Sauder et al. |
| 2016/0071410 A1 | 3/2016 | Rupp et al. |
| 2016/0073573 A1 | 3/2016 | Ethington et al. |
| 2016/0157414 A1 | 6/2016 | Ackerman et al. |
| 2016/0179994 A1 | 6/2016 | Levine et al. |
| 2016/0216245 A1 | 7/2016 | Sutton |
| 2016/0232621 A1 | 8/2016 | Ethington et al. |
| 2016/0302351 A1 | 10/2016 | Schildroth et al. |
| 2016/0309646 A1 | 10/2016 | Starr et al. |
| 2016/0350855 A1 | 12/2016 | Lerner |
| 2017/0083747 A1 | 3/2017 | Guan et al. |
| 2017/0089761 A1 | 3/2017 | McQuilkin et al. |
| 2017/0090068 A1 | 3/2017 | Xiang et al. |
| 2017/0105335 A1 | 4/2017 | Xu et al. |
| 2017/0109395 A1 | 4/2017 | Farah |
| 2017/0112043 A1 | 4/2017 | Nair et al. |
| 2017/0124463 A1 | 5/2017 | Chen et al. |
| 2017/0161627 A1 | 6/2017 | Xu et al. |
| 2017/0168157 A1 | 6/2017 | Hagerman et al. |
| 2017/0169523 A1 | 6/2017 | Xu et al. |
| 2017/0177938 A1 | 6/2017 | Papanikolopoulos et al. |
| 2017/0196171 A1 | 7/2017 | Xu et al. |
| 2017/0199528 A1 | 7/2017 | Detweiler et al. |
| 2017/0206415 A1 | 7/2017 | Redden |
| 2017/0213141 A1 | 7/2017 | Xu et al. |
| 2017/0228475 A1 | 8/2017 | Aldor-Noiman et al. |
| 2017/0231213 A1 | 8/2017 | Gordon et al. |
| 2017/0258005 A1 | 9/2017 | Cutter |
| 2017/0270446 A1 | 9/2017 | Starr et al. |
| 2018/0060771 A1 | 3/2018 | Mangin |
| 2018/0070527 A1 | 3/2018 | Richt |
| 2018/0075545 A1 | 3/2018 | Richt |
| 2018/0075546 A1 | 3/2018 | Richt |
| 2018/0181893 A1 | 6/2018 | Basso |
| 2018/0189954 A1 | 7/2018 | Albrecht et al. |
| 2018/0322426 A1 | 11/2018 | Schmaltz et al. |
| 2018/0342020 A1 | 11/2018 | Sen et al. |
| 2018/0349520 A1 | 12/2018 | Bhalla et al. |
| 2018/0373932 A1 | 12/2018 | Albrecht et al. |
| 2019/0050741 A1 | 2/2019 | Mewes et al. |
| 2019/0050948 A1 | 2/2019 | Perry et al. |
| 2019/0147094 A1 | 5/2019 | Zhan et al. |
| 2019/0156255 A1 | 5/2019 | Carroll et al. |
| 2019/0228224 A1 | 7/2019 | Guo et al. |
| 2020/0125929 A1 | 4/2020 | Guo et al. |
| 2020/0128769 A1 | 4/2020 | Gillberg et al. |
| 2020/0196535 A1 | 6/2020 | Dagondon et al. |
| 2020/0311828 A1 | 10/2020 | Schäfer |
| 2022/0207608 A1 | 6/2022 | Raguse et al. |

FOREIGN PATENT DOCUMENTS

| | | |
|---|---|---|
| JP | 411232354 A | 8/1999 |
| JP | 2017-169511 A | 9/2017 |
| WO | WO 2001/046774 A1 | 6/2001 |
| WO | WO 0157752 A1 | 8/2001 |
| WO | WO 2013/148290 A1 | 10/2013 |

OTHER PUBLICATIONS

Lemos, M. F., "Using GIS to Predict Corn Yields in Colombia," University of Redlands Thesis, May 2008, pp. 1-83, [Online] [Retrieved on Apr. 6, 2020] Retrieved from the Internet <URL: https://inspire.redlands.edu/gis_gradproj/177>.

United States Office Action, U.S. Appl. No. 16/057,387, dated Apr. 3, 2020, 29 pages.

United States Office Action, U.S. Appl. No. 16/455,325, dated Apr. 2, 2020, nine pages.

Dowell, F.E. et al., "Predicting Wheat Quality Characteristics and Functionality Using Near-Infrared Spectroscopy," Cereal Chemistry, vol. 83, Iss. 5, Sep. 2006, pp. 529-536.

Wang, A.X. et al., "Deep Transfer Learning for Crop Yield Prediction with Remote Sensing Data," Proceedings of the 1st ACM SIGCAS Conference on Computing and Sustainable Societies, vol. 50, Jun. 2018, pp. 1-5.

Wang, Z.J. et al., "Prediction of grain protein content in winter wheat (*Triticum aestivum* L.) using plant pigment ratio (PPR)," Field Crops Research, vol. 90, Dec. 2004, pp. 311-321.

"Agricultural Futures and Options: Principles and Strategies" by Wayne D. Purcell and Stephen R. Koontz, Second Edition, 1999, 80 pages.

"Constant or Time Varying Hedge Ratios", by Giancarlo Moschini and Satheesh Aradhyula, Proceedings of the NCR-134 Conference on Applied Commodity Price Analysis, Forecasting and Market Risk Management, 1993, 17 pages.

"Did Producer Hedging Opportunities in the Live Hog Market Decline", by Fabio C. Zanini and Philip Garcia, published in the Proceedings of the NCR-134 Conference on Applied Commodity Price Analysis Forecasting and Market Risk, Chicago, Ill. 1997, 17 pages.

"Electronic Trading of Agricultural Products", paper delivered Jul. 8, 1980 to Commonwealth Club, San Francisco, published by United States Department of Agriculture, Agricultural Marketing Service, Jan. 1981, 21 pages.

"Grain Price Hedging Basics", dated Oct. 1995, 3 pages.

"Hedge Ratio Estimation and Soybean Storage" by Michael D. Patterson, Marvin L. Hayenga and Sergio Lenee, Proceedings of the NCR-134 Conference on Applied Commodity Price Analysis and Market Risk, Chicago, Ill 1994, 15 pages.

"Simultaneously Derived Optimal Hedge Ratios for East Central Illinois Corn and Soybean Producers", by Janathna M. Norvell and Raymond M. Leuthold, published in the Proceedings of the NCR-134 Conference on Applied Commodity Price Analysis Forecasting and Market Risk, Chicago, Ill. 1992, 16 pages.

A Guide to Energy Hedging, New York Mercantile Exchange, 1999, 66 pages.

Adam, B.D. et al., "Storage Hedging: What's a Merchandiser to do? " Proceedings of the NCR-134 Conference on Applied Commodity Price Analysis, Forecasting, and Market Management, 1992, pp. 394-406.

Blank. S.C., "Research on futures markets: Issues, approaches, and empirical findings," Western Journal of Agricultural Economics, 1989, vol. 14, No. 1, pp. 126-139.

Commodity Trading Manual, published by Chicago Board of Trade, copyright 1998, 170 pages.

Crawford, P., "The New High-Tech Investing: Computer as Fund Manager," The International Herald Tribune, Feb. 1, 1992, 4 pages.

Daniels Trading Glossary, 2 pages.

Ethridge, D.E., "A Computerized Remote-Access Commodity Market: Telcot," Journal of Agricultural and Applied Economics, 1978, vol. 10, No. 2, pp. 177-182.

(56) References Cited

OTHER PUBLICATIONS

Gambling in Futures, published by New York Times, Jan. 9, 1910, 1 page.
Hayenga, M.L. et al., "Formula pricing in five commodity marketing systems," American Journal of Agricultural Economics, 1980, vol. 62, No. 4, pp. 753-759.
Here is How Trading Stocks by Computer Works, by Gregg Fields, Miami Herald, Oct. 25, 1987, 2 pages.
Ins and Outs of Program Trading, article published by the Los Angeles Times, published Dec. 6, 1987, 5 pages.
Kastens, T.L. et al., "Post-harvest grain storing and hedging with efficient futures," Journal of Agricultural and Resource Economics, 1999, pp. 482-505.
North Carolina Soybean and Corn Prices with Basis 1980-2003, 26 pages.
Preliminary Amendment, U.S. Appl. No. 10/870,112, filed Feb. 6, 2008, 20 pages.
Second Preliminary Amendment, U.S. Appl. No. 10/870,112, filed Mar. 21, 2008, 12 pages.
Strobl, M. et al., "An Examination of the Spatial and Intertemporal Aspects of Basis Determination," NCR-134 Conference on Applied Price Analysis, 1992, 31 pages.
TELCOT User's Manual for Buyers, published by Plains Cotton Cooperative Association, 1985, 172 pages.
The World Book Encyclopedia, pp. 873-874, published by World Book Corp, copyright 1994.
United States Notice of Allowance, U.S. Appl. No. 10/870,112, dated Apr. 25, 2008, 8 pages.
U.S. Appl. No. 60/241,543, filed Oct. 18, 2000, Inventor Reding, G. et al.
Webster's New Collegiate Dictionary, 1990, p. 265.
Why Trade Ag Products on Project A, published by Chicago Board of Trade, 1994, 5 pages.
www.foodmarketexchange.com, dated Jun. 20, 2000, 7 pages.
www.usafutures.com, dated Jan. 25, 1999, 12 pages.
Bolton, D.K et al., "Forecasting crop yield using remotely sensed vegetation indices and crop phenology metrics," Agricultural and Forest Meteorology, vol. 173, May 2013, pp. 74-84.
Einstein-Curtis, A., "Online grain marketplace launches grain testing service," Feednavigator.com, Oct. 20, 2017, two pages, [Online] [Retrieved on Jun. 1, 2020] Retrieved from the Internet <URL: https://www.feednavigator.com/Article/2017/10/20/Online-grain-marketplace-launches-grain-testing-service>.
Diepeveen, D. et al., "Identifying key crop performance traits using data mining," World Conference on Agricultural Information and IT, Aug. 2008, pp. 1-6.
Gan, Y. et al., "Improving Farming Practices Reduces the Carbon Footprint of Spring Wheat Production," Nature Communications, vol. 5, Article No. 5012, Nov. 18, 2014, pp. 1-13.
U.S. Appl. No. 62/653,480, filed Apr. 5, 2018, Inventor Dagondon, S.D. et al.
PCT International Search Report and Written Opinion, PCT Application No. PCT/US2021/064200, dated Jun. 14, 2022, 20 pages.

\* cited by examiner

INFORMATION TRANSLATION IN AN ONLINE AGRICULTURAL SYSTEM

CROSS-REFERENCE TO RELATED APPLICATIONS

This application claims the benefit of U.S. Provisional Application No. 62/662,209, filed Apr. 24, 2018, U.S. Provisional Application No. 62/668,247, filed May 7, 2018, and U.S. Provisional Application No. 62/703,846, filed Jul. 26, 2018, which are incorporated by reference in its entirety. This application also incorporates U.S. application Ser. No. 16/057,387, filed Aug. 7, 2018 by reference in its entirety.

TECHNICAL FIELD

This specification relates generally to the management and optimization of interactions in an online agricultural system, and specifically to the management of transactions of and the transportation of crop products.

BACKGROUND

Various geographic, environmental, and financial factors may affect the exchange and transport of crop products. For example, current market prices for crop products may depend on a number of factors including a current supply and demand, a future predicted supply and demand, qualities of the crop products, transportation costs and requirements for the crop products, and the like. Similarly, transportation costs for crop products may depend on a number of factors including traffic conditions, distance traveled, equipment requirements, expected wait times, and the like. The quantity of information associated with these factors is so large as to limit the amount of information that can be utilized by crop producers, prospective acquiring entities, and transportation entities when making decisions for crop product transactions and transportation arrangements. Accordingly, crop producers, prospective acquiring entities, and transportation entities often make decisions based on an incomplete set of information or an imperfect analysis of available information, which may lead to suboptimal transactions or transportation arrangements.

In the current agricultural marketing system crop products change hands multiple times throughout the supply chain, resulting in opaque pricing and valuation at each transfer. In many agricultural markets, the number of suppliers far exceeds the number of buyers, giving a disproportionate bargaining advantage to buyers. This, coupled with market uncertainty, for example attributable to unknown credit worthiness and unverified quality of the good transacted, creates inefficient markets. Additionally, the dearth of accessible and verified data regarding the valuation and effectiveness of sustainable production practices makes it hard to meet consumer demands for these attributes. The quality and identity of goods is often compromised through the current transportation and storage infrastructure.

The transportation of agricultural goods is inefficient due to non-optimal utilization of transportation assets, difficulty in locating transportation opportunities and transportation providers, one direction shipments, inaccurate reporting of delivered quantities and qualities, and cheating opportunities due to lack of transparency at delivery.

Aspects of the present invention reduce the costs of transactions between unknown parties by providing a trusted party who independently verifies product quality and/or payment and communicates the trustworthiness of one or more market participants or transportation providers based on their transaction history. Aspects of the present invention provide a means for crop producers to collectively meet demand opportunities of prospective acquiring entities that could not be wholly satisfied out of their individual inventories.

SUMMARY

In one embodiment, an online agricultural system receives, from a first crop producer, a first request to list a first crop product within an online agricultural system. The first request identifies at least one of: a crop product type, a first quantity of the crop product, a first crop product price, and a first location of the crop product. The online agricultural system receives, from a first prospective acquiring entity, a second request to acquire a second crop product, the second request identifying at least the crop product type, a second quantity of the crop product, a second crop product price, and a second location to which the crop product is to be delivered. The online agricultural system monitors, by a server in real-time, a third price associated with transferring possession of a third quantity of the crop product from the first crop producer to the first prospective acquiring entity. The third price is determined based at least in part on the first location and the second location. The third quantity is equal to or less than the first quantity and equal to or less than the second quantity. In response to a sum of the first price and the monitored third price being equal to or less than the second price, the online agricultural system automatically executes a first contract and a second contract. The first contract is executed between the online agricultural system and the first crop producer to purchase the third quantity of the crop product from the crop producer. The second contract is executed between the online agricultural system and the first prospective acquiring entity to sell the third quantity of the crop product to the first prospective acquiring entity. In some embodiments, a quality specification of a first crop product and a quality specification of a second crop product individually do not satisfy a quality requirement requested by a potential acquisition entity. However, in embodiments where a combination of the first crop product and the second crop product does satisfy the quality requirement, contracts can be automatically executed between crop producers associated with the first crop product and the second crop product and the online agricultural system, and an additional contract can be automatically executed between the online agricultural system and the potential acquisition entity.

In another embodiment, an online agricultural system receives, from a first crop producer, a request to list a crop product within the online agricultural system. The first request identifies a type of the crop product, a first quantity of the crop product, and a location of the crop product. The online agricultural system accesses current crop product information. The current crop product information comprises a current available quantity and current price of the type of the crop product associated with the location of the crop product within the online agricultural system and current satellite data representative of the location of the crop product. The online agricultural system accesses historic crop product information. The historic crop product information comprises historic quantities and historic prices of the type of the crop product associated with the location of the crop product within the agricultural system and historic satellite data representative of the location of the crop product. The online agricultural system trains a price model for the crop product using the accessed current crop information and the accessed historic crop information. The online agricultural system predicts a future price of the type of the crop product using the price model. The online agricultural system presents, within an interface of the online agricultural system displayed by a client device of the crop producer, the predicted future price of the type of the crop product.

In another embodiment, the online agricultural system receives, from one or more crop producers, a corresponding first request to list a crop product within the online agricultural system. Each first request identifies a first type of the crop product, a first quantity of the crop product, a first location of the crop product, and a first price of the crop product. The online agricultural system receives, from one or more prospective acquiring entities, a corresponding second request to acquire a crop product within the online agricultural system. Each second request identifies a second type of the crop product, a second quantity of the crop product, a second location to which the crop product is to be delivered, and a second price of the crop product. The online agricultural system computes, for each combination of a first request and a second request, a first translated price, wherein the first translated price is a price for the crop product identified by the first request at the second location identified by the second request. The online agricultural system computes, for each combination of a first request and a second request, a second translated price, wherein the second translated price is a price for the crop product identified by the second request at the first location identified by the first request. The online agricultural system modifies a first interface displayed by a first client device of a first crop producer of the one or more crop producers to include a set of the second translated prices corresponding to the first location identified by the first request corresponding to the first crop producer. The online agricultural system modifies a second interface displayed by a second client device of a first prospective acquiring entity of the one or more prospective acquiring entities to include a set of the first translated prices corresponding to the second location identified by the second request corresponding to the first prospective acquiring entity. It should be noted that in other embodiments, prices can be translated based on a set of quality metrics associated with a crop product listed by a crop producer, based on a set of quality metrics associated with a requested crop product listed by a potential acquisition entity, based on crop processing costs, based on crop storage costs, or based on any other cost associated with an interaction between the crop producer and the potential acquisition entity.

In another embodiment, an online agricultural system accesses an interaction within the online agricultural system between a crop producer and an acquiring entity. The interaction is associated with a crop product listing identifying a crop product type, a crop product quantity, a crop product pick-up location, and a crop product destination location. The online agricultural system identifies, in real-time, a set of transportation entities each able to transport the crop product from the crop product pick-up location to the crop product destination location. The identification is performed based at least in part on: a distance between the transportation entity and the crop product pick-up location, a distance between the crop product pick-up location and the crop product destination location, environmental factors associated with transporting the crop product, and equipment requirements associated with transporting the crop product. The online agricultural system modifies, for each of one or more of the set of transportation entities, for a crop producer, or for a prospective acquiring entity, an interface displayed by a client device to include a transportation price. The transportation price is computed based at least in part on: the distance between the crop product pick-up location and the crop product destination location, and the environmental factors associated with transporting the crop product. The listing interface is configured to, in response to a selection of the transportation price, automatically execute a contract with a corresponding transportation entity to pick up the crop product at the crop product pick-up location and to transport the crop product to the crop product destination location in exchange for compensation based on the transportation price.

In another embodiment, the online agricultural system identifies, for a crop product transaction within an online agricultural system, a pick-up location of a crop product, a destination location of a crop product, a pick-up window, a delivery window, a type of crop product, and a quantity of crop product. The online agricultural system accesses environmental information describing a set of expected environmental conditions during the transportation of the crop product from the pick-up location to the destination location. The online agricultural system accesses historic information describing previous transportation availability and prices associated with the pick-up location and the destination location. The online agricultural system computes a transportation price corresponding to each of a set of one or more transportation entities over one or more transportation routes between the pick-up location and the destination location. Each transportation entity is able to pick up the crop product at the pick-up location during the pick-up window and to deliver the crop product to the destination location during the delivery window. Each transportation price is computed based on the crop product type, the crop quantity, the accessed environmental information, and the accessed historic information. The online agricultural system modifies, for each of the set of one or more transportation entities, an interface displayed by a client device of the transportation entity to include a lowest computed transportation price corresponding to any of the set of one or more transportation entities and to identify the transportation route associated with the lowest transportation price. The interface is configured to, in response to an input from a transportation entity, automatically execute a contract with the transportation entity to pick-up the crop product at the pick-up location and to transport the crop product to the destination location in exchange for compensation based on the lowest computed transportation price.

In another embodiment, the online agricultural system identifies, for a crop product transaction within the online agricultural system, a pick-up location of a crop product, a destination location of a crop product, a pick-up window, a delivery window, a type of crop product, and a quantity of crop product. A set of candidate transportation entities is identified, each able to pick up the crop product at the pick-up location during the pick-up window and to deliver the crop-product to the destination location during the delivery window, and each associated with a set of transportation preferences selected by or inferred from the candidate transportation entity. A transportation price is computed for each candidate transportation entity, the transportation price for transporting the crop product from the pick-up location to the destination location based on the crop product type, the crop quantity, and the set of transportation preferences associated with the candidate transportation entity. An interface of each candidate transportation entity is modified to include a lowest computed transportation price of the computed transportation prices. The interface is configured to, in response to an input from a transportation entity, automatically execute a contract with the transportation entity to pick-up the crop product at the pick-up location and to transport the crop product to the destination location in exchange for compensation based on the transportation price.

In another embodiment, the online agricultural system receives, via a transportation interface displayed by a client device of a requesting entity, a request for a route to transport a crop product. The online agricultural system identifies, for the crop product, a pick-up location of the crop product, a destination location of the crop product, a crop product type, and a crop product quantity. The online agricultural system accesses map data describing a geographic area including the pick-up location and the destination location, the map data including road information and traffic data. The online agricultural system identifies a set of candidate routes between the originating location and the destination location based on the accessed map data. The online agricultural system accesses weather information describing expected weather conditions within the geographic area. The online agricultural system selects a route from the set of candidate routes based on the accessed weather information. The online agricultural system modifies the transportation interface to display the selected route to the requesting entity.

In another embodiment, the online agricultural system receives, via a transportation interface displayed by a client device of a transportation entity, a request for a route to transport one or more crop products, the request including one or both of a transportation time period and a transportation mileage range. A set of crop product transactions is accessed within the online agricultural system, each including a pick-up location, a destination location, a pick-up window, a delivery window, a transportation price, and a type of crop product. A subset of the set of crop product transactions is selected that optimizes a sum of transportation prices of the selected subset of crop product transactions without exceeding the transportation time period or the transportation mileage range. The transportation interface is modified to include the selected subset of one or more crop listings.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
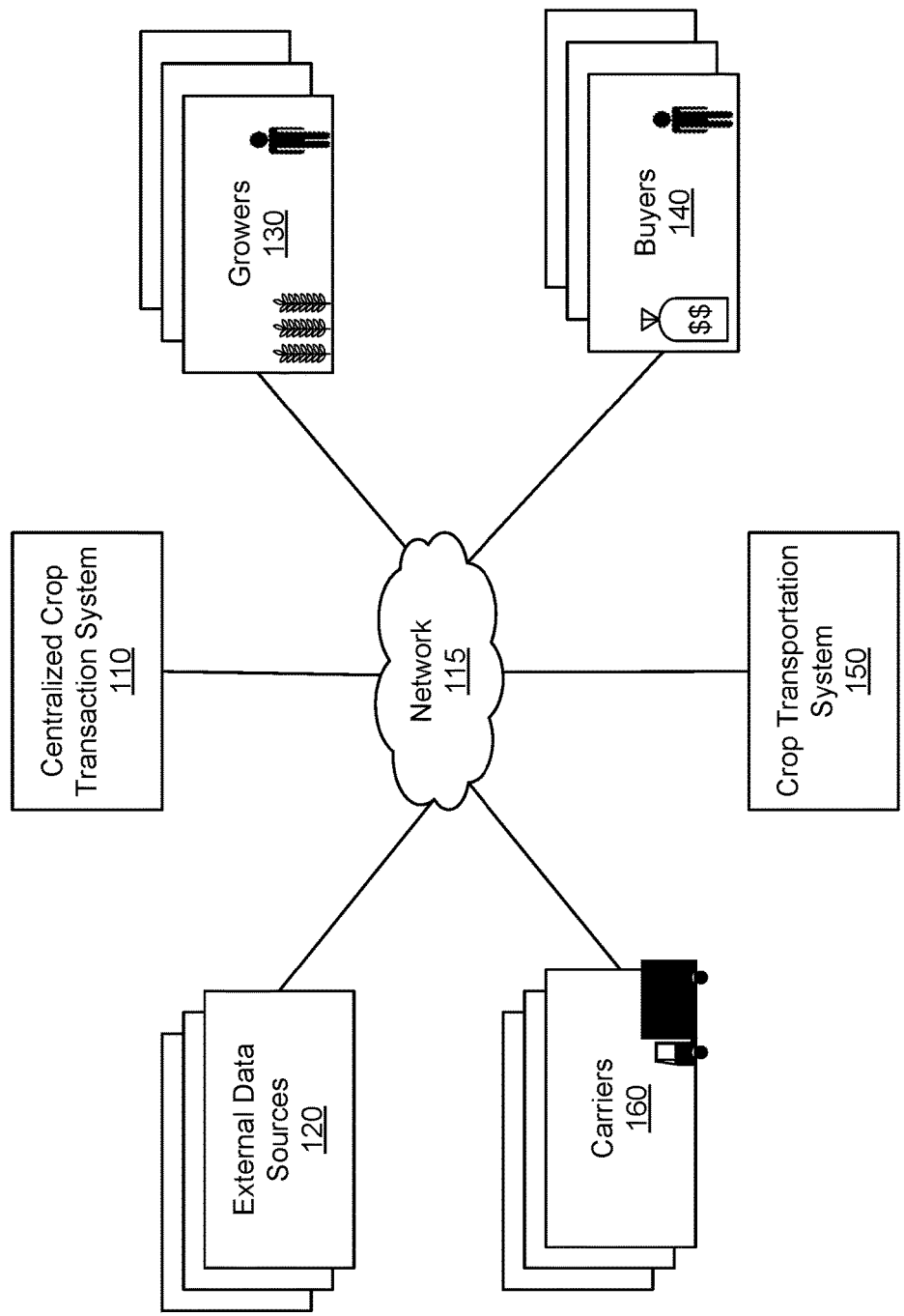
FIG. 1 is a block diagram of a system environment in which a centralized crop transaction system and a crop transportation system operate, according to various embodiments.

FIG. 1 is a block diagram of a system environment 100 for a centralized crop transaction system 110 and a crop transportation system 150. The system environment 100 shown by FIG. 1 comprises one or more growers 130, one or more buyers 140, one or more data sources 120, and one or more transportation entities 160. In an embodiment, the centralized crop transaction system 110 and the crop transportation system 150 include an integrated web or mobile application and a back-end computing infrastructure (such as one or more web servers). In another embodiment, the centralized crop transaction system 110 includes a first web or mobile application and the crop transportation system 150 includes a second web or mobile application distinct from the first web or mobile application. In alternative configurations, different and/or additional components may be included in the system environment 100. For example, the system environment 100 may include additional or fewer growers, buyers, external data sources, and/or transportation entities. Likewise, in some embodiments, the centralized crop transaction system 110 and the crop transportation system 150 are unrelated and/or are managed by different entities. In various embodiments, the system environment 100 only includes one of the centralized crop transaction system 110 and the crop transportation system 150.

The centralized crop transaction system 110 is an online agricultural system that manages interactions directed to the marketing, production, valuation, acquisition, and exchange of ownership of any agricultural good (or simply, "crop product" or "crop") between one or more entities in real-time. The real-time management of interactions refers to the monitoring of interactions and changes to data as the interactions and changes occur. That is, the centralized crop transaction system 110 monitors changes impacting the marketing, production, valuation, acquisition, and exchange of ownership of crop products and performs actions based on the monitored changes as they occur or within a threshold time period of occurrence. The centralized crop transaction system 110 receives requests to sell or purchase crop products and executes contracts to sell or purchase crop products with users of the system based on monitored data impacting crop product transactions. For example, the centralized crop transaction system 110 receives requests from growers 130 to list crop products for sale on the online agricultural system. Likewise, the centralized crop transaction system 110 additionally receives requests from buyers 140 to purchase crop products on the online agricultural system. It should be noted that reference made herein to a request or listing that identifies a crop product type, a location of the crop product, a quality of the crop product, a quantity of the crop product, and other information associated with the crop product can explicitly include such information, but one or more portions of such information can be inferred from an analysis of historic data associated with the crop producer or the crop product, the prospective acquiring entity, satellite data associated with the location of any crop product, or any other suitable information. Responsive to conditions being met by one or more requests, the centralized crop transaction system 110 executes one or more contracts with the growers 130 and buyers 140 to complete a transaction.

The crop transportation system 150 can be associated with or part of an online agricultural system and assists with the transportation of crop products. The crop transportation system 150 receives requests for crop products to be transported between locations and identifies one or more transportation entities 160 to execute the transportation for the crop products. For example, the crop transportation system 150 identifies a crop transaction executed on the online agricultural system and identifies a location for pick-up and a destination location for the crop product of the crop transaction. Based on the available transportation entities 160, the crop transportation system 150 identifies one or more transportation entities to perform the crop transportation and, responsive to an acceptance from the one or more transportation entities, assigns the transportation entity to execute the transportation.

Growers 130, buyers 140, and transportation entities 160 interact with the centralized crop transaction system 110 using one or more client devices. In an embodiment, growers 130 are any seller desirous of selling current or future inventory of agricultural goods. For example, growers 130 are crop producers, e.g., farmers actively engaged in and responsible for the production of agricultural crops or producers of crop products (such as olive oil). The terms "grower" and "crop producer" are used herein synonymously. In an embodiment, buyers 140 are any prospective acquiring entity seeking to purchase an agricultural good. For example, buyers 140 are manufacturers of processed food or fiber products, such as bakery goods, snacks, beverages, cooking oils, clothing, industrial polymers, bioplastics, or biofuels. The terms "buyer" and "prospective acquiring entity" or "acquiring entity" are used herein synonymously. In an embodiment, transportation entities 160 are crop transportation entities. For example, transportation entities 160 are carriers, freight forwarders, freight brokers, truckers, trucking corporations, shipping corporations, and the like.

A client device is a computing device that can transmit and/or receive data via the network 115. A grower 130 or buyer 140 may use the client device to perform functions such as submitting or requesting crop product listings via the centralized crop transaction system 110, viewing crop product listings via the centralized crop transaction system, interacting with other growers or buyers, and the like. A transportation entity 160 may use the client device to perform functions such as viewing available crop transportation opportunities, accessing map, weather, or traffic data for a geographic area associated with a crop transportation, interacting with growers or buyers, and the like. For example, the client device may be a smartphone or tablet, notebook, or desktop computer, navigation device, or electronic logging device (ELD). In addition, the client device may be an Internet-of-Things (IOT) connected device such as a vehicle or home appliance. The client device may include a display device on which the user may view digital content, such as crop product listings on the centralized crop transaction system 110.

It should be noted that reference made herein to the modification of a displayed interface (e.g., to display crop product listings) may include embodiments wherein the steps described in conjunction with the modification of the displayed interface are performed internally by the centralized crop transaction system 110 or the crop transportation system 150 and does not include the display or modification of an interface associated with the transactions.

The client device may execute one or more applications ("apps") that extend the functionality of the client device. For example, the apps may include a web browser that allows the client device to interact with websites provided by servers connected to the network 115. The apps may also include one or more dedicated apps for accessing the centralized crop transaction system 110 or the crop transportation system 150. In one embodiment, the user downloads and installs apps on the client device for specific purposes, such as executing crop transactions via the centralized crop transaction system 110. Alternatively, the functionality of an app may be incorporated into an operating system of the client device or included in other native functionality of the client device.

The centralized crop transaction system 110 and the crop transportation system 150 access one or more external data sources 120 via the network 115. External data sources 120 can store data describing current or historic information impacting crop product transactions, crop product transportation, crop product growth, crop product price predictions, and the like. For example, data accessed by the centralized crop transaction system 110 via the external data sources 120 may include satellite imagery, weather data, historic crop prices or crop price trends, current crop prices or crop price trends, historic crop transactions, current predictions for future crop output, and the like. In another example, data accessed by the crop transportation system 150 via the external data sources 120 may include traffic data, weather data, map data, historic impact of weather or other conditions on crop transportation, soil composition data, regional land use data, transportation resource availability data, data relating to storage capacity and utilization for crop products, data relating to location and activity of processing facilities for crop products, data relating to utilization of inputs to agronomic production (e.g. fertilizer, insecticide, seed usage, irrigation, etc.), and the like. Example data sources 120 can include but are not limited to: weather databases, crop product or commodity price databases, satellite imagery databases, map databases, and the like.

The network 115 comprises any combination of local area and/or wide area networks, using both wired and/or wireless communication systems. In one embodiment, the network 115 uses standard communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

Centralized Crop Transaction System

Figure 2:
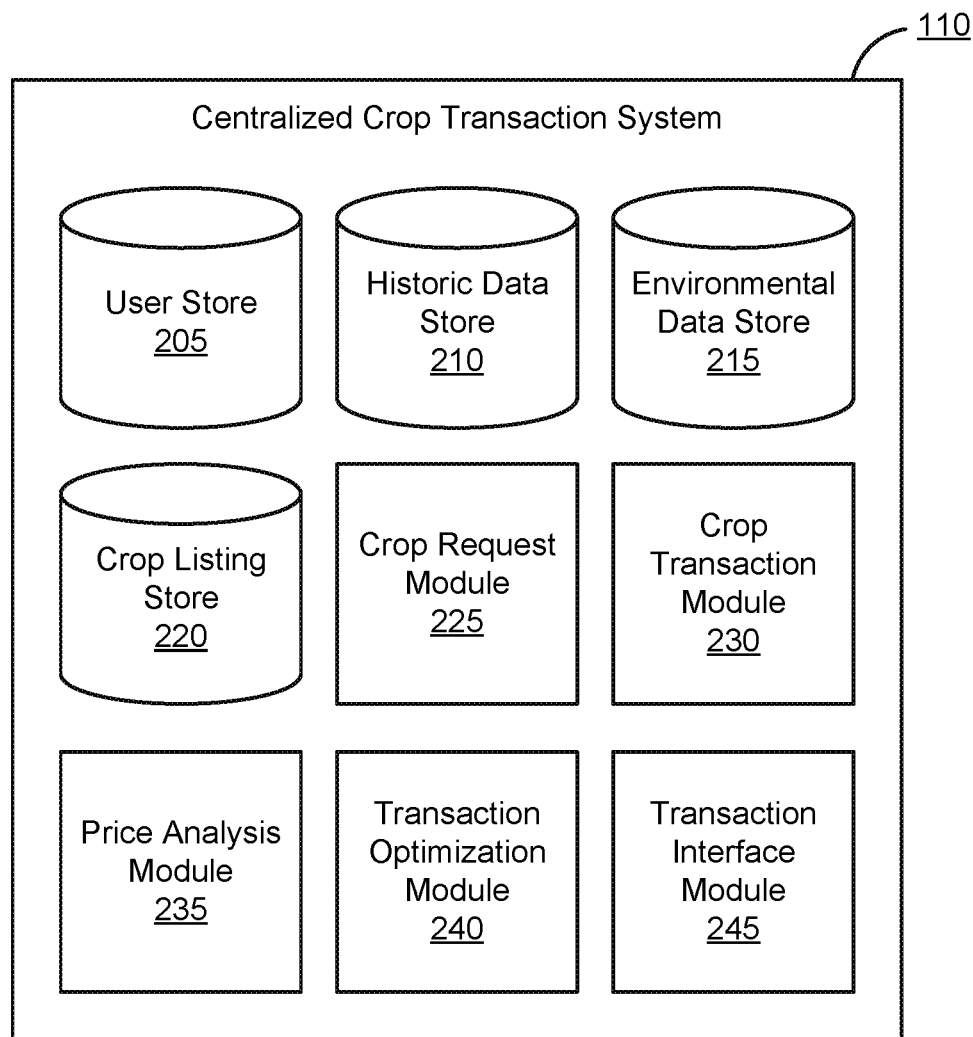
FIG. 2 is a block diagram of an architecture of a centralized crop transaction system, according to various embodiments.

FIG. 2 is a block diagram of an architecture of the centralized crop transaction system 110. The centralized crop transaction system 110 shown in FIG. 2 includes a user store 205, a historic data store 210, an environmental data store 215, a crop listing store 220, a crop request module 225, a crop transaction module 230, a price analysis module 235, a transaction optimization module 240, and a transaction interface module 245. In other embodiments, the centralized crop transaction system 110 may include additional, fewer, or different components for various applications.

The user store 205 stores and maintains data describing users of the centralized crop transaction system 110. In an embodiment, the user store 205 stores and maintains information provided by users of the centralized crop transaction system 110 for marketplace profiles describing an identity and information relevant to selling or purchasing crop products via the system. For example, the marketplace profile includes a user name; a user business name; a user business or farm manager name; locations and capacities, and types of one or more crop product storage facilities owned, rented, or accessed by the user; locations and capacities of one or more production facilities (e.g., processing plants, refineries, fields, greenhouses, vertical farms, etc.) owned, rented, or accessed by the user; the volume and type of goods currently in storage or production; currently open bids or demand opportunities; locations and capacities, and types of transportation equipment and facilities owned, rented, or accessed by the user; and the like. In other examples, the marketplace profile includes other or additional information associated with corresponding users of the centralized crop transaction system 110, such as a verified identification (e.g., driver's license information), verified financial information (e.g., credit score or bank routing numbers), an ability to transport crops (e.g., possession of a commercial driver's license or insurance), and the like.

In some embodiments, some or all of the marketplace profile information stored by the user store 205 is displayed to users of the centralized crop transaction system 110. In other embodiments, some or all of the marketplace profile information stored by the user store 205 is private, such that users are able to access their corresponding marketplace profile but cannot access marketplace profiles of other users. In other embodiments, some or all of the marketplace profile information is obscured or otherwise anonymized.

In an embodiment, the user store 205 associates each user of the centralized crop transaction system 110 with a role identifying actions that may be performed by the user. For example, a user associated with a grower role may enter one or more inventories of crop product for sale on the centralized crop transaction system 110. A user associated with a buyer role may enter one or more demand opportunities requesting to purchase crop product on the centralized crop transaction system 110. In such embodiments, users are associated with one or more roles, for instance based on roles identified by the users, based on roles inferred from historical interactions of the users within the centralized crop transaction system 110, and the like.

The historic data store 210 stores and maintains data describing historic crop transactions. The historic data store 210 receives information representative of transactions executed on the centralized crop transaction system 110, such as information describing conditions of the transactions, entities associated with the transactions, and the like. For an example transaction, the historic data store 210 can receive information associated with executed contracts associated with the transaction, information identifying the entities performing the transaction, a type of crop product associated with the transaction, a quantity of crop product associated with the transaction, one or more quality metrics associated with the crop product, a price for the crop product, a current market price for the crop product at the time of the transaction, an origin location of the crop product, a destination location of the crop product, environmental information for a geographic area associated with the crop product at the time of the transaction, and other information describing factors impacting the crop product transaction.

In an embodiment, the historic data store 210 additionally stores data accessed from one or more external data sources 120 describing conditions or factors associated with crop product transactions. In some embodiments, the historic data store 210 additionally stores data accessed from external data sources 120 describing historic conditions or factors impacting crop product growth or production. For example, the historic data store 210 stores information including historic weather conditions, historic crop growth and crop outputs, historic productions of various crop product types, historic geographic areas (e.g., plots of land, farms, etc.) farmed or used for crop production, historic crop product quality, historic methods or applications for crop product production, historic crop product transactions performed on one or more systems other than the centralized crop transaction system 110, and the like.

The environmental data store 215 stores and maintains data describing current environmental conditions associated with crop transactions. In one embodiment, the environmental data store 215 stores data accessed from one or more external data sources 120 describing current environmental conditions or factors impacting crop transactions, crop growth, and/or crop transportation. For example, the environmental data store 210 stores information describing current weather conditions, current crop growth, current measured or predicted crop health, current crop product types being grown or stored, current crop product production predictions, current methods or applications for crop product production, current soil characteristics, current pending or executed crop product listings, current measured or predicted quality metrics of a crop product, and transactions performed on one or more systems including the centralized crop transaction system 110.

The crop listing store 220 stores and maintains crop product listings submitted to the centralized crop transaction system 110. Crop product listings are requests by users of the centralized crop transaction system 110 to sell or purchase agricultural goods. The crop listing store 220 stores crop product listings in association with information identifying the submitting entity and describing the crop product being requested for purchase or sale. For example, the crop listing store 220 stores crop product listings in association with a user identifier or name, a location of the user, credentials (e.g., ratings, past transactions, reviews, etc.) associated with the user, and the like.

In another example, the crop listing store 220 stores crop product listings in association with a crop product type, a crop product quantity, one or more quality metrics for the crop product, a crop product price, a crop product origin or destination location, type of storage or storage condition of a crop product, and the like. For example, a first location or origin location may be one or more of: a production location of the crop product, a storage location of the crop product, and a current or future location of a crop product in transit. The crop product may be further identified as being a crop that has not been harvested, a crop that has been harvested but not processed, or a crop that has been harvested and processed into a different crop product. A production location of a crop product may be a location for production of a processed or unprocessed crop. For example, a production location of a processed crop product may be an ethanol production facility, oilseed crushing plant, a flour mill, or the like. For example, a production location of a harvested or unharvested and unprocessed crop product may be a field or field boundary, a greenhouse, vertical farm, or the like. A quantity of a crop product may be identified based on weight units, volume units, units for transportation, and other units. For example, a quantity of a crop product is identified in pounds, hundred weight (cwt), kilograms, tons, metric tons, bushels, acre, hectare, truckloads, train car loads, barge loads, and other standard units for measurement.

In some embodiments, information describing crop products stored in the crop listing store 220 is determined using remote sensing data in conjunction with information provided by a user via a request to the centralized crop transaction system 110. For example, a crop producer identifies a first location of a crop product. The crop listing store 220 stores environmental data (current or historic) for the first location of the crop product in association with the crop product listing. As described previously in conjunction with the environmental data store 215, the stored data may include current or historic weather data; one or more soil characteristics (including soil temperature); current or historic reflected or emitted electromagnetic radiation measurements of land, water, and atmospheric properties of a location of a crop product; crop phenology and crop type; crop production and conservation practices; and the like. Additionally, remote sensing techniques may be used to infer information describing the crop product but that is not provided by users. For example, analysis operations may be performed on satellite data of the provided first location to identify a type of the crop product grown at the first location, a quantity of the crop product, one or more quality metrics of the crop product, one or more quality specifications of the crop product, crop phenology, crop production and conversation practices (for example, irrigation, high or low intensity tillage, cover crops, etc.), timing of application of agricultural inputs, timing of harvest, and the like.

The crop request module 225 receives requests from users to perform actions on the centralized crop transaction system. Users may request to access current or past crop listings on the centralized crop transaction system 110, view profiles or information associated with users, view current predictions or trends associated with crop products or crop transactions, submit crop product listings on the centralized crop transaction system 110, execute contracts for crop product transactions, exchange communications with users on the centralized crop transaction system 110, and the like. In an embodiment, the crop request module 225 determines whether a user is able to perform an action on the centralized crop transaction system 110 based on a user role associated with the user in the user store 205. For example, users associated with a grower role are able to post crop products for sale on the centralized crop transaction system 110, but may be unable to execute contracts to purchase crop product listings. In another example, users associated with a buyer role are able to execute contracts to purchase crop product listings and to post desired crop product listings for purchase, but are unable to post crop products for sale. Crop product listings posted by buyers for the purchase of crop products are synonymously referred to herein as demand opportunities, requests, and bids. In another embodiment, the crop request module 225 determines whether a user is able to perform an action on the centralized crop transaction system 110 based information in the users marketplace profile in the user store 205. In another example, users are able to execute contracts to sell or purchase crop products only if the user's marketplace profile includes verified financial information.

The crop transaction module 230 executes contracts between the centralized crop transaction system 110 and users of the system. Users are not committed to the submitted crop product listing opportunities until the contract is executed by the centralized crop transaction system 110. The crop transaction module 230 receives, from the price analysis module 235, a notification when one or more conditions are met by crop product listings on the centralized crop transaction system 110. Responsive to the notification, the crop transaction module 230 can execute a contract with a user associated with the crop product listing that satisfies the one or more conditions. In some embodiments, the transaction interface module 245 receives, from the price analysis module 235, a notification when one or more conditions are not met by crop product listings on the centralized crop transaction system 110. Upon receiving such a notification the transaction interface module 245 generates interfaces for users of the centralized crop transaction system 110 to interact with and edit their request, for example to update a crop product price as in FIGS. 7A-D. In further embodiments, the crop transaction module 230 receives a notification responsive to a user of the centralized crop transaction system 110 modifying a corresponding crop product listing such that one or more conditions previously not met by the crop product listing are now met. In response, the crop transaction module 230 can automatically execute a contract with the user associated with the crop product listing that satisfies the conditions.

The price analysis module 235 accesses historic and current data from the historic data store 210 and the environmental data store 215 and analyzes prices for crop transactions for the centralized crop transaction system 110. In the disclosed embodiments, prices for crop transactions are one of: a price of the crop product at the location of the crop producer, a price of the crop product at the location of the buyer, a price of the crop product at another location, a futures reference price, a cash price, or a basis price. For example, a price of the crop product at the location of the crop producer is a price for the crop product requested by the crop producer representative of a value of the crop. In another example, a price of the crop product at the location of the buyer is a combination of a corresponding price of the crop product at the location of the crop producer and a transportation cost associated with moving the crop product to the location of the buyer. In another example, a price of the crop product at another location is a combination of price of the crop requested by the crop producer, a transportation cost, and a storage fee for storing the crop product at the location. The price of the crop product in any of the prior examples may also reflect differences in the value of the crop between each location. Geographic differences in value of a crop can be attributable to location specific differences in market conditions. Location specific market conditions may be inferred based on remote sensing data for a location and surrounding regions. Factors affecting local demand for a crop product include the number, types and estimated consumption of consumers of a crop product in a region. In some embodiments, local demand may be inferred from image analysis. For example, image analysis can be used to determine the number of feedlots within a region and the number of head of livestock at the facility. Additionally, a factor for demand for an unprocessed crop product may be the number and capacities of production facilities for processed crop products, such as oilseed crushing facilities, fiber processing plants, flour mills, ethanol production facility, and the like. Another factor affecting local market conditions is the supply of crop product within a region. For example, image analysis can be used to determine the number, types and production capacity of production facilities for unprocessed crop products, such as fields, greenhouses and vertical farms. Additionally, supply may be affected by the number, type, and capacity of storage facilities in a region for a processed or unprocessed crop product. The number, type, capacity, and utilization of storage facilities in a region may be estimated using image analysis. Local market factors may also be affected by the type, capacity and utilization of transportation modes serving a region, which may also be estimated based on image analysis.

The price analysis module 235 monitors crop product listings on the centralized crop transaction system 110 and one or more market conditions to determine when to execute a contract for the sale or purchase of a crop product listing. For example, the price analysis module 235 determines that a crop product listing for sale is associated with a requested price that is at or below a current market price for the corresponding crop product type. In another example, the price analysis module 235 determines that a crop product listing requested by a prospective buyer is associated with an offered price that is at or above a current market price for the corresponding crop product type. Responsive to the determination, the price analysis module 235 transmits a notification to the crop transaction module 230 to execute a contract for the crop product listing.

In an embodiment, the price analysis module 235 uses a machine learning model to determine current market prices for one or more crop products listed on the centralized crop transaction system 110. The machine learning model receives input information describing a crop product, including the crop product type, crop product quantity, and one or more quality metrics for the crop product. In an embodiment, the machine learning model additionally receives input information describing a distance between a first location for the crop product and a second location for the crop product, a crop output prediction for a next period of time (e.g., a season, a year), a price prediction for a next period of time, a current market price for the crop product accessed from one or more external data sources 120, and the like. Based on these inputs, the machine learning model outputs a current market price for a crop product listing for use by the price analysis module 235 in determining if or when to execute a contract for the crop product listing.

In some embodiments, the price analysis module 235 determines current market prices for a crop product based on a basis component and a futures reference component. A futures reference component can be determined by one or more external entities (e.g., CME Group/Chicago Board of Trade) or based on an analysis of crop listings and corresponding prices within the centralized crop transaction system 110. The futures reference component describes an intrinsic standard value for a crop product type. The futures reference component may include reference time period, for example as associated with a time of delivery of the associated product.

A basis component can be determined for specific additional factors associated with a crop product. For example, the basis component is determined by the price analysis module 235 based on a predicted yield for the crop product across one or more growers 130, a predicted demand for the crop product across one or more buyers 140, an expected transportation cost or equipment requirement, costs associated with the exchange of possession of a quantity of the crop product, expected changes in energy prices, expected changes in labor markets, weather events, expected changes in logistical availability (e.g., rail, river barge, ocean freight, etc.), and the like. In another example, the basis component is determined by the price analysis module 235 based on one or more quality metrics for a determined crop product.

As used herein, "quality" or a "quality metric" may refer to any aspect of an agricultural good that adds value. In some embodiments, quality is a physical or chemical attribute of the crop product. For example, a quality may include, for a crop product type, one or more of: a variety; a genetic trait or lack thereof; genetic modification of lack thereof; genomic edit or lack thereof; epigenetic signature or lack thereof; moisture content; protein content; carbohydrate content; ash content; fiber content; fiber quality; fat content; oil content; color; whiteness; weight; transparency; hardness; percent chalky grains; proportion of corneous endosperm; presence of foreign matter; number or percentage of broken kernels; number or percentage of kernels with stress cracks; falling number; farinograph; adsorption of water; milling degree; immature grains; kernel size distribution; average grain length; average grain breadth; kernel volume; density; L/B ratio; wet gluten; sodium dodecyl sulfate sedimentation; toxin levels (for example, mycotoxin levels, including vomitoxin, fumonisin, ochratoxin, or aflatoxin levels); and damage levels (for example, mold, insect, heat, cold, frost, or other material damage).

In some embodiments, quality is an attribute of a production method or environment. For example, quality may include, for a crop product, one or more of: soil type; soil chemistry; climate; weather; magnitude or frequency of weather events; soil or air temperature; soil or air moisture; degree days; rain fed; irrigated or not; type of irrigation; tillage frequency; cover crop (present or historical); fallow seasons (present or historical); crop rotation; organic; shade grown; greenhouse; level and types of fertilizer use; levels and type of chemical use; levels and types of herbicide use; pesticide-free; levels and types of pesticide use; no-till; use of organic manure and byproducts; minority produced; fair-wage; geography of production (e.g., country of origin, American Viticultural Area, mountain grown); pollution-free production; reduced pollution production; levels and types of greenhouse gas production; carbon neutral production; levels and duration of soil carbon sequestration; and others. In some embodiments, quality is affected by, or may be inferred from, the timing of one or more production practices. For example, food grade quality for crop products may be inferred from the variety of plant, damage levels, and one or more production practices used to grow the crop. In another example, one or more qualities may be inferred from the maturity or growth stage of an agricultural product such as a plant or animal. In some embodiments, a crop product is an agricultural product.

In some embodiments, quality is an attribute of a method of storing an agricultural good (e.g., the type of storage: bin, bag, pile, in-field, box, tank, or other containerization), the environmental conditions (e.g., temperature, light, moisture, relative humidity, presence of pests, $CO_2$ levels) during storage of the crop product, method of preserving the crop product (e.g., freezing, drying, chemically treating), or a function of the length of time of storage. In some embodiments, quality may be calculated, derived, inferred, or subjectively classified based on one or more measured or observed physical or chemical attributes of a crop product, its production, or its storage method. In some embodiments, a quality metric is a grading or certification by an organization or agency. For example, grading by the USDA, organic certification, or non-GMO certification may be associated with a crop product. In some embodiments, a quality metric is inferred from one or more measurements made of plants during growing season. For example, wheat grain protein content may be inferred from measurement of crop canopies using hyperspectral sensors and/or NIR or visible spectroscopy of whole wheat grains. In some embodiments, one or more quality metrics are collected, measured, or observed during harvest. For example, dry matter content of corn may be measured using near-infrared spectroscopy on a combine. In some embodiments, the observed or measured value of a quality metric is compared to a reference value for the metric. In some embodiments, a reference value for a metric (for example, a quality metric or a quantity metric) is an industry standard or grade value for a quality metric of a particular agricultural good (for example, U.S. No. 3 Yellow Corn, Flint), optionally as measured in a particular tissue (for example, grain) and optionally at a particular stage of development (for example, silking). In some embodiments, a reference value is determined based on a supplier's historical production record or the historical production record of present and/or prior marketplace participants.

The transaction optimization module 240 accesses crop listings on the centralized crop transaction system 110 and determines optimizations based on one or more factors for executed crop transactions. When one or more contracts are executed for crop product listings on the centralized crop transaction system 110, the transaction optimization module 240 monitors the executed contracts to determine if one or more conditions are met for optimization. In one embodiment, the transaction optimization module 240 determines that a crop product purchased by the centralized crop transaction system 110 in a first executed contract meets qualifications for a crop product request from a prospective buyer on the centralized crop transaction system 110 and matches the crop product to the prospective buyer. In another embodiment wherein one or more crop products are matched to prospective buyers, the transaction optimization module 240 identifies a change to be made to the crop products matched to the prospective buyers in order to optimize one or more conditions for the crop products. For example, the transaction optimization module 240 optimizes crop product transactions based at least in part on quality metrics of crop products, distances between pick-up locations of crop products and destination locations of crop products, crop product transportation, environmental or transportation conditions at or between pick-up locations of crop products and destination locations of crop products, dates associated with crop product pick-up and crop product drop-off, and the like. Transaction optimization is described in greater detail below.

The transaction interface module 245 generates and modifies interfaces for users of the centralized crop transaction system 110 and transmits the interfaces to client devices for presentation and display. The transaction interface module 245 generates interfaces for users of the centralized crop transaction system 110 to interact with and submit crop product listings to the centralized crop transaction system, to interact with other users of the centralized crop transaction system, and to perform other actions on the centralized crop transaction system associated with crop product transaction.

In some embodiments, the transaction interface module 245 modifies interfaces generated for users based on a role associated with a corresponding user, such that a grower 130 is provided with one or more different interfaces than a buyer 140. For example, the transaction interface module 245 generates, for prospective acquiring entities, interfaces displaying an expected distribution of prices or an expected average price of a crop product. In another example, the transaction interface module 245 generates, for prospective acquiring entities, interfaces displaying a distribution of geographic locations (e.g., maps, lists, etc.) from which a crop product is expected to be acquired. In another example, the transaction interface module 245 generates, for prospective acquiring entities, interfaces displaying an expected distribution of crop product qualities for a crop product to be acquired. In another example, the transaction interface module 245 generates, for prospective acquiring entities, interfaces displaying an expected distribution of crop product quantities of given crop product qualities required to meet a crop product quality requirement for a quantity of crop product to be acquired.

Interaction Management in an Online Agricultural System

A centralized crop transaction system 110 manages interactions by users in an online agricultural system by executing transactions for crop products associated with crop product listings. The centralized crop transaction system 110 allows users of the online agricultural system to submit crop products for sale or to submit requests to purchase crop products as crop product listings. The crop product listings include information identifying the crop product for sale or desired for purchase and the user associated with the crop product listing. For example, a crop product listing identifies a crop product type, a crop product quantity, one or more quality metrics for the crop product, a price associated with the crop product, and other information identifying the crop product. The crop product listing may additionally identify a user name or identifier, a pick-up location of the crop product, a destination location of the crop product, and other information associated with the user or the listing of the crop product listing.

The centralized crop transaction system 110 monitors market prices for crop products to determine whether to execute a contract for a crop product transaction. As described above in conjunction with FIG. 2, the centralized crop transaction system 110 accesses historic and current data impacting prices for crop transactions and determines, for a given crop listing, whether to execute a contract for the sale or purchase of the associated crop product. In one embodiment, a contract is executed responsive to a requested purchase price for a crop product listing being at or below a threshold value determined by the centralized crop transaction system 110. For example, a contract is executed responsive to a requested purchase price for a crop product listing below a current or predicted market value for the associated crop product. In one embodiment, a contract is executed responsive to a requested sale price for a crop product listing being at or above a threshold value determined by the centralized crop transaction system 110. For example, a contract is executed responsive to a requested sale price for a crop product listing above a current or predicted market value for the associated crop product.

In another embodiment, a contract is executed responsive to the centralized crop transaction system 110 determining that a first crop product listing for the sale of a crop product satisfies the requirements of a second crop product listing for the purchase of a crop product. In such an embodiment, the first crop product listing and the second crop product listing identify compatible crop product types, crop product quantities, crop product quality metrics and requirements, and crop product prices. For example, the first crop product listing identifies a crop product type matching the requested crop product for the second crop product listing, a crop product quantity less than or equal to the requested crop product for the second crop product listing, a price less than or equal to the price of the second crop product listing, and a quality greater than or equal to the requested crop product quality requirement for the second crop product listing.

In some embodiments, the centralized crop transaction system 110 continuously monitors costs associated with the transfer of possession (e.g., in real-time) of a crop product from crop producers to prospective acquiring entities, and executes contracts with the crop producers and prospective acquiring entities in response to the monitored costs. For example, if a crop producer lists a crop product for sale and requests a first price, and a prospective acquiring entity lists a request to acquire the crop product and requests a second price, the centralized crop transaction system 110 executes contracts with the crop producer and the prospective acquiring entity in response to the sum of the first price and the monitored transfer of possession cost between the crop producer and the prospective acquiring entity becomes equal to or less than the second price.

In some embodiments, the centralized crop transaction system 110 executes, in real-time, one or more contracts to sell or purchase crop products identified in one or more crop product listings. Multiple contracts may be executed in order to fulfill a request by a crop producer or a prospective acquiring entity. For example, the centralized crop transaction system 110 executes a plurality of contracts with one or more crop producers in order to fulfill a crop product request submitted by a prospective acquiring entity, such that each executed contract requires the transfer of possession of a quantity of crop product to the prospective acquiring entity, the aggregate sum of the quantities of the crop products associated with all executed contracts being less than or equal to a quantity requested by the prospective acquiring entity. In another example, the centralized crop transaction system 110 executes a plurality of contracts with one or more prospective acquiring entities in order to fulfill a crop product listing submitted by a crop producer, such that each executed contract requires the transfer possession of a quantity of available crop product from the crop producer to each prospective acquiring entity, the aggregate sum of the quantities of the crop products requested by the prospective acquiring entities being less than or equal to a quantity offered for sale by the crop producer.

Additionally, multiple contracts may be executed in order to fulfill a quality request by a prospective acquiring entity. For example, a prospective acquiring entity submits a request to acquire a crop product with a quality requirement (e.g., a grade or combination of crop products). In a case wherein a first crop product listed by a first crop producer and a second crop product listed by a second crop producer individually do not satisfy the quality requirement, or do not satisfy the quality requirement and one or more other requirements, but a combination of a quantity of the first crop product and a quantity of the second crop product does satisfy the quality requirement and all other requirements, the centralized crop transaction system 110 executes contracts requiring the transfer possession of the quantities of the respective crop products to, in combination, fulfill the crop product request of the prospective acquiring entity. For example, a prospective acquiring entity submits a request to purchase 10,000 bushels of hard red winter wheat having 11% protein. A first producer submits a listing to sell their inventory of 5,000 bushels of 13% protein hard red winter wheat and a second producer submits a listing to sell their inventory of 15,000 bushels of 9% protein hard red winter wheat. The centralized crop transaction system 110 executes a first contract to purchase 5,000 bushels of 13% protein wheat from the first crop producer and a second contract to purchase 5,000 bushels of 9% protein wheat from the second crop producer, such that the combination of the wheat purchased from the first and second producers satisfies the prospective acquiring entity's quality requirement. In another example, a prospective acquiring entity submits a request to purchase, wherein the crop product type is a low-gluten grain mix including a percentage of sorghum and a percentage of rye. The centralized crop transaction system 110 executes a first contract to purchase sorghum from a first crop producer and a second contract to purchase rye from a second crop producer, such that the combination of the purchased sorghum and the purchased rye satisfy the requested grain mix.

In further embodiments, a request 510 to acquire a crop product includes a crop product price which is a price ladder. Price ladders describe a set of rules which describe conditions under which a price may increase or decrease (e.g., relating incremental change in one or more conditions to a corresponding incremental change in the price to be paid). For example, the centralized crop transaction system 110 executes contracts including price ladders wherein the price ladder is a quality based price ladder, identifying an incremental change in one or more quality metrics of a quality requirement and a corresponding incremental change in the crop product price. The centralized crop transaction system 110 executes a contract responsive to identifying a request with a set of quality metrics that better or best satisfies a requested set of required quality metrics for the crop product, wherein a set of quality metrics better satisfies a requested set of required quality metrics, for example, minimizes a difference between the sets of quality metrics or maximizes a price according to a quality based price ladder.

In some embodiments, one or more quality metrics of crop products are measured at delivery. The measured quality metrics may be used to determine compliance with one or more contract provisions, to inform future transportation or storage method decisions, to rate the supplier or transportation entity's trustworthiness or reputation, to determine the amount of payment which is due relative to one or more contracts, and the like. In some embodiments, the quality metrics of the crop product at delivery may be compared to one or more quality metrics based on prior sampling of the goods or an inventory comprising a component of the goods. In some embodiments, the quality metrics of the crop product as measured at delivery determines an amount to be paid for the delivery.

In some embodiments, a trustworthiness score is assigned to a grower, a prospective acquiring entity, or transportation entity automatically based on one or more factors including discrepancies between reported metrics (including, quality metrics of a crop product, quantity of a crop product, delivery time and place, or combinations thereof) and measured values thereof and or failure to make a payment in the correct amount, to the correct party, and or within the time specified. In some embodiments, a trustworthiness score is assigned based on a rating assigned by or feedback provided by a marketplace participant. In some embodiments, marketplace participants may specify the minimum trustworthiness score of parties which whom they are willing to transact.

In some embodiments, the payment due to one or more suppliers is calculated based on a different price per unit of goods delivered. In some embodiments, different unit prices are based on differing prices in bids presented to different crop producers. In some embodiments, different unit prices are based on differing values of one or more quality metrics of crop products delivered by one or more suppliers. In some embodiments, the payment due to one or more crop producers relative to a single demand opportunity is based on an averaged value of one or more quality metrics of more than one delivery. In some embodiments, payment due to one or more crop producers is calculated based on the same price per unit of good delivered without regard to variation in quality of goods supplied by each supplier (e.g., based on averaged values of one or more quality metrics, where payment is based on a minimum value of one or more quality metrics). One or more deliveries may be made by one or more crop producers or transportation entities. One or more deliveries may represent all of the deliveries made to fulfill a single demand opportunity or a portion thereof.

In some embodiments, the centralized crop transaction system 110 additionally arranges for a transfer of possession of the crop product from a crop producer to a prospective acquiring entity. The centralized crop transaction system 110 executes a contract including an arrangement for the transfer of possession of the crop product between a crop producer and a prospective acquiring entity. Arrangement for the transfer of possession of the crop product may include automatically sending transportation instructions to a transportation entity or confirming that one of the crop producer and the prospective acquiring entity is responsible for the transfer of possession of the crop product. When the centralized crop transaction system 110 automatically sends transportation instructions to a transportation entity, the transportation instructions include a first location of the crop product (the "pick-up location), a second location for delivery of the crop product (the "destination location"), and a delivery window. The transportation entity may be a crop producer, a prospective acquiring entity, or a third-party transportation entity designated by the centralized crop transaction system 110 (e.g., a transportation entity 160). In some embodiments, the centralized crop transaction system 110 arranges for a transfer of beneficial interest in a crop product without a physical transfer of a crop producer to a prospective acquiring entity. Where transfer of a beneficial interest in a crop product is not associated with a physical transfer in the crop product, the centralized crop transaction system 110 may issue an electronic warehouse receipt.

In some embodiments, the centralized crop transaction system 110 monitors or executes contracts requiring the monitoring of one or more quality metrics of crop products after the execution of contracts. For example, in cases where a prospective acquiring party requests a threshold crop product quality that may degrade over time or due to adverse environmental, storage, or transportation conditions, or where an executed contract includes a quality-based price ladder, or where physical possession of the crop product is not transferred, the centralized crop transaction system 110 continuously receives data describing the one or more quality metrics of the crop products. Changes in one or more qualities of crop products may change an optimal allocation of the crop product. Accordingly, the centralized crop transaction system 110 may modify one or more executed contracts based on changes in the monitored crop products to ensure that allocation of the crop products better satisfies quality requirements of prospective acquiring entities.

Figure 3A:
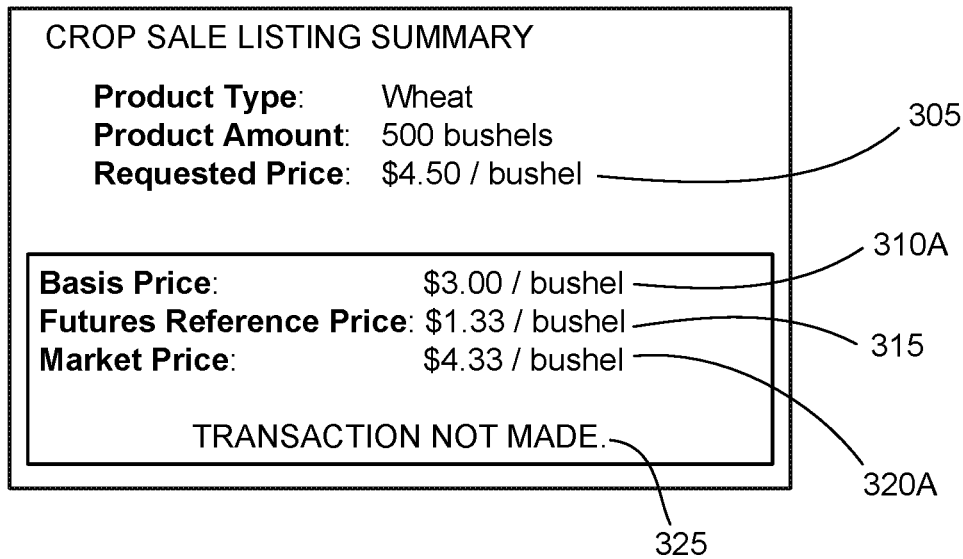
FIGS. 3A-3B illustrate example interfaces for performing transactions within the centralized crop transaction system, according to various embodiments.
Figure 3B:
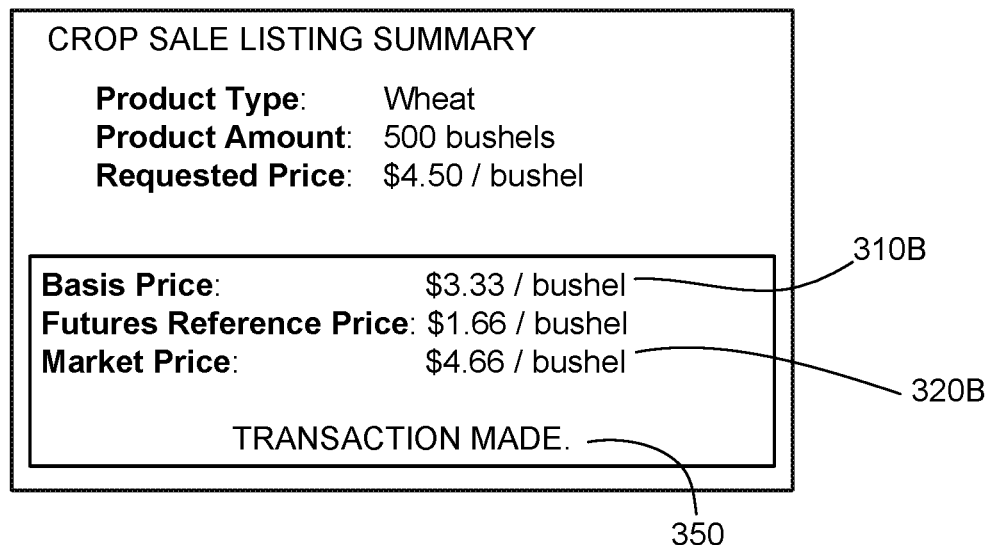

FIGS. 3A-3B illustrate example interfaces for performing transactions by the centralized crop transaction system, according to various embodiments. FIG. 3A illustrates a first crop product listing identifying a crop product for sale for which a transaction is not made. The crop product listing includes information 305 describing the crop product, including a crop product type ("Wheat"), a crop product amount ("500 bushels"), and a requested price for the crop product ("$4.50/bushel"). In other examples or interfaces, the crop product listing includes additional or other information describing the crop product, such as a grower or crop producer identifier or username, a pick-up location of the crop product, and one or more quality metrics of the crop product.

The centralized crop transaction system 110 determines a current or predicted future market value for the crop product. The market price 320A is determined as a sum of a basis price 310A and a futures reference price 315. As described in conjunction with FIG. 2, the basis price 310 is determined for specific factors associated with the crop product 305, while the futures reference price 315 is determined by one or more external entities and describes an intrinsic standard value for a crop product. In the example of FIG. 3A, the basis price 310A is set at $3.00/bushel and the futures reference price 315 is set at $1.33/bushel to generate a market price 320A for the crop product of $4.33/bushel. Because the market price 320A determined by the centralized crop transaction system 110 is less than the requested price of $4.50/bushel of the crop product listing, the centralized crop transaction system does not make a transaction 325 (e.g., does not execute a contract for the crop product listing).

FIG. 3B illustrates the first crop product listing for a crop product for which a transaction is made. In the example of FIG. 3B, the crop product identifies a requested price of $4.50/bushel. A basis price 310B for the crop product is $3.33/bushel (e.g., a $0.33 increase compared to the example of FIG. 3A) and a futures reference price 315 for the crop product is $1.66/bushel, such that the market price 320B is $4.66/bushel. In one embodiment, the basis price 310 may change over time based on one or more factors impacting a market or demand for the crop product. For example, the basis price 310 may change due to an increase or decrease in predicted or current demand for a crop product, an increase or decrease in predicted or current yield of a crop product, an increase or decrease in predicted or current energy costs, an increase or decrease in predicted or current logistics costs or availability, an increase or decrease in predicted or current labor availability, an increase or decrease in predicted or current processor facility availability, unexpected hazards to the movement or storage of a crop product, actual and perceived credit rating of an entity associated with the transaction, condition of the crop product, and the like. Because the market price 320B determined by the centralized crop transaction system 110 is greater than the requested price of $4.50/bushel of the crop product listing, the centralized crop transaction system makes a transaction 350 for the crop product (e.g., executes a contract to purchase the crop product of the crop product listing).

In other embodiments, other factors may impact whether the centralized crop transaction system 110 makes the transaction for the crop product. For example, the centralized crop transaction system 110 identifies a second crop product listing from a prospective acquiring entity requesting the purchase of a crop product corresponding to the crop product listing and arranges for a transfer of possession of the crop product to the prospective acquiring entity.

In other embodiments, a request to list a crop includes a crop product price consisting of a requested futures reference price for delivery within a drop-off window and a basis price to be determined after contracting. For example, a drop-off window is a month within a specified year. A futures reference price is monitored by a centralized crop transaction system 110 and where the current futures reference price is greater than the requested futures reference price, the centralized crop transaction system makes a transaction 350 for the crop product (e.g., executes a contract to purchase the crop product of the crop product listing) at the futures reference price. In some embodiments, the executed contract provides that a crop producer associated with the first crop listing may set a basis price at a time of their choice before delivery. In a further embodiment, the executed contract provides that a crop producer associated with the first crop listing may change the drop-off window to a future time within the specified year. If the crop producer chooses to change the drop-off window, the futures reference price of the contract is adjusted up or down based on the difference between the contracted futures reference price and the futures reference price for the new drop-off window.

In response to the execution and to a crop producer setting a basis price, the centralized crop transaction system 110 identifies a second crop product listing from a prospective acquiring entity requesting the purchase of a crop product corresponding to the crop product listing and arranges for a transfer of possession of the crop product to the prospective acquiring entity.

Figure 4A:
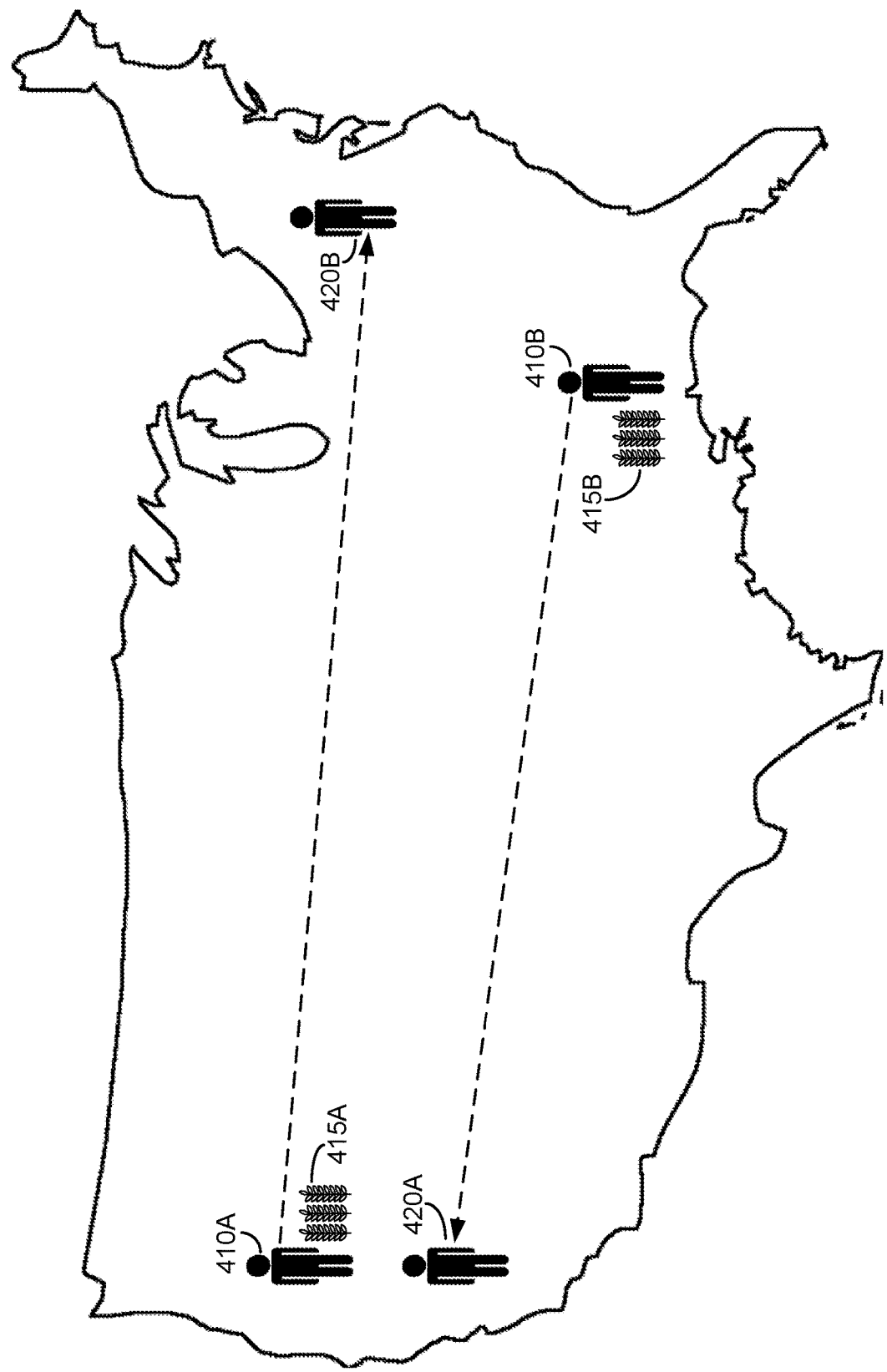
FIGS. 4A-4B illustrate an example optimization for crop transactions by the centralized crop transaction system, according to various embodiments.
Figure 4B:
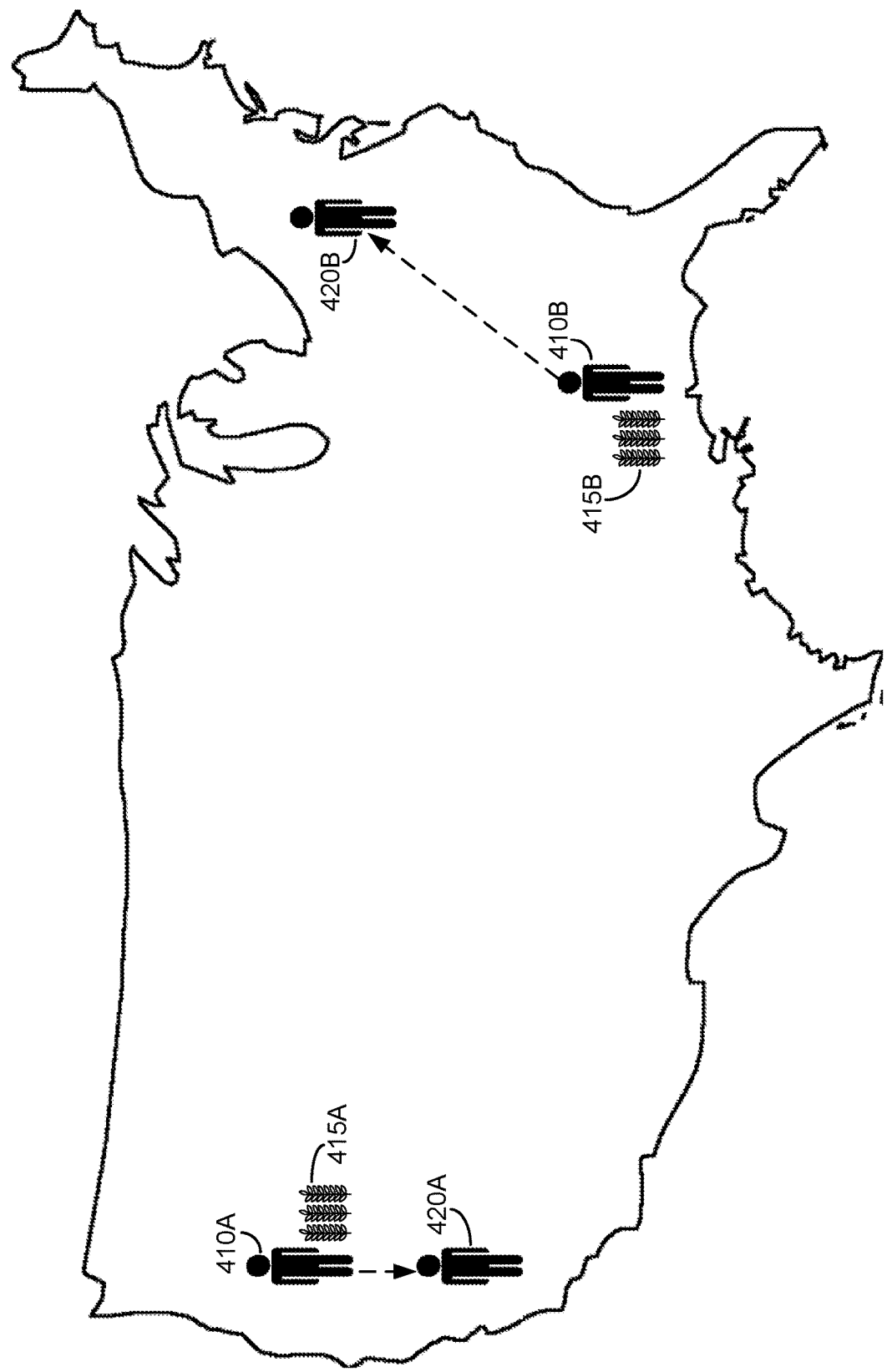

FIGS. 4A-4B illustrate an example optimization for crop transactions by the centralized crop transaction system, according to various embodiments. FIG. 4A illustrates first and second crop producers 410 contracting with the online agricultural system for selling a crop product 415 and first and second prospective acquiring entities 420 contracting with the online agricultural system for purchasing a crop product, wherein the first and second prospective acquiring entities are desirous of purchasing crop products corresponding to the crop products 415 of the crop producers 410. In other words, in some embodiments, the online agricultural system is counter-party to all contracts executed within the online agricultural system, beneficially enabling the online agricultural system to identify and match prospective sellers and buyers across a variety of crop product characteristics, pick-up/delivery locations, price ranges, and other factors, saving the prospective sellers and buyers time and resources that otherwise might be spent trying to manually identify a suitable counterparty. Having the online agricultural system acts as counterparty to all contracts reduces the costs of transactions between unknown parties by providing a trusted party who independently verifies product quality, coordinates payments and communicates the trustworthiness of one or more market participants.

In the embodiment shown in FIG. 4A, the first crop producer 410A has entered a contract via the centralized crop transaction system 110 to transfer possession of a first crop product 415A to a second prospective acquiring entity 420B. The second crop producer 410B has entered a contract via the centralized crop transaction system 110 to transfer possession of a second crop product 415B to a first prospective acquiring entity 420A. In the example of FIG. 4A, the first crop product 415A satisfies all conditions of the request from the second prospective acquiring entity 420B to purchase a crop product, and the second crop product 415B satisfies all conditions of the request from the first prospective acquiring entity 420A to purchase a crop product.

The centralized crop transaction system 110 identifies that a first distance between the first crop producer 410A and the second prospective acquiring entity 420B is greater than a second distance between the first crop producer 410A and the first prospective acquiring entity 410B. Similarly, the centralized crop transaction system 110 identifies that a third distance between the second crop producer 410B and the first prospective acquiring entity 410A is greater than a fourth distance between the second crop producer 410B and the second prospective acquiring entity 420B. Based on the respective distances, the centralized crop transaction system 110 determines whether to optimize the one or more crop product transactions between the first and second crop producers 410 and the first and second prospective acquiring entities 420.

In other embodiments, the centralized crop transaction system 110 may determine optimizations for one or more crop product transactions based on other factors. For example, the centralized crop transaction system 110 determines whether to optimize crop product transactions based on costs of transporting crop products, quality metrics for one or more crop products, changes in market conditions, or other agricultural criteria or terms. In other embodiments, the centralized crop transaction system 110 may determine optimizations for one or more crop product transactions associated with different types of crop products (e.g., in the case that one or more crop products are substitutable, for instance different types of grain, types of meal, types of oil, processed or unprocessed crop products, etc.).

FIG. 4B illustrates optimized crop product transactions for first and second crop producers 410 selling crop products 415 via the online agricultural system and first and second prospective acquiring entities 415 requesting crop products via the online agricultural system. Responsive to the centralized crop transaction system 110 determining that the first crop product 415A satisfies all terms requested by the first prospective acquiring entity 415A and that the second crop product 415B satisfies all terms requested by the second prospective acquiring entity 415B, the centralized crop transaction system alters contracts associated with the first and second crop producers 410 and the first and second prospective acquiring entities 415. The altered contracts require the first crop producer 410A to transfer possession of the first crop product 415A to the first prospective acquiring entity 420A and the second crop producer 410B to transfer possession of the second crop product 415B to the second prospective acquiring entity 420B.

In some embodiments, the centralized crop transaction system 110 modifies the contracts automatically or without explicit input from the crop producers 410 or the prospective acquiring entities 415. In other embodiments, the centralized crop transaction system 110 notifies one or more parties to the transactions (e.g., one or more of the crop producers 410 and the prospective acquiring entities 415) prior to modifying the contracts, while in other embodiments, the centralized crop transaction system 110 modifies the contracts without notifying any party to the transactions, without notifying the prospective acquiring entities 415, or without notifying the crop producers 410. In some embodiments, the centralized crop transaction system 110 automatically or without explicit input from the crop producers 410 or the prospective acquiring entities 415 reassigns the destination location of the first crop product and second crop product (for example, without modifying the contracts).

Figure 5:
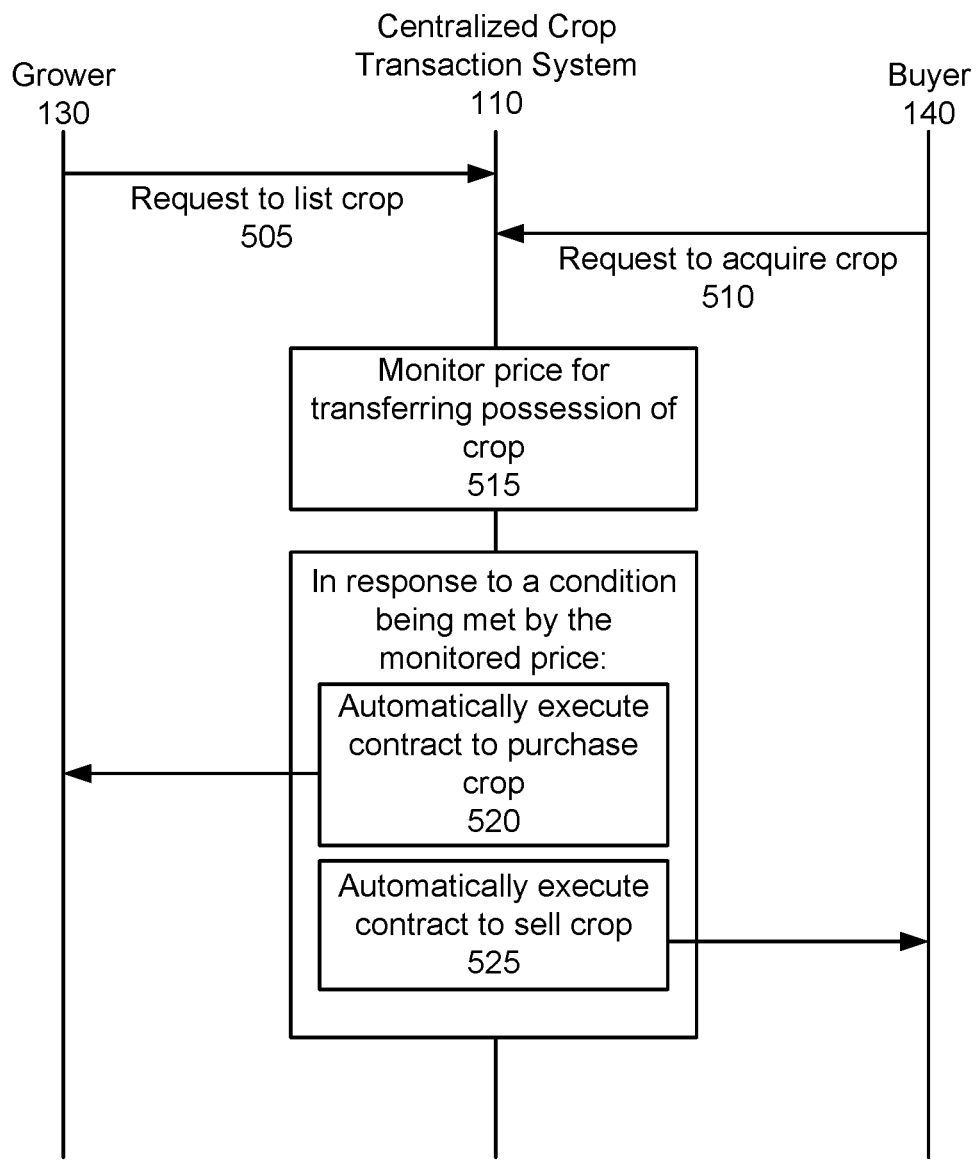
FIG. 5 illustrates example interactions between a grower, a buyer, and a centralized crop transaction system in executing transactions, according to various embodiments.

FIG. 5 illustrates example interactions between a grower, a buyer, and a centralized crop transaction system in executing transactions, according to various embodiments. A grower 130 transmits to a centralized crop transaction system 110 a first request 505 to list a crop product. The first request identifies a crop product type, a first quantity of the crop product, and a first location of the crop product. A prospective buyer 140 transmits to the centralized crop transaction system 110 a second request 510 to acquire a crop product. The second request identifies the crop product type, a second quantity of the crop product greater than or equal to the first quantity, a second price of the crop product, and a second location to which the crop product is to be delivered.

The centralized crop transaction system 110 monitors 515, by a sever in real-time, a third price. The third price is the cost associated with transferring possession of the first quantity of the crop product from the grower 130 to the prospective buyer 140. In an embodiment, the third price is based at least in part on the first location and the second location. In response to a condition being met by the monitored price, the centralized crop transaction system 110 automatically executes 520 a first contract between the centralized crop transaction system and the grower 130 to purchase the crop product from the grower and automatically executes 525 a second contract between the centralized crop transaction system and the prospective buyer 140 to sell the crop product to the buyer. For example, the centralized crop transaction system 110 automatically executes the contracts responsive to a sum of the first price and the monitored third price being equal to or less than the second price.

Figure 6:
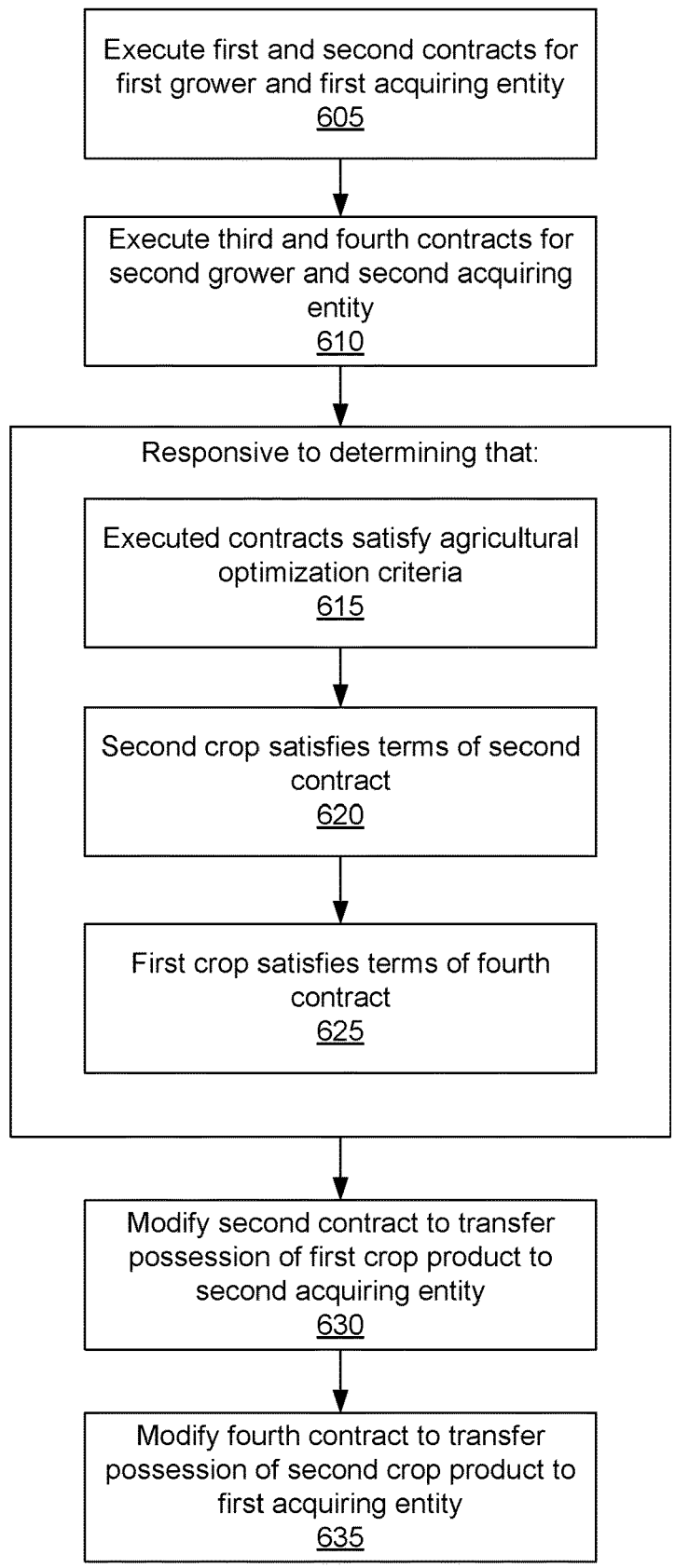
FIG. 6 illustrates an example process for modifying contracts for crop transactions based on agricultural criteria, according to various embodiments.

FIG. 6 illustrates an example process for modifying contracts for crop transactions based on agricultural criteria, according to various embodiments. In an embodiment, the steps of FIG. 6 are performed by the centralized crop transaction system 110. In other embodiments, the steps may be performed by other entities. In various embodiments, the method may include different and/or additional steps, and the steps may be performed in different orders than those described in conjunction with FIG. 6.

A centralized crop transaction system 110 automatically executes 605 contracts for a first crop producer and a first prospective acquiring entity. A first contract is executed between the centralized crop transaction system 110 and the first crop producer to purchase a first crop product from the first crop producer. A second contract is executed between the centralized crop transaction system 110 and the first prospective acquiring entity to sell the first crop product to the first prospective acquiring entity. In one embodiment, the centralized crop transaction system 110 executes the contracts responsive to a monitored price condition being met, as described above.

The centralized crop transaction system 110 automatically executes 610 contracts for a second crop producer and a second prospective acquiring entity. A third contract is executed between the centralized crop transaction system 110 and the second crop producer to purchase a second crop product from the second crop producer. A fourth contract is executed between the centralized crop transaction system 110 and the second prospective acquiring entity to sell the second crop product to the second prospective acquiring entity.

At a later time, the centralized crop transaction system 110 determines 615 that the first, second, third, and fourth contracts satisfy an agricultural criteria associated with optimizing transactions. For example, the agricultural criteria is a predicted lifespan for the first or second crop product, an optimization of crop transportation distances for the executed contracts for the first and second crop products, an agreement or request by the first and second crop producers for reassignment of delivery, an optimization of logistical savings greater than a net loss associated with the reassignment, or another criteria. The centralized crop transaction system 110 determines 620 that the second crop product satisfies one or more terms of the second contract. The centralized crop transaction system 110 further determines 625 that the first crop product satisfies one or more terms of the fourth contract.

Responsive to the determinations, the centralized crop transaction system 110 modifies 630 the second contract such that the second contract is between the centralized crop transaction system and the second prospective acquiring entity to sell the crop product of the first request to the second prospective acquiring entity. The centralized crop transaction system 110 modifies 635 the fourth contract such that the fourth contract is between the centralized crop transaction system and the first prospective acquiring entity to sell the crop product of the third request to the first prospective acquiring entity.

In other embodiments, the second and fourth contracts between the centralized crop transaction system 110 and the first and second prospective crop acquirers are not modified, and the first and second prospective crop acquirers may or may not be notified of the modifications.

In some embodiments, the first and third contracts between the centralized crop transaction system 110 and the first and second crop producers are additionally modified. For example, the first contract between the centralized crop transaction system 110 and the first crop producer is modified to arrange transportation of the crop product of the first request to a location associated with the second prospective acquiring entity. The third contract between the centralized crop transaction system 110 and the second crop producer is modified to arrange transportation of the crop product of the third request to a location associated with the first prospective acquiring entity. In other embodiments, the first and third contracts between the centralized crop transaction system 110 and the first and second crop producers are not modified, and the first and second crop producers may or may not be notified of the modifications. In some embodiments, the centralized crop transaction system 110 automatically or without explicit input from the crop producers 410 or the prospective acquiring entities 415 reassigns the destination location of the first crop product and third crop product (for example, without modifying the contracts).

Agricultural Modeling

A centralized crop transaction system 110 predicts future crop characteristics for an online agricultural system using various types of data, for example satellite data. In some embodiments, the centralized crop transaction system 110 uses current and historic data, including satellite data, as an input to a price model configured to predict future prices for a type of crop product. For example, the centralized crop transaction system 110 trains a price model using current and historic data from one or more external sources 120. The trained price model can then be used to predict a future price for a type of crop product. The centralized crop transaction system 110 may use additional models to determine different future crop characteristics. The centralized crop transaction system 110 uses predicted future crop characteristics to determine predictions of future yields for crop products, determine predictions of future demand for crop products, identify trends in crop product prices, determine whether to execute contracts for crop product transactions, and the like.

As described in conjunction with FIG. 2, the centralized crop transaction system 110 trains one or more models for predicting future crop characteristics. In some embodiments, the centralized crop transaction system 110 stores and maintains a price model used to generate a predicted future price for the crop product type. The centralized crop transaction system 110 can use supervised or unsupervised machine learning to build the price model. Different machine learning techniques—such as neural networks, k-means clustering machine learning models, reinforcement learning models, linear support vector machines (linear SVM), boosting for other algorithms (e.g., AdaBoost), logistic regressions, naïve Bayes, memory-based learning, random forests, bagged trees, decision trees, boosted trees, or boosted stumps—may be used to train the price model in different embodiments.

The price model is configured to predict future prices for a crop product based on inputs including historic crop product information, current crop product information, and the crop product type. The centralized crop transaction system 110 accesses data, including one or more of historic and current availability data, historic and current weather data, historic and current price data, and historic and current satellite and other remote sensing data, from one or more external data sources 120 for use as inputs to the price model.

Satellite and remote sensing data include one or more measurements of land, water, or atmospheric properties using reflected or emitted electromagnetic radiation collected by satellites (e.g., sun synchronous/polar orbiting; non-polar orbiting; geostationary), manned aerial vehicles, and unmanned aerial vehicles. Satellite and remote sensing data includes passive and active measurements. Passive measurements include one or more of optical measurements (e.g., reflected solar radiation, multispectral, hyperspectral), thermal measurements (e.g., emitted longwave radiation), and microwave measurements. Active measurements include one or more of radar measurements (radio detection and ranging) and lidar measurements (light imaging, detection, and ranging). Satellite and remote sensing data may be used to determine a temperature of a surface, moisture and structure of a surface, a topography of a surface, elevation of a surface, three-dimensional structure of a surface, imagery data, and the like.

In some embodiments, the centralized crop transaction system 110 accesses raw satellite and remote sensing data from one or more external data sources 120. The centralized crop transaction system 110 applies one or more algorithms to correct and extract information for use by the price model or other models. For example, the centralized crop transaction system 110 applies an atmospheric correction algorithm to calibrate and/or clean measurements associated with surface properties. In another example, the centralized crop transaction system 110 applies one or more remote sensing information extraction paradigms to estimate canopy properties (e.g., LAI, leaf chemistry, and moisture content) to identify characteristics of crop products, such as crop product types, plant health metrics, predicted yield of crop, and the like. One or more machine learning algorithms, image processing algorithms, and pattern recognition algorithms are used to extract canopy properties from the satellite and remote sensing data. The identified canopy properties and other characteristics may be used by the centralized crop transaction system 110 to compare current characteristics to historic cleaned satellite data to determine an expected yield or output for a crop product type based on coverage associated with the crop product type, an estimated volume of harvested product in storage based on detection of storage capacity (e.g., permanent storage such as silos, temporary storage such as retaining walls and bags), to delineate boundaries between fields, farms, or properties, to identify use or application of conservation management practices for locations (e.g., tillage, cover crops, residue), and to identify other trends or information describing crop product production. For example, the centralized crop transaction system 110 compares a current crop growth during a current season to a time series of historic crop growths for the season (e.g., comparing a current crop growth during a summer season to historic crop growths during summer) to determine an expected yield for the current crop growth based on historic yields.

In some embodiments, the price model predicts future prices, directions of future price movement, and future price ranges based at least in part on a correlation between a historic quantity of a crop product type and historic prices of the crop product type within the online agricultural system. In some embodiments, the price model predicts future prices, directions of future price movement, and price ranges based at least in part on a correlation between historic quantities of a crop product type and a current available quantity of the crop product type within the online agricultural system. In some embodiments, the price model predicts future prices, directions of future price movement, and price ranges based at least in part on a correlation between estimates of historic availability of a crop product type determined from historic satellite data and an estimate of current availability of the crop product type determined from current satellite data. In some embodiments, the price model predicts future prices, directions of future price movement, and price ranges based at least in part on a correlation between historic prices of a crop product type within the online agricultural system and current prices of the crop product type within the online agricultural system. In some embodiments, the price model predicts future prices, directions of future price movement, and price ranges based at least in part on a correlation between historic weather conditions and historic prices of the crop product type within the online agricultural system. In some embodiments, the price model predicts future prices, directions of future price movement, and price ranges based at least in part on a correlation between historic plant health, crop yield and or crop production area inferred from remote sensing data. In other embodiments, the price model predicts future prices, directions of future price movement, and price ranges based on one or more additional or different correlations, trends, or data. It should be noted that the correlations between historic data and current data described herein can be based on temporally consistent data (e.g., the historic data refers to data from a particular time of the year, such as a date, month, or season, corresponding to the current data).

The centralized crop transaction system 110 displays the predicted future prices, directions of future price movement, and/or price ranges to users of the online agricultural system for use in or in conjunction with submitting crop product listings. In some embodiments, other predicted future crop characteristics are additionally presented to users of the online agricultural system. In some embodiments, the centralized crop transaction system 110 presents predicted future prices for crop products as a range of expected prices of the crop product, a maximum expected price of a crop product, an average or mean expected price of the crop product, or another measure or range of expected price of the crop product. In some examples, the displayed measure of the expected crop product price is associated with a crop product being sold before a threshold date or within a threshold date range. In some embodiments, the centralized crop transaction system 110 additionally displays one or more of: an indication that an expected future price for a crop product is higher or lower than a current price for the crop product; a narrative or graphical explanation of why a future price is expected to be higher or lower than a current price of the crop product, based at least in part on current crop product information and/or historic crop product information; a recommendation to a crop producer to sell a crop product before a threshold date; a recommendation to a crop producer to delay selling a crop product until after a threshold date; a recommendation to a prospective acquiring entity to purchase a crop product before a threshold date; and a recommendation to a prospective acquiring entity to delay purchasing a crop product until after a threshold date. In some embodiments, the centralized crop transaction system 110 additionally presents one or both of the current price of the crop product type and historic prices of the crop product type within the interface.

Figure 7A:
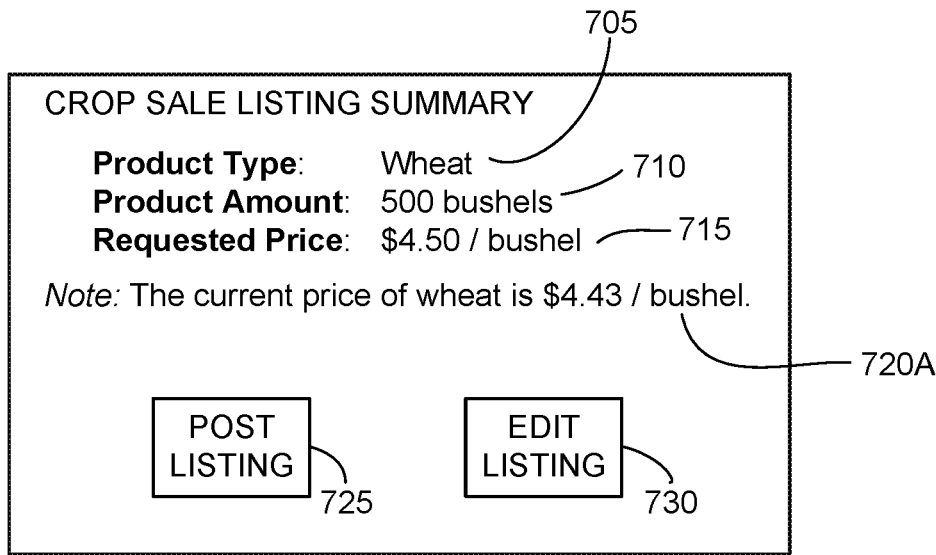
FIGS. 7A-E illustrate example user interfaces for notifications for client devices from the centralized crop transaction system, according to various embodiments.

FIGS. 7A-D illustrate example user interfaces for notifications for client devices from the centralized crop transaction system, according to various embodiments. FIG. 7A illustrates an example user interface for a crop producer submitting a crop product listing to the online agricultural system, the user interface displaying information describing the available crop product and a notification 720A identifying a current price for the crop product type. In the example of FIG. 7A, the user interface displays information describing the available crop product including a product type 705 ("Wheat"), a product amount 710 ("500 bushels"), and a requested price 715 ("$4.50/bushel"). Responsive to the centralized crop transaction system 110 determining a current price for the crop product type, the user interface is modified to include a notification 720A including the current price ("Note: The current price of wheat is $4.43/bushel."). In other examples, the notification 720A includes additional or different information or text, graphical data, or images describing the current price of the crop product. A crop producer viewing the crop product listing may elect to post the listing via a first selectable interface element 725 or to modify one or more fields of the listing via a second selectable interface element 730, a modification being potentially based on the current price of the crop product identified in the notification 720A. For example, responsive to viewing the notification 720 identifying a current price of the crop product to be higher or lower than the requested price 715 of the crop product listing, a crop producer may elect to modify the requested price of the crop product listing accordingly in order to maximize profitability and/or a likelihood of purchase.

Figure 7B:
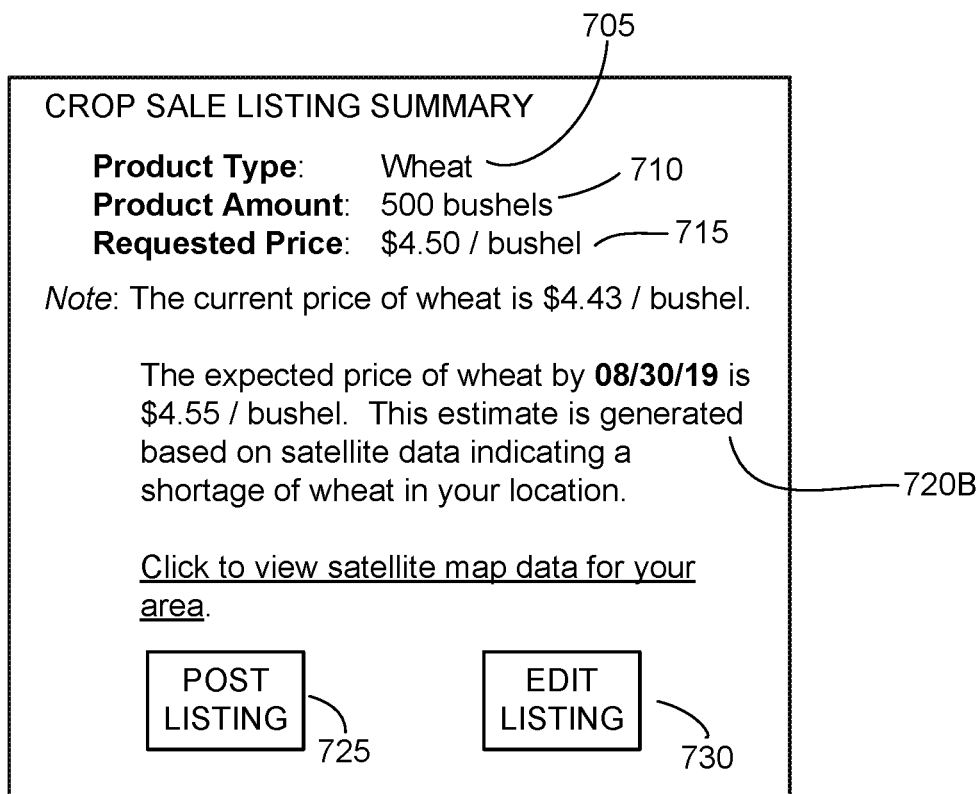

FIG. 7B illustrates an example user interface for a crop producer submitting a crop product listing to the online agricultural system, the user interface displaying information describing the available crop product and a notification 720B identifying a current price for the crop product, a predicted future price for the crop product, and a narrative explanation of the predicted future price. As in the example of FIG. 7A, the user interface of FIG. 7B displays to the crop producer a summary including a product type 705, a product amount 710, and a requested price 715. Responsive to the centralized crop transaction system 110 determining a current price for the crop product type and a predicted future price for the crop product type based at least in part on satellite data, the user interface is modified to include a notification 720B. In the example of FIG. 7B, the notification 720B identifies a current price ("The current price of wheat is $4.43/bushel"), the predicted future price ("The expected price of wheat by Aug. 30, 2019 is $4.55/bushel"), and a narrative explanation for the predicted future price ("This estimate is generated based on satellite data indicating a shortage of wheat in your location. Click to view satellite map data for your area."). The crop producer viewing the crop product listing may then elect to post the listing via the first selectable interface element 725 or to modify the crop product listing via a second selectable interface element 730.

In some embodiments, the user interface for a crop producer submitting a crop product listing will additionally display submitted, predicted, or measured quality metrics of the crop product to be listed. For example, quality metrics of the crop product, as discussed previously in conjunction with FIG. 2, may be entered manually by the crop producer, entered automatically via measurements taken by a production supply or inventory management system, or predicted based on one or more of historic quality metrics, current satellite data associated with a location of the crop producer, and other current data. Measurements of crop quality may be based on agricultural products in storage or in production (e.g., crops in the field, crops undergoing one or more processing operations), and may be updated at one or more intervals, such as before, during, or after storage; before, during, or after transport; before or after contracting; and before or after delivery. In some embodiments, a kit is provided for sampling one or more quality metrics. In some embodiments, a representative (for example, one or more of prospective acquiring entities, the online agricultural system, transportation entities, or storage serves) collects one or more quality metrics. In some embodiments, a handheld device or one or more devices in a mobile laboratory is used in a quality test. A mobile laboratory may comprise one or more of the following devices: a transportation means, a test device, a reporting device (e.g., a printer or device capable of sending or receiving electronic communication), a geolocation device, and a data storage device including an electronically programmable memory (e.g., a solid-state, non-volatile computer storage medium). The transportation means may be, for example, an autonomous or non-autonomous vehicle capable of traveling by land or air, including a car, truck, farm equipment, unmanned aerial vehicle, plane, helicopter, drone, robot, or the like. The test device may be, for example, one or more of: a DNA sequencer, a spectrometer (for example, a near infrared spectrometer), a grain scale dockage tester, a Dumas instrument, a moisture meter, a falling number meter, or the like.

Figure 7C:
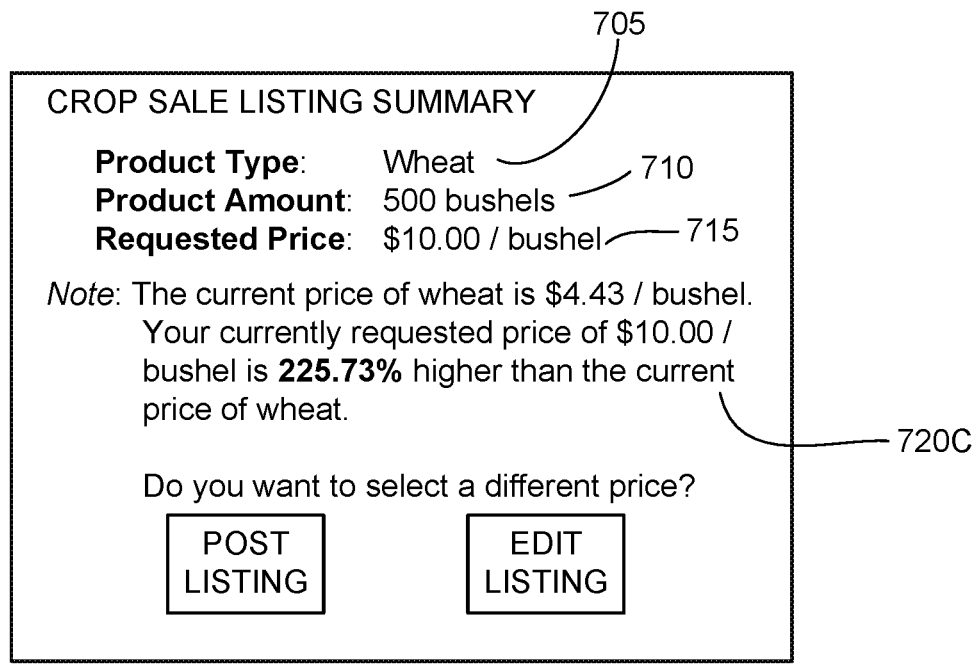

FIG. 7C illustrates an example user interface for a crop producer submitting a crop product listing to the online agricultural system, the user interface displaying information describing the available crop product and a notification 720C identifying a current price for the crop product and flagging a requested price identified as abnormal. As in the example of FIG. 7A, the user interface of FIG. 7C displays to the crop producer a summary including a product type 705, a product amount 710, and a requested price 715 ("$10.00/bushel").

In some embodiments, the centralized crop transaction system 110 implements anomaly detection based on current prices for crop product types. The centralized crop transaction system 110 uses one or more techniques (e.g., moving averages, moving standard deviations) to create daily thresholds for variability for a given crop producer, a given crop product, and a surrounding market of the crop producer. Responsive to a price of a submitted crop product listing being outside of the threshold for variability, the centralized crop transaction system 110 identifies the crop product listing as anomalous.

In the example of FIG. 7C, responsive to the crop product listing being identified as anomalous, the user interface is modified to include a notification 720C to the crop producer indicating that the submitted price is anomalous. As shown in the example of FIG. 7C, the centralized crop transaction system 110 identifies and notifies the crop producer of a difference between the current price and the requested price 715 exceeding an expected value ("Your current requested price of $10.00/bushel is 225.73% higher than the current price of wheat."). In other examples, a threshold or expected value may be different, and a difference between the current price and the requested price 715 may be displayed using different expressions (e.g., as a ratio, as a fraction, as a magnitude) or different forms (e.g., using a graph or image).

In some embodiments, the centralized crop transaction system 110 automatically removes the crop product listing responsive to determining that the associated price is anomalous. In other embodiments, the centralized crop transaction system 110 automatically blacklists or flags the crop producer associated with the crop product listing responsive to determining that the price is anomalous.

Figure 7D:
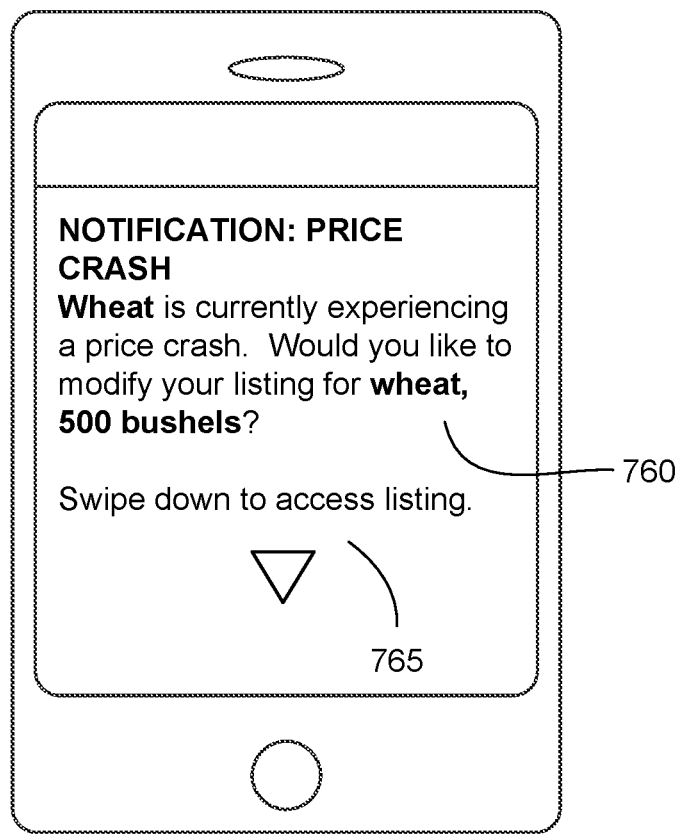

FIG. 7D illustrates an example user interface for a crop producer associated with a crop product listing on the online agricultural system, the user interface displaying information describing a price event impacting the crop product listing. A price event is any market event that occurs or is predicted to occur that impacts a current price or predicted future price for a crop product. In some embodiments, the centralized crop transaction system 110 transmits notifications for noteworthy price events. For example, the centralized crop transaction system 110 transmits a notification for one or more of: a price crash, a price boost, a supply shortage, a supply increase, new market participants (e.g., new buyers or new sellers), urgent or short term price availability (e.g., the next 20 minutes, the next hour, etc.), news events, and the like. In the embodiment of FIG. 7D, the notification 760 is transmitted for display on a mobile client device (e.g., a smartphone) associated with the crop producer, for instance via SMS message, within or outside of the context of an application associated with the centralized crop transaction system 110, or within a notification interface of a client device operating system. The notification 760 identifies a current or predicted future price event ("NOTIFICATION: PRICE CRASH" and an expected impact on one or more specified crop product listings associated with the crop producer ("Wheat is currently experiencing a price crash. Would you like to modify your listing for wheat, 500 bushels?"). The user interface additionally includes an invitation 765 for the crop producer to access the online agricultural system to view or modify the specified crop product listings ("Swipe down to access listing."), such that a crop producer is able to easily perform one or more actions within the online agricultural system in response to the price event. In other embodiments, the notification is transmitted for display on different client devices (e.g., a desktop computer) associated with the crop producer and may provide different or additional methods for viewing or interacting with the notification.

Figure 7E:
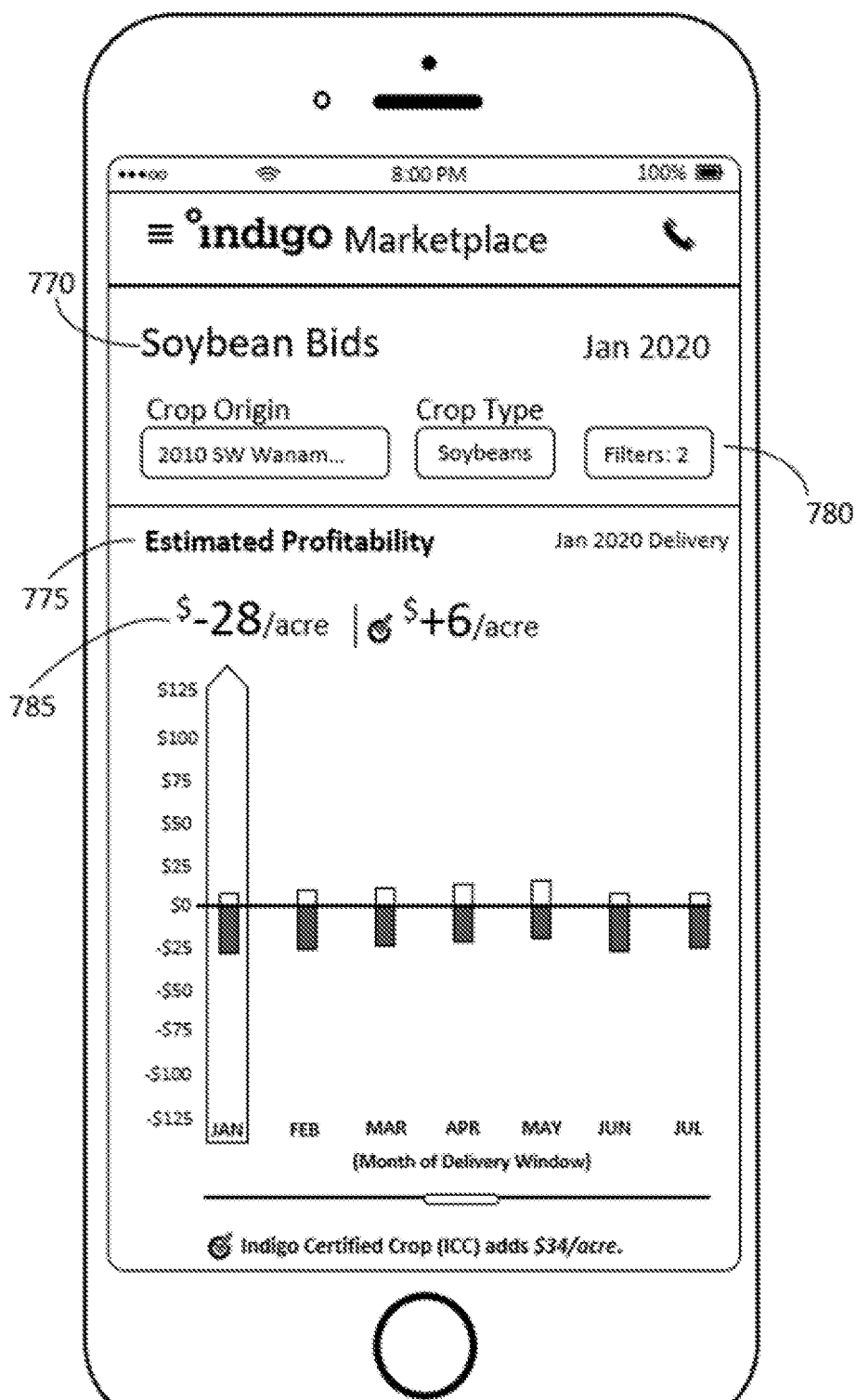

FIG. 7E illustrates an example user interface for a crop producer associated with a crop product listing on the online agricultural system, the user interface displaying information describing an estimated profitability for the crop product listing based on one or more factors. Based on data associated with a crop product listing submitted by the crop producer, the centralized crop transaction system 110 determines an estimated profitability 775 for the crop product type 770. In some embodiments, the crop product type is additionally associated with one or more filters 780 describing, for example, quality metrics of the crop product or other factors associated with the crop product.

In the example of FIG. 7E, the user interface displays information describing an estimated profitability of the crop product listing based on a month of delivery window. For a first selected month ("January") the estimated profitability for an identified crop product 770 is determined based on a current expected market profitability for a base crop product ("$-28/acre" for soybeans) and based on additional characteristics of the crop product that affect the expected price of the crop product ("Indigo Certified Crop (ICC) adds $34/acre"). For example, additional characteristics of the crop product may be one or more quality metrics of a listed crop product. The end result is an estimated profitability displayed within the interface ("$+6/acre"). To compute an expected profitability for a crop product, an estimated profitability benefit of each of one or more characteristics of the crop product can be computed and added to an expected profitability for a crop product without those features, and a set of predicted costs associated with the crop product (such as transportation and storage costs) can be subtracted from the sum to generate the expected profitability for the crop product.

In further examples, the user interface displays information describing an estimated profitability of the crop product listing based on one or more other factors, such as transportation costs, storage costs, processing costs, additional quality metrics or crop product characteristics, and the like. In addition, the user interface can display information describing the effect one or more quality metrics, production practices, storage practices, or transportation and delivery practices that are not listed or practiced for the current crop product listing would have on price and/or profitability of future crop products should they be practiced or implemented. For example, production practices can be recommended to a crop producer and the corresponding effect on profitability can be displayed in order to encourage the crop producer to adopt such practices. Examples of such practices include the use of crop rotation, fertilizers, herbicides, pesticides, or other treatments impacting a quality metric of the crop product; organic and/or non-GMO crop production; an application of watering, aeration, or other techniques; regenerative soil health practices such as no-till or low-till cultivation; and the like.

In some embodiments, the user interface displays crop listings to a user of the centralized crop transaction system 110 in a particular order. For instance, for a crop producer looking for offers to purchase a crop product, the user interface can (either automatically or at the request of the crop producer) order a set of crop listings based on an offered priced by each corresponding potential acquisition entity, based on an offered priced minus an expected total cost of selling to a potential acquisition entity (e.g. accounting for transportation, storage costs, and/or processing costs), based on an expected profitability associated with selling to each potential acquisition entity), based on a translated price offered by each potential acquisition entity (accounting for crop product quality, distance, and/or expected environmental or weather conditions), or based on any other suitable factor. Likewise, a potential acquisition entity looking for offers to sell a crop product can view crop listings prioritized based on similar factors, based on a price for each crop listing translated to account for transportation costs, and the like. In some embodiments, a user may filter the crop listings displayed on their user interface based. For example, the user may choose to view only certain elements of a crop listing (e.g. a user may select to only see the crop product price and crop product type for each crop listing) or the user may choose to view listings having specific values for elements of the crop listing (e.g. a user may select to view listings have a crop location within a certain number of miles from their current location).

In some embodiments, additional data can be displayed to crop producers in order to help crop producers optimize crop production and/or profitability. For instance, inventory data, demand opportunities, quality metrics before or after storage, feedback from marketplace participants including inferences from transaction history, historical reported inventories and demand opportunities, spot prices, local and global market trends, consumer demand and demographics, past and present weather conditions, and the like can be displayed to a crop producer for use in optimizing crop production. Data on differences between reported quality metrics and quality metrics independently verified (e.g., at delivery) can be presented to a crop producer or acquisition entity to inform, for example, supplier trustworthiness, production optimization, and/or selection of storage types and/or transportation methods for specific crops, crop qualities, or climates. In some embodiments, current or future payments (for example, relative to future transactions) to a supplier can be reduced based on differences between reported quality metrics and quality metrics independently verified.

In some embodiments, the additional data displayed to crop producers in order to help crop producers optimize crop production and/or profitability includes crop product optimization advice and or instructions. Crop production optimization is described further in U.S. application Ser. No. 16/057,387, filed Aug. 7, 2018, and hereby incorporated by reference in its entirety. Crop production optimization can include prescriptive advice which may be communicated to suppliers, in particular crop producers, by means of an electronic communication to the supplier or one or more pieces of equipment (for example tractor, robot or drone) in addition to a client device (such as a mobile device). For example, a farm specific nitrogen management plan could be communicated to a device capable of implementing the plan without further human intervention, resulting in an altered rate, time, or source of nitrogen application; similarly, a differential harvesting map could be automatically programmed from the collected data in on or more databases of the marketplace, including maps or satellite imagery of one or more of a farmer's fields and communicated to that farmer's harvesting equipment.

In some embodiments, production optimization results in prescriptive advice. In some embodiments, prescriptive advice is communicated to acquisition entities, such as manufacturers, by means of an electronic communication to the buyer or one or more system or piece of equipment (e.g., storage equipment, inventory control systems, formulation systems, manufacturing) in addition to a client device (such as a mobile device). For example, a product reformulation based on actual or predicted changes in the quantity, quality, or price of production or more agricultural product is communicated to a device capable of implementing the plan without further human intervention, resulting in improved profitability.

Figure 8:
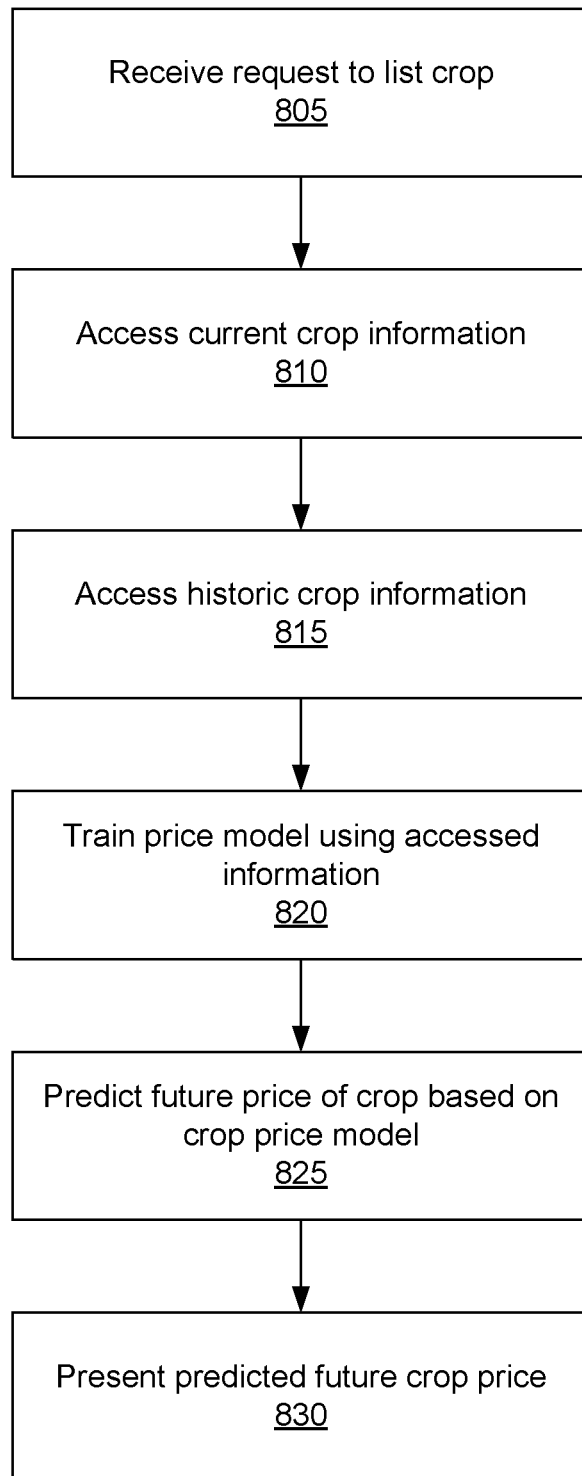
FIG. 8 illustrates an example process for using a machine learning model to determine future prices for crops, according to various embodiments.

FIG. 8 illustrates an example process for using a machine learning model to determine future prices for crops, according to various embodiments. In an embodiment, the steps of FIG. 8 are performed by the centralized crop transaction system 110. In other embodiments, the steps may be performed by other entities. In various embodiments, the method may include different and/or additional steps, and the steps may be performed in different orders than those described in conjunction with FIG. 8.

A centralized crop transaction system 110 receives 805, from a crop producer, a request to list a crop product. The first request identifies a type of crop product, a quantity of the crop product, and a location of the crop product. In some embodiments, a location of the crop product may be a field, storage facility, or other pick-up location. In other embodiments, a location of the crop product may also encompass a threshold distance (e.g., a 10 mile radius) surrounding a location where the crop was produced or may be a county and state within which the crop was produced. The centralized crop transaction system 110 accesses 810 current crop product information including a current available quantity and current price of the type of crop product associated with the location of the crop product and current satellite data for the location of the crop product. The centralized crop transaction system 110 accesses 815 historic crop product information including historic quantities and historic prices of the type of crop product associated with the location of the crop product and historic satellite data for the location of the crop product. In some embodiments, the current and/or historic crop product information may include additional sources or types of information.

The centralized crop transaction system 110 trains 820 a price model for the crop product using the accessed current crop product information and the accessed historic crop product information. The centralized crop transaction system 110 predicts 825 a future price for the crop product of the request using corresponding historic and current crop data as inputs to the crop model, and presents 830 the predicted future price of the crop product within an interface for display by a client device of the crop producer. In some embodiments, the centralized crop transaction system 110 suggests a current price for the crop product of the request using corresponding historic and current crop data as inputs to the crop model, and presents the suggested price of the crop product within an interface for display by a client device of the crop producer. In this example, the interface may include an option for the crop producer to select the suggested price as the crop product price of their request to list a crop product.

Value Translation in an Online Agricultural System

Prices submitted by crop producers and prospective acquiring entities for crop product listings on an online agricultural system may not accurately reflect a final price for transferring possession of the associated crop product from a crop producer to a prospective acquiring entity. Likewise, a price listed by a crop producer for a first crop product may not reflect the final price paid by a prospective acquiring entity for processing the first crop product to produce a second crop product. Factors including transportation costs, storage costs, processing costs, and the like may impact a final cost for the transfer of possession of the crop product, and likewise may impact profitability for crop producers. For example, processing costs for converting a raw crop product to a processed agricultural good (e.g., sunflower seeds to sunflower oil; wheat to flour) may incur cost to a crop producer or prospective acquiring entity external to the price of the raw crop product. Crop producers and prospective acquiring entities searching for opportunities to purchase or sell crop products may therefore benefit from a system wherein displayed prices accurately reflect a final price of transferring possession of the crop product, including processing or other costs. In another example, a crop producer or prospective acquiring entity searching for opportunities to purchase or sell crop products may benefit from a system wherein opportunities for commonly substituted goods are displayed in conjunction with opportunities for the identified crop product (e.g., vegetable oil as a substitute for sunflower seed oil; a first grain or grain mix as a substitute for a second grain or grain mix).

The centralized crop transaction system 110 identifies, for a crop product type, one or more opportunities associated with the purchase or sale of the crop product type, a processed variant of the crop product type, and/or commonly substituted crop product types. For each opportunity, the centralized crop transaction system 110 determines a translated price, the translated price reflecting a final cost of transferring possession of the crop product from a crop producer to a prospective acquiring entity. In some embodiments, the centralized crop transaction system 110 determines a translated price in conjunction with a crop transportation system 150 or one or more transportation entities 160 associated with the online agricultural system.

In some embodiments, the centralized crop transaction system 110 identifies, for each opportunity to purchase or sell a crop product, a first location identified via a request to sell the crop product by a crop producer and a second location identified via a request to purchase the crop product by a prospective acquiring entity. In one example, the centralized crop transaction system 110 determines a translated price for the crop product based on a price requested by the crop producer and a transportation cost to transport the crop product from the first location to the second location. In another example, the centralized crop transaction system 110 determines a translated price for the crop product based on a price offered by the prospective acquiring entity and a transportation cost to transport the crop product from the first location to the second location. The determination of transportation costs and prices is discussed in greater detail below.

In other examples, the centralized crop transaction system 110 determines a translated price for the crop product based at least in part on one or more factors impacting transportation cost, including one or more of a distance between the first location and the second location, a quantity of the crop product offered by the crop producer, a quantity of the crop product requested by the prospective acquiring entity, a cost associated with a drop-off window identified by the prospective acquiring entity for delivery of the crop product to the second location, a cost associated with a pick-up window identified by the crop producer for pick-up of the crop product at the first location, and the like. In some embodiments, the centralized crop transaction system 110 determines translated prices only for crop products identified by a crop producer as available for delivery during the drop-off window specified by the prospective acquiring entity. In some embodiments, the centralized crop transaction system 110 determines translated prices only for crop products identified by a prospective acquiring entity as available for pick-up during the pick-up window specified by the crop producer.

In some embodiments, the centralized crop transaction system 110 determines a translated price based on substitute crop products. As previously noted, a substitute crop product identified by the centralized crop transaction system 110 is a first crop product type that may replace or be converted to a second crop product type. For example, a substitute crop product for sunflower seed oil may be vegetable oil or olive oil. In another example, a substitute crop product for flour may be wheat that, via one or more processing steps, can be converted to flour. The centralized crop transaction system 110 determines a translated price for a crop product based at least in part on a price for converting a first crop product type offered by a crop producer to a second crop product type requested by a prospective acquiring entity. In cases where the requested crop product type is a processed variant of the offered crop product, the translated price is based on the cost of performing one or more processing steps. Some examples include: a requested crop product is a processed oilseed and a crop product offered by a crop producer is unprocessed oilseed; the requested crop product is a food-grade oil and the crop product offered by a crop producer is an unprocessed crop capable of being processed into the type of food-grade oil; and the requested crop product is an oil with a specified fatty acid profile and the crop product offered by a crop producer is an unprocessed crop capable of being processed into an oil with the specified fatty acid profile.

In some embodiments, the centralized crop transaction system 110 determines a translated price for a crop product based at least in part on one or more factors associated with a crop product quality. For example, the translated price for the crop product is based on one or more quality metrics identified via a request by the crop producer, one or more quality metrics identified via a request by the prospective acquiring entity, one or more quality metrics identified via a request by the crop producer that satisfy one or more quality metrics identified via a request by the prospective acquiring entity, and the like. In one example, the requested crop product is a non-GMO crop product and the crop product offered by a crop producer is an organic crop product. In such an example, the offered organic crop product is a non-GMO crop product by virtue of its organic certification, and thus the organic crop product satisfies the non-GMO quality metric requested by the prospective acquiring entity.

The centralized crop transaction system 110 modifies a user interface to display to a user of the online agricultural system the one or more translated prices for crop product listings. In an embodiment, the centralized crop transaction system 110 modifies the user interface to include one or more characteristics of a crop producer or prospective acquiring entity associated with each price in the set of the translated prices. For example, the user interface is modified to display a location of a crop producer or prospective acquiring entity impacting the translated price for the crop product or one or more processing options impacting the translated price for the crop product.

Figure 9:
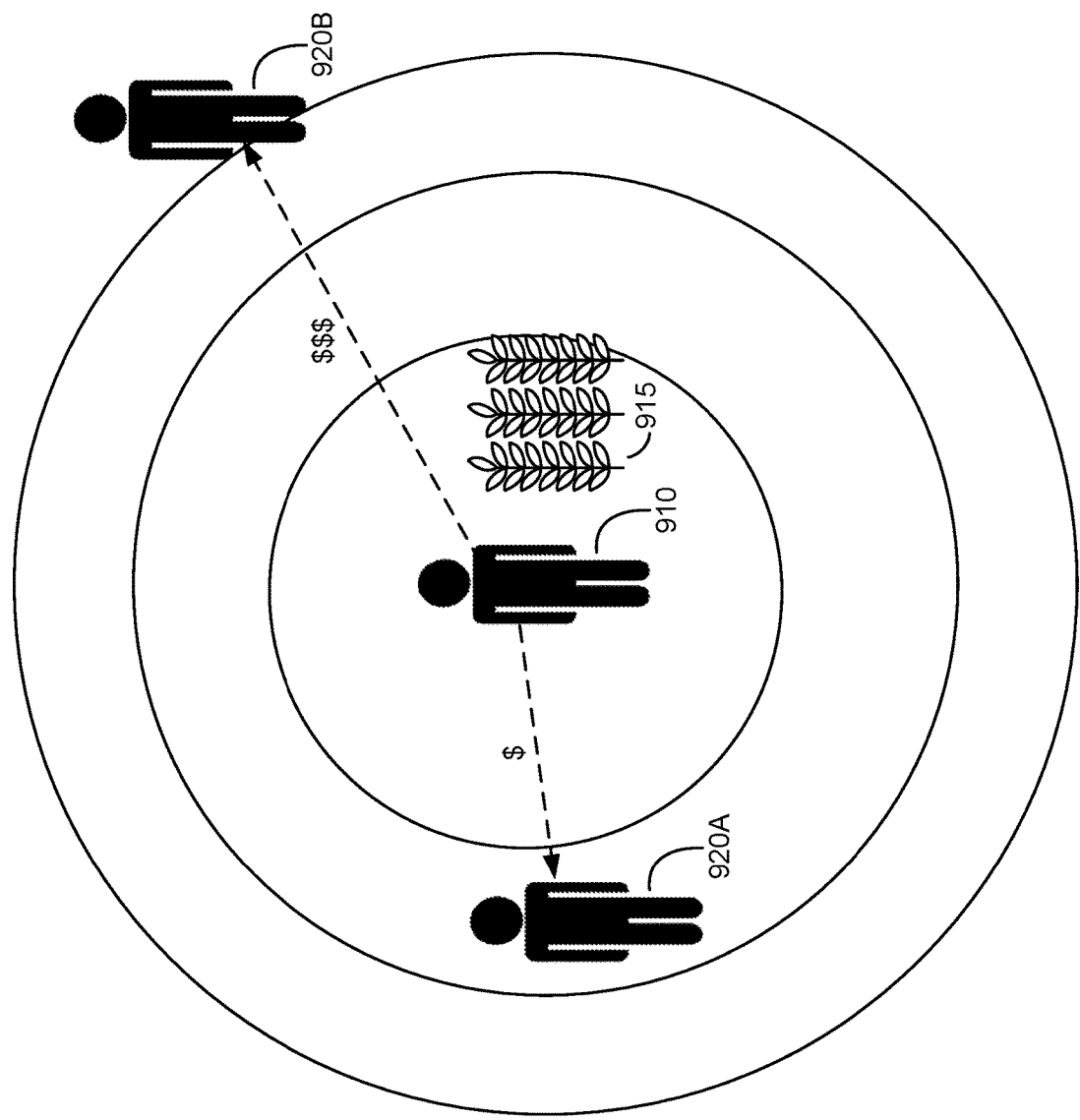
FIG. 9 illustrates an example for identifying transaction opportunities based at least in part on translated prices determined from crop destinations, according to various embodiments.

FIG. 9 illustrates an example for identifying transaction opportunities based at least in part on translated prices determined from crop locations, according to various embodiments. A crop producer 910 accesses an online agricultural system to sell a crop product 915. Responsive to the crop producer 910 requesting listing the crop product (the listing including at least a crop product type and a first location of the crop product), the centralized crop transaction system 110 identifies one or more prospective acquiring entities 920 associated with a corresponding request to acquire a crop product. In the embodiment of FIG. 9, the one or more prospective acquiring entities 920 request the crop product type of the crop product 915 associated with the crop producer 910.

A first prospective acquiring entity 920A offers a first price for the crop product 915. The first prospective acquiring entity 920A identifies a location for delivery of the crop product a first distance from the crop producer 910. A second prospective acquiring entity 920B offers a second price for the crop product 915. The second prospective acquiring entity 920B identifies a location for delivery of the crop product a second distance from the crop producer 910. In other examples, additional prospective acquiring entities are identified by the centralized crop transaction system 110. In the example of FIG. 9, the first price offered by the first prospective acquiring entity 920A is lower than the second price offered by the second prospective acquiring entity 920B. However, because the second prospective acquiring entity 920B identifies a location a greater distance from the crop producer 910 than the location identified by the first prospective acquiring entity 920B, factors including transportation costs for delivering the crop product 910 to complete a transfer of possession may impact a final price for the transaction.

In order to make a comparison between the first opportunity to transact with the first prospective acquiring entity 920A and the second opportunity to transact with the second prospective acquiring entity 920B, the centralized crop transaction system 110 determines a translated price for each opportunity. For example, the centralized crop transaction system 110 determines a first transportation cost associated with delivering the crop product 915 from a location of the crop producer 910 to the location for delivery of the first prospective acquiring entity 920A and determines a second transportation cost associated with delivering the crop product from the location of the crop producer to the location for delivery of the second prospective acquiring entity 920B. In some embodiments, the centralized crop transaction system 110 determines transportation costs for the opportunities in association with a crop transportation system 150 of the online agricultural system (e.g., by selecting a transportation entity 160 associated with a lowest price for performing the delivery). In other embodiments, the centralized crop transaction system 110 determines transportation costs for the opportunities based on data from one or more external data sources 120 describing information impacting transportation of the crop product 915, such as gas prices for an area including the locations, weather conditions for the area, equipment requirements, transportation entity availability for the area, seasonality for the crop product or other crop products within the area, and road mileage between the locations. In some embodiments, the centralized crop transaction system 110 determines translated prices for the opportunities by additively combining the corresponding offered price and transportation cost.

The centralized crop transaction system 110 modifies a user interface for the crop producer 910 to display the one or more opportunities to transact with the prospective acquiring entities 920, the modified user interface including the corresponding translated prices. In some embodiments, the modified user interface additionally includes an explanation or components of the translated prices. For example, the modified user interface includes a transportation entity associated with the determined transportation cost or one or more factors (e.g., mileage, gas prices, etc.) impacting a determined transportation cost. In some embodiments, the modified user interface additionally displays the prices offered by the prospective acquiring entities (e.g., an original offered price and a translated price). The modified user interface is configured such that, responsive to an indication or selection of an opportunity by the crop producer 910, one or more contracts for the transfer of possession of the crop product 915 are executed between the crop producer, the centralized crop transaction system 110, and the selected prospective acquiring entity.

Figure 10:
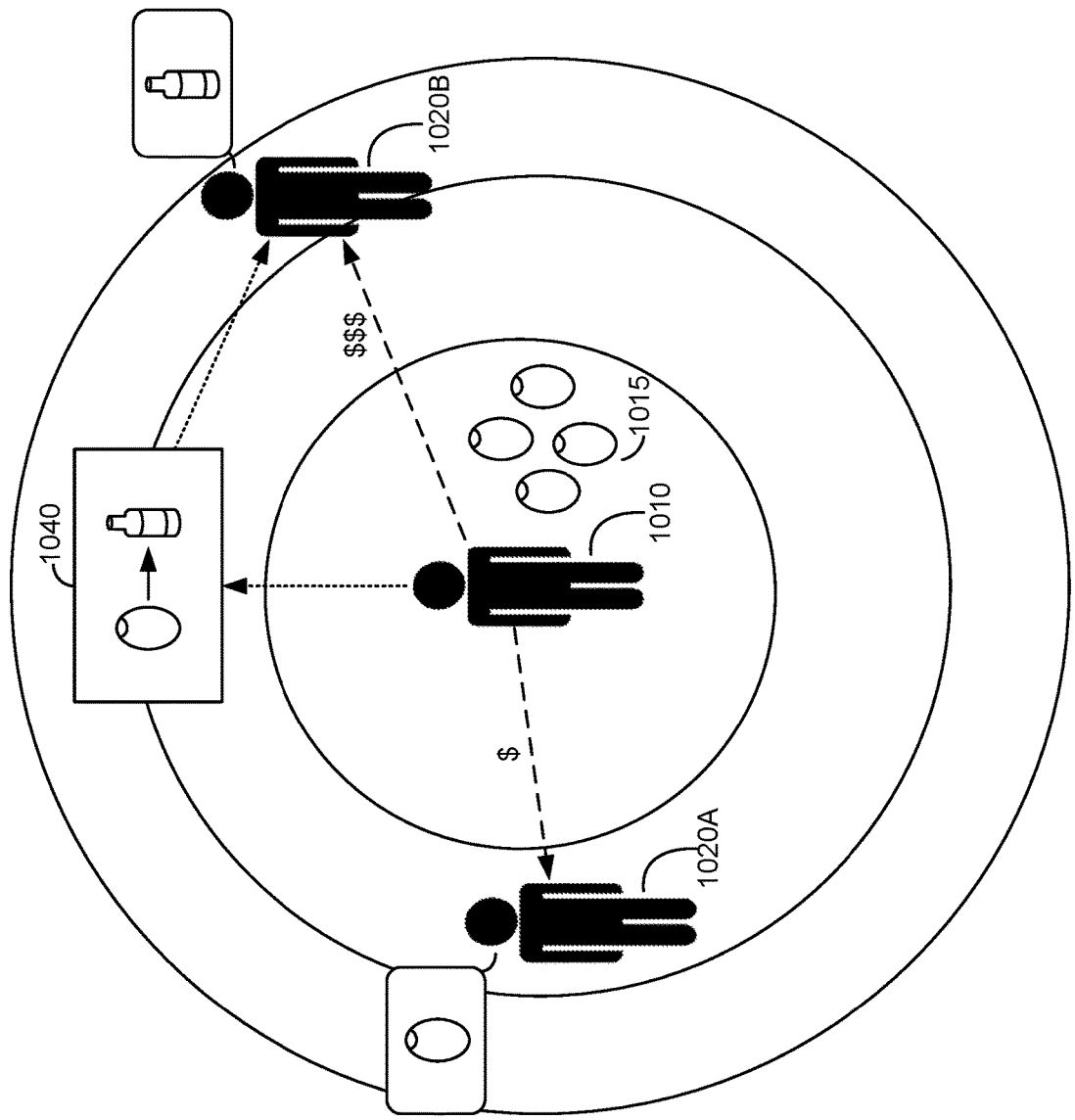
FIG. 10 illustrates an example for identifying transaction opportunities based at least in part on a translated price determined for alternate crop products, according to various embodiments.

FIG. 10 illustrates an example for identifying transaction opportunities based at least in part on a translated price determined for alternate crop products, according to various embodiments. A crop producer 1010 accesses an online agricultural system to sell a crop product 1015 (e.g., olives). Responsive to the crop producer 1010 requesting the crop product listing, including at least a crop product type and a first location of the crop product, the centralized crop transaction system 110 identifies one or more prospective acquiring entities 1020 associated with a corresponding request to acquire a crop product. In the embodiment of FIG. 10, the one or more prospective acquiring entities identify a crop product type that is the crop product 1015 (e.g., olives) or is a processed crop product variant that the crop product is capable of being processed into (e.g., olive oil).

A first prospective acquiring entity 1020A offers a first price for the crop product 1015. The first prospective acquiring entity 1020A identifies a location for delivery of the crop product a first distance from the crop producer 1010. A second prospective acquiring entity 1020B offers a second price for a processed crop product that the crop product 1015 is capable of being processed into. The second prospective acquiring entity 1020B identifies a location for delivery of the processed crop product a second distance from the crop producer 1010. In other examples, additional prospective acquiring entities are identified by the centralized crop transaction system 110. In the example of FIG. 10, the first price offered by the first prospective entity 1020A is lower than the second price offered by the second prospective acquiring entity 1020B. However, because the second prospective acquiring entity 1020B identifies a processed crop product requiring that the crop product 1015 undergo one or more processing steps prior to delivery to the second prospective acquiring entity, factors including processing costs and transportation costs to complete a transfer of possession may impact a final price for the transaction.

To make a comparison between the first opportunity to transact with the first prospective acquiring entity 1020A and the second opportunity to transact with the second prospective acquiring entity 1020B, the centralized crop transaction system 110 determines a translated price for each opportunity. The centralized crop transaction system 110 identifies one or more processing steps 1040 required to convert the crop product 1015 to the requested crop product type identified by the second prospective acquiring entity 1020B. The centralized crop transaction system 110 identifies one or more entities for performing the processing steps 1040 and identifies a processing cost associated with each entity. In some embodiments, the entity for performing the processing steps 1040 is a third-party entity associated with the online agricultural system. The centralized crop transaction system 110 selects an entity for performing the processing steps 1040 based at least in part on a processing cost associated with the entity, a distance between the location of the crop producer 1010 and a location for the processing, and a distance between the location for the processing and the location for delivery identified by the second prospective acquiring entity 1020B. In some embodiments, the selection is additionally performed based at least in part on a rating for the entity, a quality metric or quality guarantee for the entity, a preference for the entity indicated by the crop producer 1010 and/or the second prospective acquiring entity 1020B, and the like.

In some embodiments, the centralized crop transaction system 110 additionally determines transportation costs associated with each opportunity, as described further in conjunction with FIG. 9. For example, a transportation cost for the second opportunity to transact with the second prospective acquiring entity 1020B is determined based on a first transportation from the location of the crop producer 1010 to a location for processing 1040 and a second transportation from the location for processing to the location for delivery identified by the second prospective acquiring entity 1020B.

The centralized crop transaction system 110 determines translated prices for each opportunity based on the corresponding offered price, transportation costs, and processing costs. In some embodiments, the translated prices are determined by additively combining the one or more costs. The centralized crop transaction system 110 then modifies a user interface for the crop producer 1010 to display the one or more opportunities to transact with the prospective acquiring entities 1020, the modified user interface including the corresponding translated prices. In some embodiments as described in conjunction with FIG. 9, the modified user interface additionally includes an explanation or components of the translated prices. The modified user interface is configured such that, responsive to an indication or selection of an opportunity by the crop producer 1010, one or more contracts for the transfer of possession of the crop product 1015 are executed between the crop producer, the centralized crop transaction system 110, and the selected prospective acquiring entity.

Figure 11:
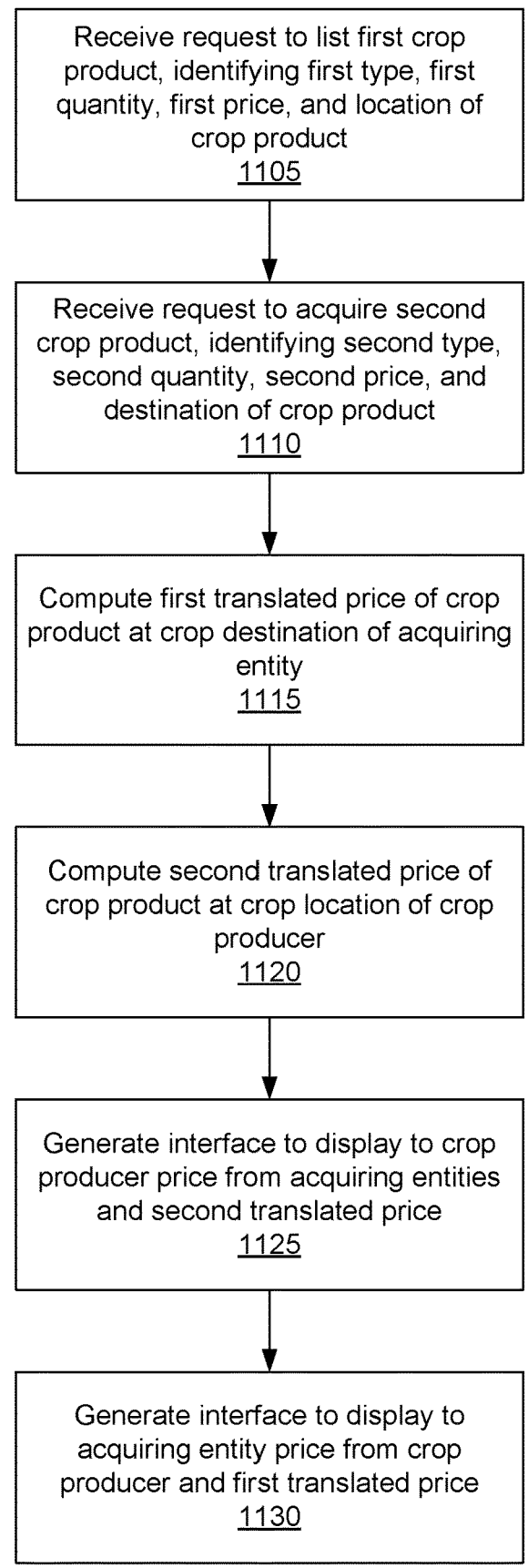
FIG. 11 illustrates an example process for determining translated prices for crop products, according to various embodiments.

FIG. 11 illustrates an example process for determining translated prices for crop products, according to various embodiments. In an embodiment, the steps of FIG. 11 are performed by the centralized crop transaction system 110. In other embodiments, the steps may be performed by other entities. In various embodiments, the method may include different and/or additional steps, and the steps may be performed in different orders than those described in conjunction with FIG. 11.

The centralized crop transaction system 110 receives 1105, from a crop producer, a first request to list a crop product. The first request identifies a first type of the crop product, a first quantity of the crop product, a location of the crop product, and a first price of the crop product. In an embodiment, the centralized crop transaction system 110 receives one or more first requests to list crop products from one or more crop producers. The centralized crop transaction system 110 receives 1110, from one or more prospective acquiring entities, a corresponding second request to acquire a crop product. Each second request identifies a second type of crop product, a second quantity of crop product, a location to which the crop product is to be delivered, and a second price of the crop product. In other examples, the first and/or second requests may include additional information for the crop product.

The centralized crop transaction system 110 computes 1115 a first translated price for each combination of the first request and a second request. The first translated price is a price for the crop product identified by the first request at the location to which the crop product is to be delivered identified by the second request. The centralized crop transaction system 110 computes 1120 a second translated price for each combination of the first request and a second request. The second translated price is a price for the crop product identified by the second request at the location of the crop product identified by the first request.

The centralized crop transaction system 110 modifies 1125 a first interface for display by a client device of the crop producer, the first interface including a set of the second translated prices. The centralized crop transaction system 110 modifies 1130 a second interface for display by a client device of a prospective acquiring entity, the second interface including a set of the first translated prices corresponding to the location to which the crop product is to be delivered corresponding to the prospective acquiring entity.

As noted above, in some embodiments, the centralized crop transaction system 110 modifies an interface for display by a client device of the crop producer including one or more requests by prospective acquiring entities ranked based on price or predicted profitability for the crop producer. The one or more requests include translated prices based on one or more characteristics or factors impacting a current or predicted future price. Characteristics may impact the profitability and ranking of one or more requests differently (e.g., a highest value opportunity for the crop producer can be based off of a particular crop product variety; a second highest value opportunity can be based off of a production practice resulting in a price premium such as no-till farming; and a third highest value opportunity can be based off of a crop product characteristic such as a percent protein).

In a further embodiment, the centralized crop transaction system 110 determines profitability associated with one or more requests based on an estimated cost of production. The estimated cost of production is determined based on one or more of: a historic cost of production, a reported use of fertilizers, pesticides, herbicides, seed technology, and or other production practices; a type of production facility; a location of the production facility; availability and utilization of crop product storage facilities; location specific market factors including, for example, labor and fuel costs; and the like. Based on an estimated cost of production and a price for the crop product, the centralized crop transaction system 110 determines an estimated profitability. In some embodiments, the centralized crop transaction system 110 additionally identifies one or more modifications for a crop producer to increase or optimize profitability for a current or future crop product. For example, the centralized crop transaction system 110 identifies modifications to factors impacting profitability of the crop product, such as transportation (e.g., an increase in profitability for transportation performed by the crop producer), storage method or type, one or more processing steps, and crop product characteristics (e.g., organic vs. non-organic, GMO vs. non-GMO, no-till practices, protein content of crop product, levels of fertilizer use, use of irrigation, and the like). In some embodiments, the centralized crop transaction system 110 presents the one or more factors to the crop producer as a recommendation to improve current or future valuation of the crop product.

Crop Transportation System

Figure 12:
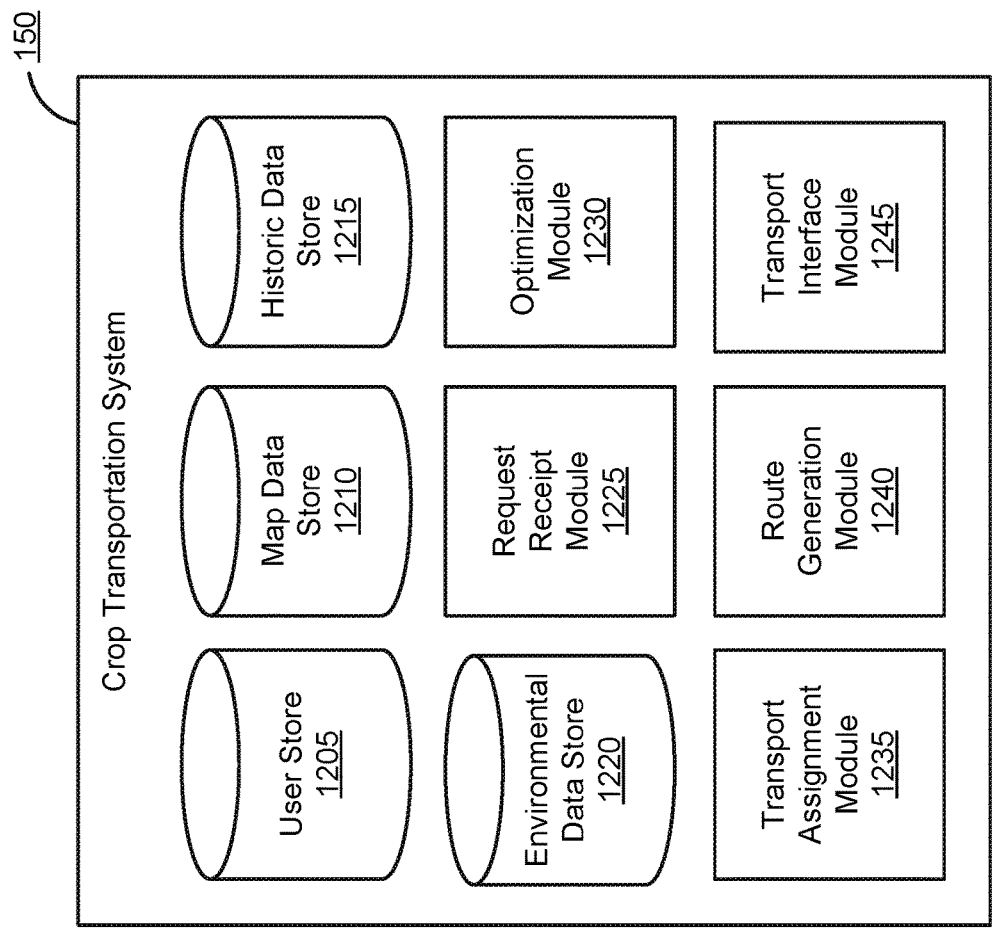
FIG. 12 is a block diagram of an architecture of a crop transportation system, according to various embodiments.

FIG. 12 is a block diagram of an architecture of a crop transportation system 150. The crop transportation system 150 shown in FIG. 12 includes a user store 1205, a map data store 1210, a historic data store 1215, an environmental data store 1220, a request receipt module 1225, an optimization module 1230, a transport assignment module 1235, a route generation module 1240, and a transport interface module 1245. In other embodiments, the crop transportation system 150 may include additional, fewer, or different components for various applications.

The user store 1205 stores and maintains data describing users of the crop transportation system 150. Data describing users of the crop transportation system 150 includes, for example, user roles or types; user activity (e.g., previous routes or loads); user preferences (e.g., home location, desired ending location, maximum length of trip, blacklisted delivery or pick-up locations); user locations (e.g., current and historical location, heading, speed, engine RPM, miles per gallon (MPG), or other measure of engine efficiency); equipment available to the user (e.g., trailer type); and the like. In some embodiments as described in conjunction with FIG. 2, the user store 1205 stores and maintains information for a profile describing a user identity and information relevant to transactions or transportation of crop products via the online agricultural system. For example, users identified as transportation entities 160 provide to the user store 1205 information including their legal name, possession of a driver's license or commercial driver's license (CDL), copy of state license, license expiration date, United States Department of Transportation (USDOT) number, operating authority motor transportation entity (MC) number, and commercial plate tag number. Users identified as transportation entities 160 additionally provide to the user store 1205 information describing trucks, trailers, or other vehicles used for crop transportation, including a commercial plate tag or license plate number, truck power unit license, trailer license plate, inspection certification, registration sticker, certifications to carry specific agricultural goods or crop products (e.g., ammonium nitrate fertilizers), and any additional information obtained through the vehicle registration process. Users identified as transportation entities 160 additionally provide to the user store 1205 information describing insurance information for crop transportation, including insurance for each of general liability, cargo, automobile, workers' compensation, name of insured, insurance companies, policy number(s), policy period(s), and number of drivers, number of trucks, and truck types.

In some embodiments, users identified as transportation entities 160 additionally sign one or more enrollment agreements stored in the user store 1205. For example, transportation entities 160 sign one or more of: a guarantee to comply with all outlined driver requirements and truck requirements; a guarantee to maintain sanitary conditions of transportation operation; a guarantee to maintain insurance coverage; an agreement to meet a driver eligibility criteria; an agreement to meet a truck eligibility criteria; an agreement to meet sanitary procedures and specifications; and an agreement to general safety requirements.

In some embodiments, transportation entities 160 are associated with feedback provided from other users of the online agricultural system. Operators, drivers, representatives of origin or destination facilities (e.g., crop producers, acquiring entities, representatives of storage or intermediate facilities), and other users are able to provide feedback on users of the crop transportation system 150. For example, ratings may be a numeric value or a written review describing performance, behavior, maintenance, and efficiency of a user. Transportation entity ratings may be based on current, past, or predicted future behavior. Ratings may include an average user rating, a frequency of user ratings above or below a threshold value (e.g., 3 stars or a 90% approval rating), a calculated score based on a user rating and characteristics thereof (e.g., weighted based on credibility of an evaluator), calculated scores based on characteristics of a user without input from an evaluator (e.g., a historic responsiveness score, an on-time arrival percentage, and the like), and/or one or more values previously computed for the transportation entity 160. One or more values may be associated with transportation entities, including, for example: average fuel efficiency, an average or median amount of time spent at a location, frequency of delivery within delivery windows, frequency of pick-up within pick-up windows, frequency of actual from expected delivery or pick-up times, reports of property damage, an average of median amount of time to perform an operation with a type of transportation equipment, and the frequency of occurrences where a time for an operation exceeds an average or median amount of time for that operation. One or more values may be associated with transportation facilities (e.g. pick-up locations or drop-off locations), including, for example: an average or median amount of time spent at a location, an average or median amount of time to complete a loading operation, an average or median amount of time to complete a loading operation with a type of loading equipment, an average or median amount of time to complete an unloading operation with a type of unloading equipment, an average of median amount of time to perform an operation with a type of transportation equipment, and the frequency of occurrences where a time for an operation exceeds an average or median amount of time for that operation.

In embodiments where the crop transportation system 150 and the centralized crop transaction system 110 share one or more users, the user store 1205 includes data describing user activity on the crop transportation system 150 and the centralized crop transportation system 150.

In some embodiments, some or all of the user information stored by the user store 1205 is displayed to users of the crop transportation system 150 within an interface of the crop transportation system (such as a mobile application GUI). In other embodiments, some or all of the user information stored by the user store 1205 is private, such that users are able to access their corresponding information but cannot access information of other users. In other embodiments, some or all of the user information is obscured or otherwise anonymized.

The map data store 1210 stores and maintains map data for one or more geographic areas. "Map data" describes any information identifying a geographic location. Map data may or may not include a diagrammatic representation of an area. Map data describes one or more characteristics for geographic areas impacting transportation through the geographic areas, including roads, traffic, elevation, obstructions or other current statuses impacting the geographic area, buildings, and the like. In some embodiments, map data is accessed via one or more external data sources 120 and is updated periodically (e.g., each second, each hour).

The historic data store 1215 stores and maintains historic data associated with crop transportation. The historic data store 1215 receives information associated with the transportation of crop products performed via the crop transportation system 150 and stores the information in association with information describing crop transactions, conditions, entities, and other information describing the transportation. For example, the historic data store 210 receives information associated with contracts for crop transportation executed on the crop transportation system 150, the information identifying the entities requesting and providing the transportation, a type and quantity of crop product, a pick-up location for the crop product, a drop-off location for the crop product, a pick-up window for the crop product, a drop-off window for the crop product, ratings for one or more entities associated with the crop transport, weather conditions for a time and area corresponding to the transport, equipment required for each entity to execute the transport, proof of delivery, and a transportation cost for the historic transportation.

In some embodiments, the historic data store 1215 additionally accesses one or more external data sources 120 for historic data describing conditions or factors associated with crop transportation. For example, the historic data store 1215 accesses and stores information describing crop transportations performed externally to the crop transportation system 150.

The environmental data store 1220 stores and maintains environmental data impacting crop transportation received from one or more external data sources 120. In one embodiment, the environmental data store 1220 accesses one or more external data sources 120 describing current environmental conditions or factors impacting crop transportation. For example, the environmental data store 1220 accesses and stores information including current or predicted future precipitation, current or predicted future humidity, current or predicted future wind directions and magnitudes, current or predicted future inclement weather, current or future temperature, and other weather conditions that may require particular equipment for crop transportation (e.g., a cover to prevent crop degradation due to precipitation) or negatively impact conditions for crop transportation (e.g., icy roads).

The request receipt module 1225 receives requests from users of the crop transportation system 150 to arrange transportation for crop products. Crop producers or prospective acquiring entities may submit requests to the crop transportation system 150 for a transportation entity 160 to transport a crop product. Transportation entities may submit requests to the crop transportation system 150 for an opportunity to transport a crop product. Users may additionally submit requests to the crop transportation system 150 to access requests for crop transportation, access past crop transportations, view profiles or information associated with users, execute contracts for performing crop transportation, exchange communications with users of the crop transportation system, and the like. In some embodiments, the request receipt module 1225 determines whether a user is able to perform an action on the crop transportation system 150 based on a user role associated with the user in the user store 1205. For example, users associated with a transportation entity role are able to execute contracts to perform crop transportation for entities, but are unable to request crop transportation from another transportation entity.

The optimization module 1230 receives requests for crop transportation and determines prices and methods for optimizing crop transportation. Responsive to receiving via the request receipt module 1225 a request by a transportation entity 160 to access opportunities to transport a crop product, the optimization module 1230 identifies one or more opportunities to present to the transportation entity 160. In some embodiments, the optimization module 1230 identifies the one or more opportunities based at least in part on an optimization of profits for the crop transportation system 150, a transportation entity, a crop producer, or another entity. For example, opportunities to transport a crop product offering greater compensation or opportunities to transport a crop product offering greater compensation per distance can be identified for display to the transportation entity 160. In another example, the optimization module 1230 maximizes profitability for a transportation entity based on one or more of time to complete one or more opportunities, laden miles, impact of routes (e.g., distance at cruising speed, elevation changes, etc.), fuel use efficiency, and a weight of a load (e.g., heavier loads reduce fuel efficiency, impacting profitability of a trip). In another example, the optimization module 1230 requests information describing fuel fill-ups from transportation entities to determine fuel efficiency of the vehicle corresponding to particular conditions of a crop transportation to maximize profitability. In some embodiments, the optimization module 1230 identifies one or more opportunities based at least in part on logistics associated with the opportunities, such as equipment requirements (types of vehicle, crop product monitors during transport, cover against weather conditions, etc.), pick-up and delivery windows or locations, a set of routes beginning and/or ending at or near specific locations, sequence constraints for loads based on crop product type (e.g., rinsing hoppers before or after hauling agricultural goods such as fertilizers; sweeping out trucks after hauling agricultural goods such as grains), and the like. In some embodiments, the optimization module 1230 identifies one or more opportunities based at least in part on preferences of the requesting transportation entity 160, such as available backloads or backhauls, preferred crop producers or storage entities, preferred routes or areas, and the like.

The optimization module 1230 additionally identifies one or more transportation entities 160 available to transport a crop product to crop producers or prospective acquiring entities requesting transportation of a crop product. Responsive to receiving the request, the optimization module 1230 identifies one or more transportation entities 160 available to transport the crop product. In some embodiments, the optimization module 1230 identifies the one or more transportation entities 160 based at least in part on a price optimization, such that transportation entities offering a lower price for the transportation opportunity or a lower price per distance are more likely to be identified for display to the requesting user. In some embodiments, the optimization module 1230 identifies one or more transportation entities 160 based at least in part on logistics associated with the opportunities, such as equipment requirements (types of vehicle, crop product monitors during transport, cover against weather conditions, etc.), pick-up and delivery windows or locations, a set of routes beginning and/or ending at or near specific locations, sequence constraints for loads based on crop product type (e.g., rinsing hoppers before or after hauling agricultural goods such as fertilizers; sweeping out trucks after hauling agricultural goods such as grains), and the like. In some embodiments, the optimization module 1230 identifies one or more transportation entities 160 based at least in part on preferences of the requesting user, such as preferred transportation entities. In some embodiments, the optimization module 1230 identifies one or more transportation entities 160 based at least in part on a location, a heading, a speed, an engine revolutions per minute (RPM), a miles per gallon (MPG), a measure of engine efficiency, a proximity to a pick-up location, a proximity to a facility for cleaning transportation equipment (for example, a facility for washing a hopper trailer), an estimated cost of operation, and an inferred preference of the one or more transportation entities.

The transport assignment module 1235 assigns transportation entities 160 of the crop transportation system 150 to requests for crop transportation. Responsive to a selection by a user of the crop transportation system 150 to complete a crop transportation request, the transport assignment module 1235 executes a contract assigning a transportation entity 160 to complete a requested transportation request. In some embodiments, the transport assignment module 1235 executes a contract to assign a transportation entity 160 to a request for transportation responsive to a selection by either the transportation entity 160 and the requesting entity. For example, a transportation entity 160 selects an opportunity to perform a crop transportation for a requesting entity. Responsive to receiving the selection, the transport assignment module 1235 executes the contract to complete the assignment. In another example, a requesting entity selects an available transportation entity 160 to perform a crop transportation. Responsive to receiving the selection, the transport assignment module 1235 executes the contract to complete the assignment. In other embodiments, the transport assignment module 1235 requires confirmation from both the transportation entity 160 and the requesting entity to execute a contract to complete the assignment.

In some embodiments, the transport assignment module 1235 further requests confirmation from one or more of the transportation entity 160 and other entities associated with the crop transportation of completion of one or more steps for transportation services. For example, transportation services can include: receiving a list of suppliers supplying a demand opportunity, compiling data describing crop producers or prospective acquiring entities (e.g., from an online agricultural system), contracting one or more crop producers or suppliers to arrange logistics, preparing a Bill of Lading with delivery instructions, sending a transportation entity and/or equipment of a transportation entity, confirming receipt and/or approval of the delivery schedule, receiving and/or processing the executed Bill of Lading, receiving and/or processing proof of delivery and/or proof of one or more quality metrics tested at delivery (e.g., a scale ticket), preparing a set of one or more proofs of delivery and/or one or more proofs of one or more quality metrics, and triggering one or more payment processes based on the set of delivery and quality proofs.

The route generation module 1240 receives requests for routes for crop transportation from transportation entities 160 of the crop transportation system 150 and identifies an optimized route for the crop transportation based on routes selected for or by the transportation entities. Responsive to a request from a transportation entity 160 to generate a route for crop transportation for an assignment executed on the crop transportation system 150, the route generation module 1240 accesses data associated with the crop transportation, including a pick-up location, a drop-off location, a pick-up window, a drop-off window, one or more equipment requirements associated with the pick-up or drop-off, and/or one or more procedural or logistical requirements associated with the pick-up or drop-off. The route generation module 1240 accesses map data for an area including the pick-up location and the drop-off location stored in the map data store and selects one or more routes from the pick-up location to the drop-off location. For example, the route generation module 1240 identifies one or more routes to optimize profitability, a mileage or time for the transportation such that a selected route provides a shortest distance traveled between the pick-up location and the drop-off location, a shortest time traveled, a time traveled corresponding to a difference between the pick-up window and the drop-off window, a fuel use efficiency, a minimized risk for crop product degradation, and the like.

The route generation module 1240 accesses environmental information for the area including the pick-up location and the drop-off location. Based on environmental information for the area, the route generation module 1240 identifies potential environmental factors impacting crop transportation and selects or modifies a route based on the potential environmental factors. For example, the route generation module 1240 determines that a rainstorm is predicted for an area. To avoid degradation of the crop product due to rain, the route generation module 1240 selects a route that circumvents the area affected by the rainstorm. The route generation module 1240 transmits the selected route for display to the transportation entity 160.

In some embodiments, the route generation module 1240 additionally accesses information describing vehicles in-transit. For example, electronic logging devices (ELDs), mobile device applications, or other tracking devices or software are used to record and transmit information to the crop transportation system 150 describing vehicles in-transit. Based on the data, the crop transportation system 150 determines information such as engine RPM, direction, location, and speed and infers information including whether the transport equipment is loaded or unloaded, whether they are likely to accept an opportunity for crop transportation, and the like. In some embodiments, the route generation module 1240 adjusts a route generated for a transport vehicle based on a current location and heading associated with the transport vehicle. For example, a transport vehicle is determined based on a current location to have deviated from the planned route. The route generation module 1240 modifies the route based on the current location.

The transport interface module 1245 generates and modifies interfaces for users of the crop transportation system 150 and transmits the interfaces to client devices for presentation. The transport interface module 1245 generates interfaces for users of the crop transportation system 150 to interact with and submit requests for crop transportation, to interact with other users of the crop transportation system, to view information associated with assignments for crop transportation, to track locations of crop products in transit, and to perform other actions on the crop transportation system 150. In some embodiments, the transport interface module 1245 modifies interfaces generated for users based on a role for the corresponding user, such that a transportation entity 160 is provided with one or more different interfaces than a requesting user. For example, the transport interface module 1245 generates interfaces for transportation entities 160 directed to viewing or submitting reviews for requesting entities and viewing and modifying routes for crop transportation.

Transportation Presentation in an Online Agricultural System

Crop transportation costs may impact the profitability of crop product transactions executed on an online agricultural system. Because crop transportation costs depend on many external factors, such as a pick-up location for the crop product, a destination location for the crop product, pick-up and drop-off windows, crop transportation logistics, equipment required for crop transportation, and environmental factors impacting the crop transportation, it may be difficult for crop producers or prospective acquiring entities to compare profitability between opportunities for crop product transactions. Additionally, it may be difficult for crop producers or prospective acquiring entities to determine whether to arrange external crop product transportation or to select a crop product transportation opportunity arranged by the online agricultural system. The crop transportation system 150 computes a transportation cost determined to result in an acceptance of a transportation request by a candidate transportation entity and modifies an interface within the online agricultural system to include the computed transportation cost. It should be noted that although these terms may be used interchangeably herein, "transportation cost" refers to an amount of money expended by a transportation entity to transport a crop product, and "transportation price" refers to an amount of money paid to a transportation entity to transport a crop product. A transportation cost, may include an opportunity cost for one or more vehicle operators, a rate of return on capital invested, and or a profit margin.

The crop transportation system 150 accesses an interaction within the online agricultural system between a crop producer and a prospective acquiring entity. Interactions are associated with a crop product listing identifying a crop product type, a crop product quantity, a crop product pick-up location, and a crop product destination location. An interaction may be, for example, a request by the prospective acquiring entity to purchase the crop product associated with the crop product listing from the crop producer. The crop transportation system 150 identifies, in real-time, a set of candidate transportation entities able to perform the crop product transportation. In an embodiment, each of the set of transportation entities are currently located within a threshold distance or a threshold transit time of the crop pick-up location.

Based on the interaction within the online agricultural system, the crop transportation system 150 further identifies environmental factors associated with transporting the crop product (e.g., predicted weather conditions between the crop product pick-up location and destination location, predicted traffic conditions between the crop product pick-up location an destination, and the like), required certifications and or licensures required to transport a crop, and equipment requirements associated with transporting the crop product (e.g., required unloading equipment, required loading equipment, required transportation capacity, required equipment to protect the crop product from moisture, required equipment to monitor a measure of moisture, required equipment to protect the crop product from temperature fluctuation, required equipment to monitor a temperature of the crop product, and the like). In some embodiments, the environmental factors and equipment requirements are used to determine whether a candidate transportation entity is able to perform the crop transportation.

For each candidate transportation entity, the crop transportation system 150 computes a transportation cost for the crop product listing. In some embodiments, the transportation cost is computed based at least in part on one or more of: a distance between the crop product pick-up location and the crop product destination location, environmental factors associated with transporting the crop product, a distance between a current location of the transportation entity and the pick-up location, an estimated transportation time, an estimated wait time at one or both of the crop product pick-up location and the crop product destination location, inclement weather conditions associated with transporting the crop product, and a number of transportation entities in the set of transportation entities. For example, the computed transportation cost increases as the distance between the transportation entity and the crop product pick-up location increases, increases as the distance between the crop product pick-up location and the crop product destination location increases, increases as the estimated transportation time increases, and/or increases as the estimated wait time at the crop product pick-up or destination locations increases.

Based on the computed transportation costs, the crop transportation system 150 selects a transportation cost of the computed transportation costs for display as a transportation price to one or more transportation entities and modifies an interface displayed by a client device of a transportation entity in the set of candidate transportation entities to include the transportation price. For example, the crop transportation system 150 can compute a transportation cost for each candidate transportation entity, and can select the lowest transportation cost of the computed transportation costs for display to all candidate transportation entities as a transportation price. In another example, the crop transportation system 150 selects a transportation price within a threshold percentage of the lowest transportation cost. For example, a transportation price within a bottom $10^{th}$ percentile, a $15^{th}$ percentile, $30^{th}$ percentile, etc. of the computed transportation costs can be displayed to the candidate transportation entities. The interface is configured to, responsive to an input by the viewing transportation entity, automatically execute a contract with the transportation entity to perform the crop transportation in exchange for compensation based on the displayed transportation price. In some embodiments, the interface is displayed within a transportation application and is further configured to identify candidate transportation routes for the selected transportation entity and to enable the transportation entity to select from among the identified candidate transportation routes. In one example, each of the displayed candidate transportation routes also includes an estimated cost or profitability associated with selection of that route. In other embodiments, the interface is displayed within a transportation application and is further configured to automatically select a transportation route for the selected transportation entity to transport the crop product. In one example, the route which is estimated to maximize profitability of the transportation entity is automatically selected.

Figure 13:
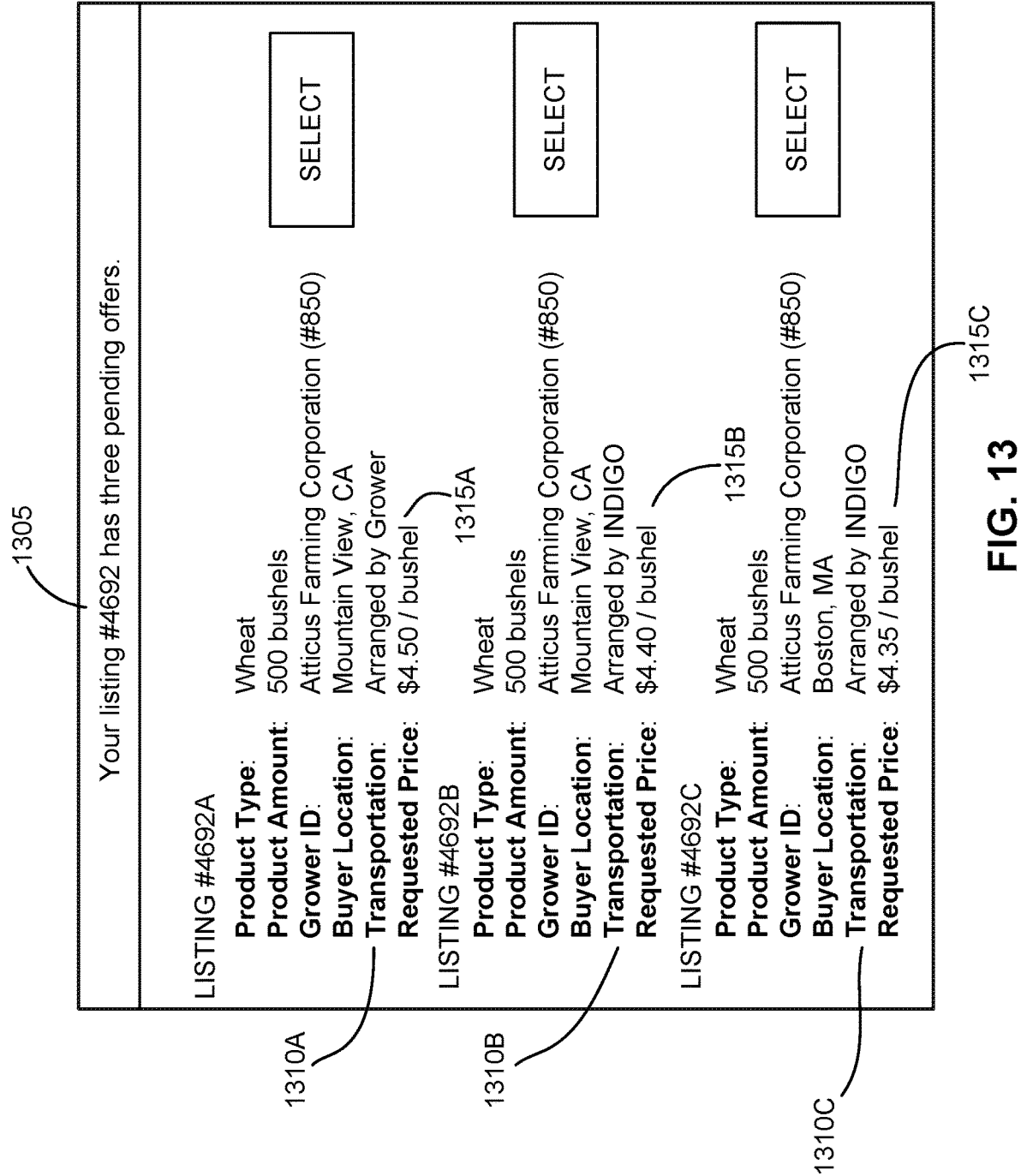
FIG. 13 illustrates an example grower interface for pending crop transactions, according to various embodiments.

FIG. 13 illustrates an example grower interface for pending crop transactions, according to various embodiments. An online agricultural system displays via a centralized crop transaction system 110 a crop product listing 1305. In the example of FIG. 13, the crop product listing 1305 has not yet resulted in an executed transaction, but has received one or more pending offers from prospective acquiring entities. Each pending offer is associated with information describing the crop product transaction, including a crop product type, a crop product quantity, and a destination location of the prospective acquiring entity. In the example of FIG. 13, the grower is additionally associated with a pick-up location.

The crop transportation system 110 determines, for each pending offer, a transportation price associated with a transportation entity. Based on the computed transportation prices, the centralized crop transaction system 110 modifies the grower interface to display a transportation type 1310 indicating an entity responsible for arranging transportation for a contract if executed and the corresponding price 1315 indicating a price for the transaction based at least in part on the corresponding transportation price.

For example, the crop transportation system 150 identifies, for a first pending offer, that the grower arranging transportation corresponds to a highest profitability for the transaction. The centralized crop transaction system 110 displays the transportation type 1310A ("Arranged by grower") and a corresponding modified price 1315A ("$4.50/bushel") for the transaction if the transportation is arranged by the grower.

In another example, the crop transportation system 150 identifies, for a second pending offer, a transportation price for a selected transportation entity arranged by the crop transportation system for transportation from the grower to a first destination location. The centralized crop transaction system 110 displays the transportation type 1310B ("Arranged by INDIGO") and a corresponding modified price 1315B ("$4.40/bushel") for the transaction reflecting the transportation price of the selected transportation entity. In one embodiment, the first pending offer and the second pending offer are associated with a same prospective acquiring entity. In other embodiments, the first pending offer and the second pending offer are associated with different prospective acquiring entities.

The crop transportation system 150 identifies, for a third pending offer, a transportation price for a selected transportation entity arranged by the crop transportation system for transportation from the grower to a second destination location. The centralized crop transaction system 110 displays the transportation type 1310C ("Arranged by INDIGO") and the corresponding modified price 1315C ("$4.35/bushel") for the transaction reflecting the transportation price of the selected transportation entity. It should be noted that in the embodiment of FIG. 13, the requested prices listed are prices to be paid to the grower.

By displaying one or more prices wherein a grower arranges the transportation of the crop product and one or more prices wherein the crop transportation system 150 arranges the transportation of the crop product, the online agricultural system enables the viewing user to select a most profitable transaction to execute. For example, growers capable of performing crop transportation (e.g., owning equipment to transport the crop product to a prospective acquiring entity) may select to execute a contract for the first pending offer to maximize profitability for the crop product listing. In another example, growers that are not capable of performing crop transportation may select to execute a contract for the second pending offer to maximize profitability for the crop product listing and minimize time invested in arranging external crop transportation.

In some embodiments as described above, the centralized crop transaction system 110 displays to a viewing user one or more offers for a crop product based on an expected profitability in order to enable the viewing user to select a most profitable transaction. For example, the crop transportation system 150 identifies that a first opportunity for a crop transaction is more profitable than a second based on one or more factors including transportation arrangements (e.g., a crop producer may increase their profit by $0.02/bushel by providing transportation themselves rather than arranging transportation with a third-party transportation entity). In some embodiments, the profitability is determined in part based on an expected cost to the viewing user. In further embodiments, the centralized crop transaction system 110 includes an option for a viewing user to correct or update an expected cost generated by the system, such that expected profitability calculations are more accurate. In further embodiments, the centralized crop transaction system 110 includes an option for a viewing user to compare their costs or profitability to an average costs or profitability of other users of the online agricultural system.

Figure 14:
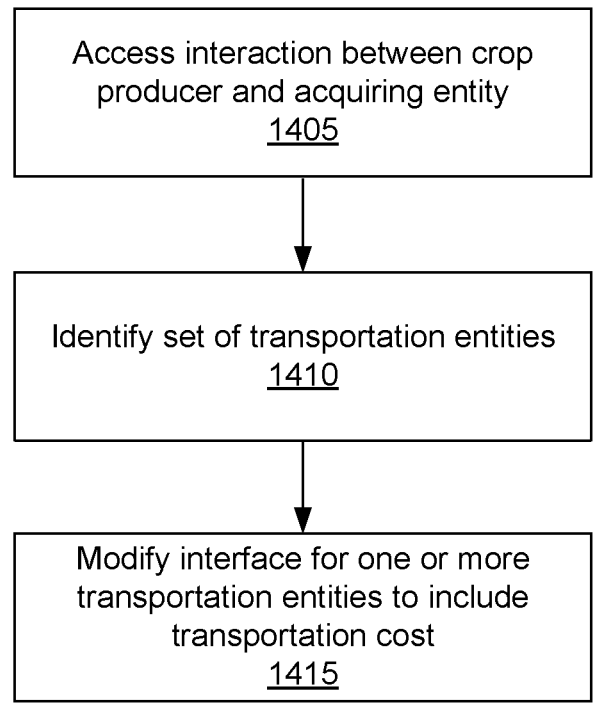
FIG. 14 illustrates an example process for modifying a crop transport interface to display transportation costs, according to various embodiments.

FIG. 14 illustrates an example process for modifying a crop transportation interface to display transportation prices, according to various embodiments. In an embodiment, the steps of FIG. 14 are performed by the crop transportation system 150. In other embodiments, the steps may be performed by other entities. In various embodiments, the method may include different and/or additional steps, and the steps may be performed in different orders than those described in conjunction with FIG. 14.

The crop transportation system 150 accesses 1405 an interaction between a crop producer and an acquiring entity associated with a crop product listing. The interaction identifies a crop product type, a crop product quantity, a crop product pick-up location, and a crop product destination location. In some embodiments, the interaction identifies additional information for crop transportation, such as a crop product pick-up date or time, a crop product drop-off date or time, and the like. The crop transportation system 150 identifies 1410, in real-time, a set of transportation entities. Each transportation entity of the set of transportation entities is identified as being able to transport the crop product from the crop product pick-up location to the crop product destination location, based at least in part on one or more factors including: a distance between the crop product pick-up location and the crop product destination location, environmental factors associated with transporting the crop product, and equipment requirements associated with transporting the crop product.

The crop transportation system 150 modifies 1415 an interface displayed by a client device of a transportation entity of the identified set of transportation entities to include a transportation price for transporting the crop product. In an embodiment, the transportation price is computed based at least in part on: a distance between the transportation entity and the crop product pick-up location, the distance between the crop product pick-up location and the crop product destination location, and the environmental factors associated with transporting the crop product. The modified interface including the transportation price is configured to, in response to a selection of the transportation price by the transportation entity, automatically execute a contract with the transportation entity to pick-up the crop product at the crop product pick-up location and to transport the crop product to the crop product destination location in exchange for compensation based on the transportation price.

Agricultural Transportation Entity Identification and Selection

Crop transportation costs may impact the profitability of crop product transactions executed on an online agricultural system. Because crop transportation costs depend on many external factors, such as a pick-up location for the crop product, a destination location for the crop product, crop transportation logistics, equipment required for crop transportation, and environmental factors impacting the crop transportation, it may be difficult for crop producers or prospective acquiring entities to select transportation entities to transport crop products. Similarly, it may be difficult for transportation entities to identify profitable opportunities to transport a crop good corresponding to preferences of the transportation entity for preferred locations or windows for pick-up or delivery, preferred crop product types or quantities, preferred distances traveled, and other logistical preferences. The crop transportation system provides a method for identifying and selecting transportation entities corresponding to the requirements of the opportunity and the preferences of the transportation entities.

The crop transportation system 150 accesses a crop product transaction within an agricultural system (e.g., a centralized crop transaction system 110 linked to the crop transaction system) and identifies information describing the crop product transaction. The information includes a pick-up location, a destination location, a pick-up window, a delivery window, a crop product type, and a quantity of the crop product. In some embodiments, the crop product transaction is an agreement by an acquiring entity associated with the destination location to purchase the crop product provided by a crop producer associated with the pick-up location. The pick-up window is given as a beginning time and an ending time, between which the crop product must be picked up. Similarly, the delivery window is given as a beginning time and an ending time, between which the crop product must be delivered.

The crop transportation system 150 accesses environmental information describing expected environmental conditions during transportation of the crop product and historic information describing previous transportation availability and prices associated with the pick-up location and the destination location. In some embodiments, the environmental information describes one or more of: predicted weather conditions between the pick-up location and the destination location, predicted traffic conditions between the pick-up location and the destination location, and predicted wait times to load the crop product at the pick-up location or to unload the crop product at the destination location. In further embodiments, the environmental information additionally describes a set of expected environmental conditions immediately before or during the pick-up window or immediately before or during the delivery window. In some embodiments, the crop transportation system 150 accesses up-to-date environmental information in real-time based on one or more external data sources 120 including satellite data, traffic monitoring data, data from electronic logging devices, and data from cell phone transmissions.

The crop transportation system 150 computes a transportation price for each of one or more candidate transportation entities across one or more candidate transportation routes between the pick-up location and the destination location. In some embodiments, the one or more candidate transportation entities are selected by the crop transportation system 150 based on one or more of: a trustworthiness or reputation score or other rating of the transportation entity, a current location of the transportation entity, a current heading of the transportation entity, an average speed of the transportation entity, an engine revolutions per minute (RPM), a miles per gallon (MPG), a measure of engine efficiency, a proximity to pick-up location, a proximity to a facility for cleaning transportation equipment (e.g., a facility for washing a hopper trailer), an estimated cost of operation, and an inferred or reported preference of the transportation entity. The computed transportation prices can be computed based on a computed transportation cost for transporting the crop product. Each of the one or more candidate transportation entities is able to pick up the crop product at the pick-up location during the pick-up window and deliver the crop product to the destination during the delivery window. The transportation cost is computed based at least in part on one or more of: the crop product type, the crop quantity, and the accessed environmental and historic information. In some embodiments, the transportation cost is computed based further on a current season or a season during a future delivery window (e.g., transportation during high-demand seasons increases a transportation cost; transportation during seasons associated with weather conditions impacting crop quality increases a transportation cost, and the like). In some embodiments, the computed transportation cost for a candidate transportation route changes in real-time based on changes in weather conditions or other factors impacting the candidate transportation route. In some embodiments, the computed transportation cost for a candidate transportation route is additionally based at least in part on one or more preferences of the requesting user. For example, the crop transportation system 150 determines a preference for a transportation entity or characteristics of a transportation entity for the requesting user or similar users based on historic transactions.

In some embodiments, the crop transportation system 150 computes the transportation cost and/or the transportation price for a candidate transportation route using a machine-learned model. The machine-learned model is trained at least in part on the accessed historic information. Different machine learning techniques—such as neural networks, k-means clustering machine learning models, and reinforcement learning models—may be used in different embodiments. In some embodiments, the machine-learned model receives as input information describing a crop transaction on the online agricultural system and environmental information associated with the crop transaction, and generates as output the transportation cost and/or the transportation price for a transportation route.

In some embodiments, the computed transportation prices are displayed to a requesting user of the crop transportation system 150. For example, the requesting user is a transportation entity or another entity associated with a transaction executed on the centralized crop transaction system 110. In some embodiments as described above, the computed transportation prices are displayed via a centralized crop transaction system 110. For example, the centralized crop transaction system 110 modifies a user interface to incorporate the computed crop transportation prices with prices associated with the crop transaction. In other embodiments, the computed transportation prices are displayed via the crop transportation system 150 to a candidate transportation entity. In some embodiments, a lowest computed transportation cost is used to calculate a transportation price that is displayed via the user interface in conjunction with information identifying the corresponding transportation entity. In other embodiments, multiple transportation prices are displayed via the user interface. In some embodiments, the user interface is configured such that, responsive to an input (e.g., a selection or other interaction) from the requesting user, the online agricultural system automatically executes a contract for a selected transportation entity to pick-up the crop product at the pick-up location and to transport the crop product to the destination location over a selected transportation route in exchange for compensation based on a lowest computed transportation price.

In some embodiments, the computed transportation costs are displayed to a requesting user of the crop transportation system 150. For example, the requesting user is a transportation entity or another entity associated with a transaction executed on the centralized crop transaction system 110. In some embodiments as described above, the computed transportation costs displayed via a centralized crop transaction system 110. For example, the centralized crop transaction system 110 modifies a user interface to incorporate the computed crop transportation costs with prices associated with the crop transaction. In other embodiments, one or more computed transportation costs of a candidate transportation entity are displayed via the crop transportation system 150 to the candidate transportation entity. In other embodiments, multiple transportation costs are displayed via the user interface. In some embodiments, a transportation cost of a transportation entity is displayed to a user other than the transportation entity only if the transportation cost is included in an average, aggregate or otherwise anonymized.

The crop transportation system 150 additionally displays, for transportation entities 160 requesting opportunities to transport a crop product, one or more opportunities to transport a crop product based on transportation entity preferences. Because logistics associated with pick-up and delivery of crop products is not standardized, transportation entities 160 may indicate or display preferences for crop producers or prospective acquiring entities based on wait times associated with pick-up or delivery at particular locations, equipment requirements at particular locations, traffic or other environmental conditions at particular locations, and the like.

For a crop product transaction within an online agricultural system, the crop transportation system 150 identifies a pick-up location for the crop product, a destination location for the crop product, a pick-up window, a delivery window, a type of crop product, and a quantity of crop product. Based on the information describing the crop product transaction, the crop transportation system 150 identifies a set of candidate transportation entities capable of picking up the crop product at the pick-up location during the pick-up window and delivering the crop product at the destination location during the delivery window.

The crop transportation system 150 accesses, for each candidate transportation entity, a set of transportation preferences associated with the candidate transportation entity. Transportation preferences may be selected by the candidate transportation entity or inferred for the candidate transportation entity (e.g., based on historic crop transportation). Transportation preferences may include one or more of: a preferred transportation route distance; a preferred geographic region in which a pick-up location is located; a preferred pick-up location; a preferred geographic region in which a destination location is located; a preferred destination location; preferred loading or unloading equipment; preferred average transportation route distance per day; a preferred crop product for transportation; a preferred quantity of crop product to be transported; a preference threshold of crop quantity to be transported; a preferred one or more roads to travel during transportation; a preferred pick-up window range or a preferred delivery window range (e.g., a preferred season, a preferred time of day, a preferred day of the week), and the like.

Based on the accessed transportation preferences, the crop transportation system 150 computes a transportation price for transporting the crop for each of the candidate transportation entities. The transportation price can be computed based on a transportation cost, which in turn can be computed based at least in part on the crop product type, the crop quantity, and the set of transportation preferences. In some embodiments, the transportation prices can be computed based on an expected or desired net profitability for the crop transportation system 150. In some embodiments, the transportation price can additional be computed based on the transportation preferences of the transportation entity (e.g., an available backhaul opportunity, a pick-up or drop-off location corresponding to a preferred location of the transportation entity). While in many embodiments, a lowest transportation price associated with a set of candidate transportation entities can be displayed to all of the candidate transportation entities, in some embodiments, a higher transportation price can be presented to a particular candidate transportation entity in order to increase the likelihood that the candidate transportation entity accepts a related opportunity (such as a backhaul opportunity).

In some embodiments, a transportation opportunity may be displayed different members of a set of candidate transportation entities at different times. For example, a transportation opportunity may first be presented to one or more transportation providers having a current or anticipated location that such that that those entities can most profitably fulfill a set of transportation opportunities. For example, a transportation entity may most profitability fulfill a set of transportation opportunities where the sum of the difference between the current or anticipated location of the transportation entity and the first pick-up location of the set of transportation opportunities and the difference between last drop-off location of the set of transportation opportunities and the transportation entity's home location is less than for any other candidate transportation provider. In some embodiments, a transportation opportunity may first be presented to one or more transportation providers estimated to have the highest likelihood of fulfilling the transportation opportunity. A transportation opportunity first offered to one or more candidates selected from a set of candidate transportation entities, may later be offered to another one or more candidates selected from the set. The transportation price of the later offer may be the same, more or less than the transportation price of the first offer. A later offer may be made if none of the transportation entities of the first one or more candidates selected from a set of candidate transportation entities has not accepted the opportunity within a specified period of time (e.g. 30 minutes, 1 hour, 3 hours, 12 hours, etc.) from the first offer.

The crop transportation system 150 modifies an interface displayed to a transportation entity of the set of candidate transportation entities to include one or more opportunities to transport a crop in conjunction with the corresponding transportation prices. In some embodiments, the interface additionally displays information describing the crop transportation opportunity, such as the pick-up location and window, the destination location and delivery window, and an identity or identifier for the entities executing the crop transaction. In some embodiments, the interface further displays information such as equipment availability for loading or unloading the crop product and one or more ratings or reviews associated with entities executing the crop transaction. The user interface is configured to receive an input from the transportation entity (e.g., a selection or other interaction) and, responsive to the input, automatically execute a contract with the transportation entity to perform the crop transportation in exchange for compensation based on the transportation price.

Figure 15A:
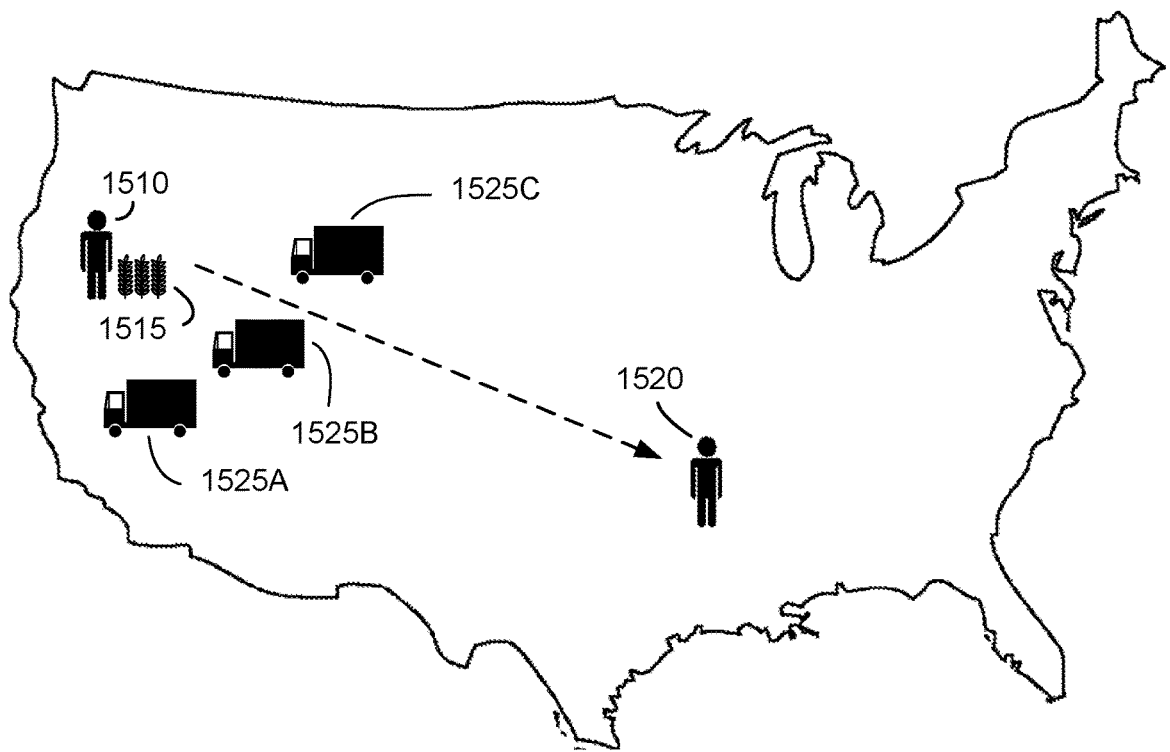
FIGS. 15A-B illustrate an example for arranging for crop transportation based on transportation entity transportation costs, according to various embodiments.
Figure 15B:
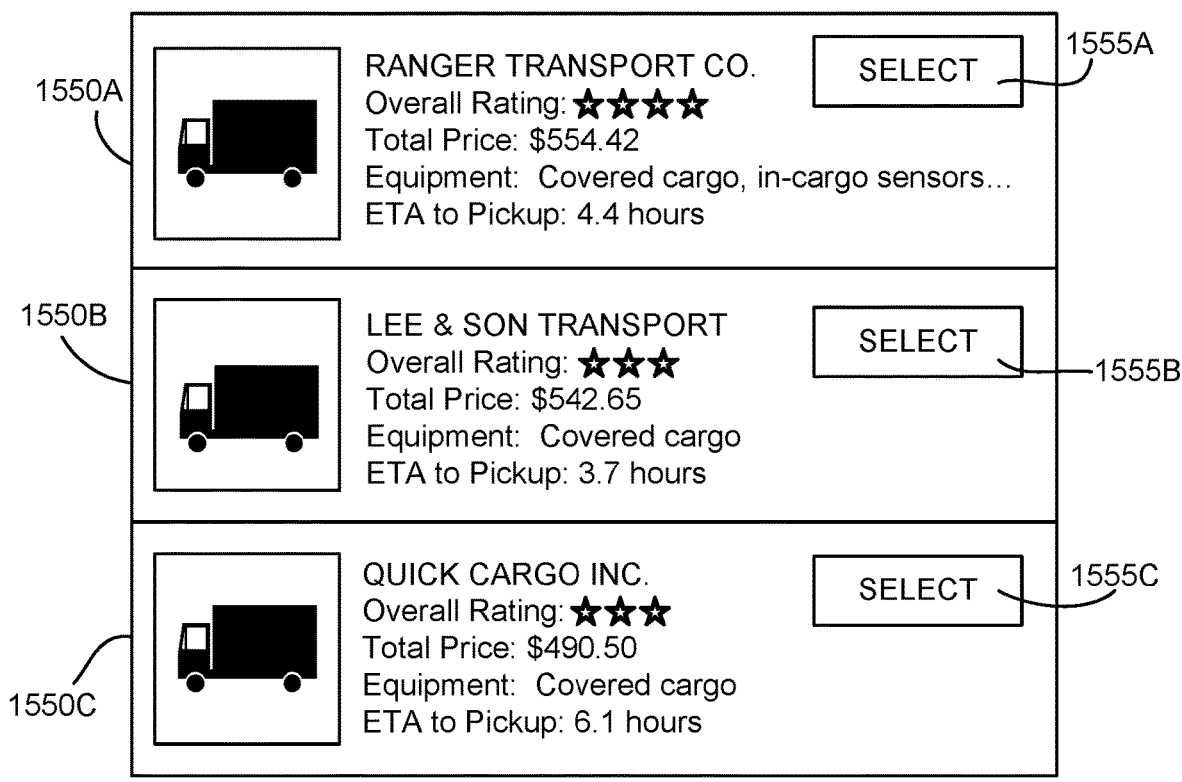

FIGS. 15A-B illustrate an example for arranging for crop transportation based on transportation entity transportation prices, according to various embodiments. FIG. 15A illustrates a map of a geographic area displaying an executed crop transaction between a crop producer 1510 and a prospective acquiring entity 1520, the executed crop transaction requiring a transportation entity to transport the crop product 1515 from a pick-up location associated with the crop producer 1510 to a destination location for delivery associated with the prospective acquiring entity 1520. The crop transportation system 150 identifies a set of candidate transportation entities 1525, each candidate transportation entity of the set of candidate transportation entities able to perform the crop transportation. For each candidate transportation entity of the set of candidate transportation entities 1525, the crop transportation system 150 computes a transportation price. As described above, the transportation price is based on a transportation cost, which is computed based on one or more of: the crop product type, the crop product quantity, environmental information describing expected environmental conditions during the transportation of the crop product, and historic information and prices associated with the pick-up location and destination location.

FIG. 15B illustrates an example set of computed transportation costs for a set of candidate transportation entities 1525. A first candidate transportation entity 1550A is associated with information describing the candidate transportation entity (e.g., provided equipment "covered cargo, in-cargo sensors . . . ", ratings or reviews from other entities on the crop transportation system 150). Based on information describing the candidate transportation entity 1525A, the crop transportation system 150 determines a transportation cost associated with the candidate transportation entity of $554.42. The crop transportation system 150 determines transportation costs for the second 1550B and third 1550C candidate transportation entities at $542.65 and $490.50 respectively.

In an embodiment, the crop transportation system 150 modifies an interface for a requesting user to include the determined transportation costs in conjunction with information describing the candidate transportation entity. The modified interface is configured to receive an input from a requesting user and, responsive to the input, execute a contract with the transportation entity to complete the crop transportation. In some embodiments, the crop transportation system 150 selects a candidate transportation entity without explicit input on the candidate transportation entities from a requesting user, for instance in response to a request by a user to arrange for a crop to be transported. The interface is additionally configured to, responsive to an input (e.g., a selection of a button or link 1555) from a requesting user, automatically execute a contract with the transportation entity to perform the crop transportation in exchange for compensation based on the transportation cost.

Figure 16A:
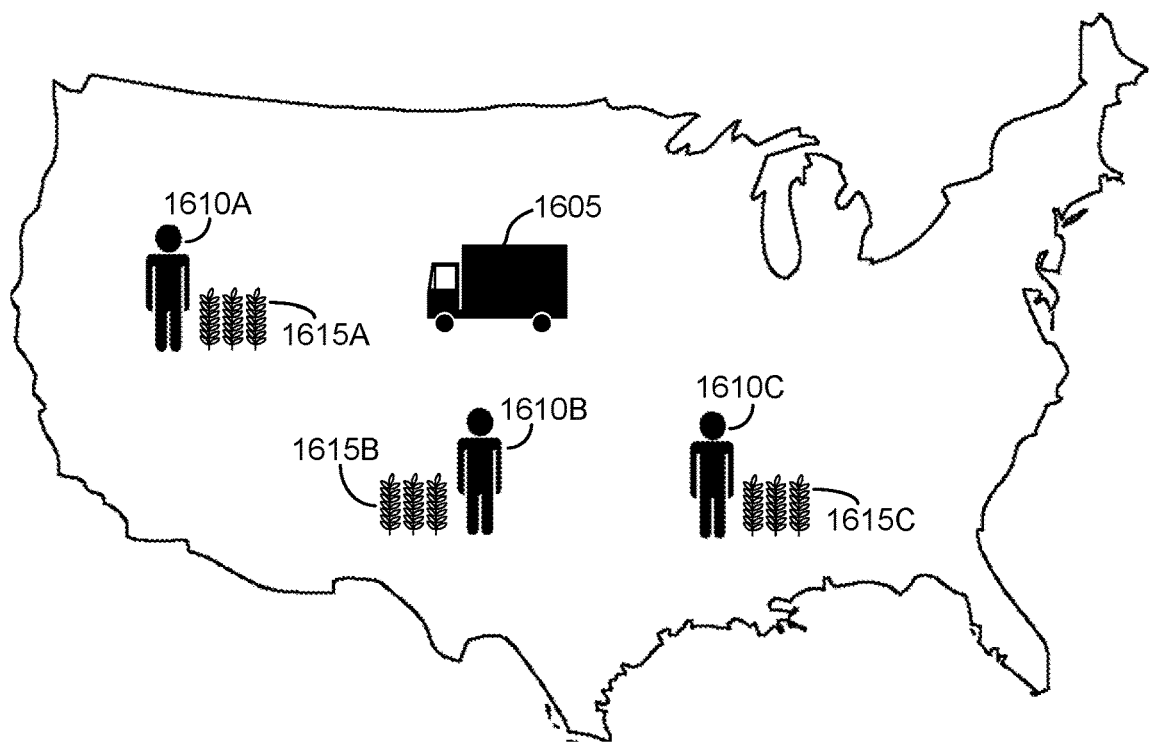
FIGS. 16A-B illustrate an example for arranging for crop transportation based on one or more transportation entity preferences, according to various embodiments.
Figure 16B:
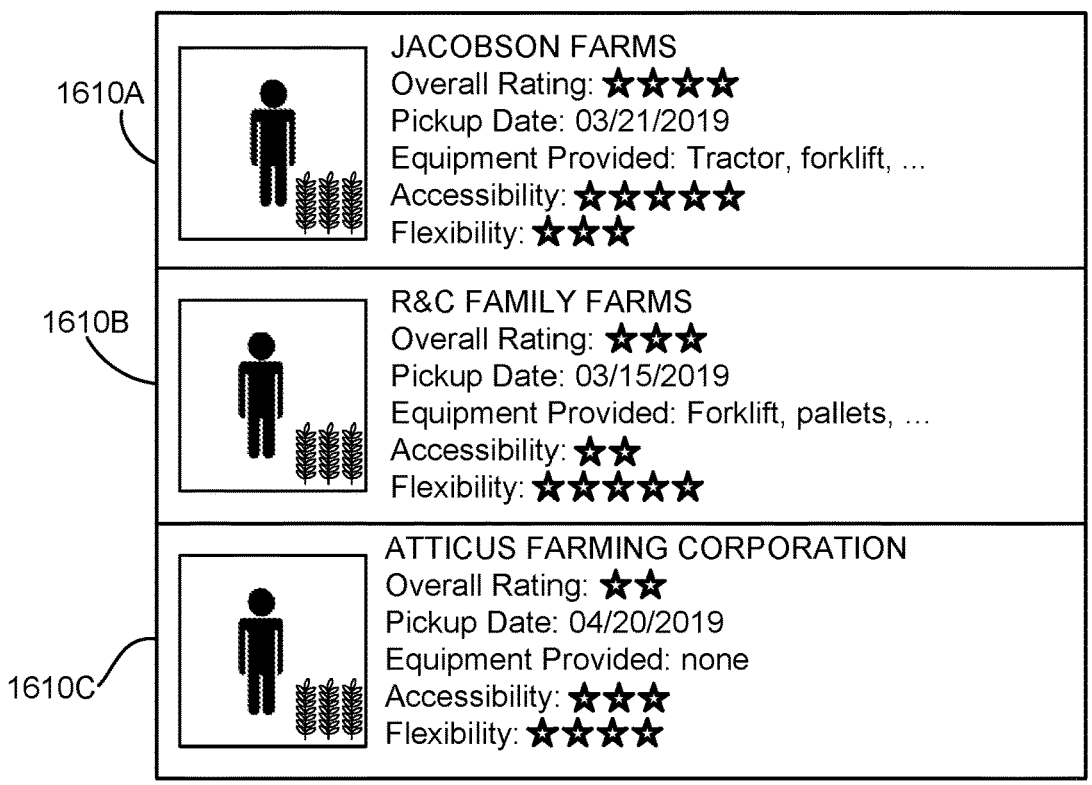

FIGS. 16A-B illustrate an example for arranging for crop transportation based on one or more transportation entity preferences, according to various embodiments. FIG. 16A illustrates a map of a geographic area displaying one or more executed crop transactions to transfer possession of a crop product 1615 between a crop producer 1610 and a prospective acquiring entity. Although prospective acquiring entities are not shown on the map of FIG. 16A, it is understood that one or more prospective acquiring entities are associated with each executed crop transaction. A transportation entity 1605 transmits a request to the crop transportation system 150 for an opportunity to transport a crop product. The crop transportation system 150 determines, for the transportation entity 1605, a set of transportation preferences selected by or inferred for the candidate transportation entity, the transportation preferences describing one or more preferences for locations, entities, or other logistics associated with a crop transportation.

FIG. 16B illustrates an example of one or more factors associated with an entity corresponding to transportation preferences specified by a transportation entity 1605. In the example of FIG. 16B, each entity 1610 is a crop producer and is associated with information describing loading equipment, pick-up dates, and the like. The crop transportation system 150 accesses information describing the entity 1610 and determines, based on transportation preferences of the transportation entity 1605, a likelihood of the transportation entity accepting the corresponding opportunity to perform a crop transportation.

For example, a first crop producer 1610A is associated with a high overall rating based on historic crop transportation with the same or other transportation entities, identifies a pick-up date of Mar. 21, 2019, and provides equipment including a tractor and a forklift. A second crop producer 1610B is associated with a lower overall rating, identifies a pick-up date of Mar. 15, 2019, and provides equipment including a forklift and pallets. A third crop producer 1610C is associated with a lower overall rating, identifies a pick-up date of Apr. 20, 2019, and provides no equipment. The crop transaction system 150 determines that the requesting transportation entity 1605 is unlikely to accept an opportunity associated with the first crop producer 1610A due to the associated pick-up rate not being within a preferred pick-up window. The crop transaction system 150 additionally determines that the requesting transportation entity 1605 is unlikely to accept an opportunity associated with the third crop producer 1610C due to a lack of provided equipment by the third crop producer. The crop transaction system 150 accordingly determines that the requesting transportation entity 1605 is most likely to accept an opportunity associated with the second crop producer 1610B and computes one or more transportation prices accordingly. In other embodiments, entities may be prospective acquiring entities associated with information describing unloading information, delivery dates, and the like. It should be noted that in some embodiments, a transportation price is computed based on a computed transportation cost plus an expected transportation entity profit margin that is determined to result in a greater-than-threshold likelihood of acceptance by the transportation entity. Likewise, the transportation price can be computed for each of a set of candidate transportation entities accordingly, and the lowest transportation price corresponding to any one transportation entity can be displayed to all candidate transportation entities.

Based at least in part on the set of transportation preferences and information describing the opportunities for crop transportation, the crop transportation system 150 computes a transportation price for each opportunity. The user interface for the transportation entity is modified to include the computed transportation price and information describing the corresponding opportunity to perform the crop transportation. For example, the user interface for the transportation entity is modified to include an anticipated cost for the transportation entity to perform the crop transportation and a competitive price for the crop transportation, such that the transportation entity is able to determine a profitability associated with accepting the opportunity. In some examples, the crop transportation system 150 estimates and displays an expected profitability for acceptance of the opportunity to the transportation entity. In further examples, the crop transportation system 150 displays a listing of one or more opportunities ordered based on an expected profitability. In some embodiments, the user interface is configured to receive an input from the transportation entity and, responsive to the input, execute a contract between the transportation entity and an entity associated with the opportunity to perform the crop transportation in exchange for compensation based on the transportation price.

Figure 17:
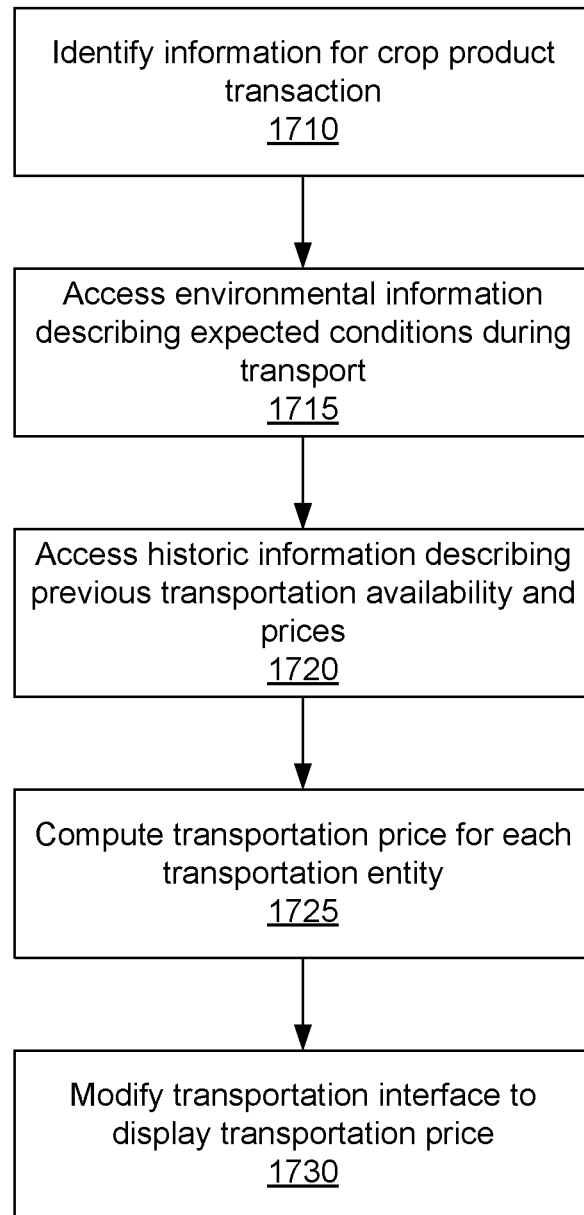
FIG. 17 illustrates an example process for modifying a crop transport interface to display transportation costs based on historic and environmental information, according to various embodiments.

FIG. 17 illustrates an example process for modifying a crop transport interface to display transportation prices based on historic and environmental information, according to various embodiments. In an embodiment, the steps of FIG. 17 are performed by the crop transportation system 150. In other embodiments, the steps may be performed by other entities. In various embodiments, the method may include different and/or additional steps, and the steps may be performed in different orders than those described in conjunction with FIG. 17.

The crop transportation system 150 identifies 1710, information for a crop product transaction, such as a pick-up location of a crop product, a destination location of a crop product, a pick-up window, a delivery window, a type of crop product, and a quantity of crop product.

The crop transportation system 150 accesses 1715 environmental information describing a set of expected environmental conditions during the transportation of the crop product from the pick-up location to the destination location. For example, the crop transportation system 150 accesses one or more external data sources 120 describing weather and temperature conditions for a geographic area including the pick-up location and the destination location.

The crop transportation system 150 accesses 1720 historic information describing previous transportation availability and prices associated with the pick-up location and the destination location. The crop transportation system 150 computes 1725 a transportation cost for each of a set of one or more transportation entities over one or more transportation routes between the pick-up location and the destination location. Each transportation entity of the set of one or more transportation entities is able to pick up the crop product at the pick-up location during the pick-up window and to deliver the crop product to the destination location during the delivery window. The transportation cost is computed based on the crop product type, the crop quantity, the accessed environmental information, and the accessed historic information. In some embodiments, the transportation cost is computed based on additional factors impacting crop transportation, such as required equipment for transportation, local fuel costs, seasonal demand for transportation, etc.

The crop transportation system 150 modifies 1730, for each of the set of one or more transportation entities, an interface displayed by a client device of the transportation entity to include a lowest transportation price corresponding to any transportation entity and to identify a transportation route associated with the lowest transportation price. The modified interface is configured to, in response to an input from a transportation entity, automatically execute a contract with the transportation entity to pick-up the crop product at the pick-up location and to transport the crop product to the destination location in exchange for compensation based on the lowest transportation price computed for the transportation entity.

Figure 18:
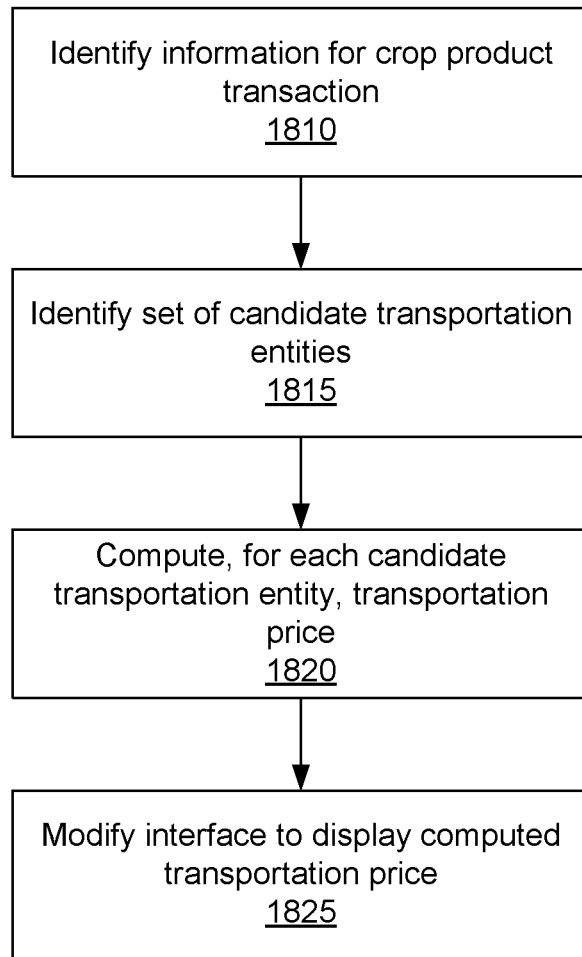
FIG. 18 illustrates an example process for modifying a transportation entity interface to display transportation costs for crop product transactions, according to various embodiments.

FIG. 18 illustrates an example process for modifying a transportation entity interface to display transportation prices for crop product transactions, according to various embodiments. In an embodiment, the steps of FIG. 18 are performed by the crop transportation system 150. In other embodiments, the steps may be performed by other entities. In various embodiments, the method may include different and/or additional steps, and the steps may be performed in different orders than those described in conjunction with FIG. 18.

The crop transportation system 150 identifies 1810 information for a crop product transaction. The information includes a pick-up location of a crop product, a destination location of a crop product, a pick-up window, a delivery window, a type of crop product, and a quantity of crop product. The crop transportation system 150 identifies 1815 a set of candidate transportation entities each able to pick up the crop product at the pick-up location during the pick-up window and to deliver the crop product to the destination location during the delivery window. Each candidate transportation entity is associated with a set of transportation preferences selected by the candidate transportation entity.

The crop transportation system 150 computes 1820, for each candidate transportation entity, a transportation price for transporting the crop product from the pick-up location to the destination location. In some embodiments, the transportation price is based on a computed transportation cost, which in turn is based at least in part on the crop product type, the crop quantity, and the set of transportation preferences associated with the candidate transportation entity. For each candidate transportation entity, the crop transportation system 150 modifies 1825 an interface displayed by a client device of the transportation entity to include the lowest transportation price computed for any candidate transportation entity. The interface is configured to, in response to an input from the transportation entity, automatically execute a contract with the transportation entity to pick up the crop product at the pick-up location and to transport the crop product to the destination location in exchange for compensation based on the transportation price computed for the transportation entity.

Agricultural Transportation Route Selection and Load Optimization

Route selection for crop transportation is impacted by many factors, including traffic and road information for an area associated with the transport and environmental factors impacting the transport or the crop product during transportation. It is desirable for transportation entities that route selection optimizes for mileage/distance and time, and that severe or dangerous weather conditions are avoided. Additionally, however, environmental conditions may impact the transportation of a crop product. Crop products may experience degradation due to weather (e.g., rain, extreme cold, extreme heat, humidity) that negatively impact one or more quality metrics associated with the crop product. While transportation equipment, such as covered or temperature controlled containment for crop products, may mitigate or eliminate the effect of environmental conditions, it is valuable in cases of transportation wherein crop products are at risk of degradation for route selection to additionally mitigate the effect of environmental conditions.

As described in conjunction with FIG. 12, the crop transportation system 150 selects a route for a transportation entity 160 performing a crop transportation based at least in part on weather information describing expected weather conditions within a geographic area including an originating location of the crop product and a destination location for the delivery of the crop product. The crop transportation system 150 identifies a set of candidate routes between the originating location and the destination location based on map data describing the geographic area including the originating location and the destination location. In some embodiments, the set of candidate routes are within a threshold mileage of each other (e.g., each route in the set of candidate routes is substantially the same distance). The crop transportation system 150 accesses environmental data for the geographic area, including weather information describing expected weather conditions. Based at least in part on the accessed environmental data, the crop transportation system 150 selects a route from the set of candidate routes for the transportation entity 160. For example, the crop transportation system 150 identifies a route of the set of candidate routes that is not expected to, or is least likely to, travel through rain, high wind conditions, an above-threshold humidity, an above-threshold temperature, or other adverse weather conditions.

In some embodiments, the crop transportation system 150 selects a route for a transportation entity 160 transporting a crop based at least in part on logistical information associated with the crop transportation. For example, the crop transportation system 150 determines, for a pick-up location and/or a destination location, a real-time or estimated wait time (e.g., to load or unload the crop product). A real-time wait time may be determined based on real-time satellite data. An estimated wait time may be determined based on data received from electronic logging devices or from cell phone transmissions. An estimated wait time may additionally be determined based at least in part on historic wait times associated with a location.

In some embodiments, the crop transportation system 150 selects a route for a transportation entity 160 transporting a crop based at least in part on factors impacting the effect of weather conditions on the crop product. For example, the crop transportation system 150 selects a route based at least in part on a crop product type (e.g., a crop product type that is more or less susceptible to weather conditions such as moisture), a type of transportation equipment available (e.g., temperature control or covered cargo vehicles, sensors enabling real-time monitoring of conditions of the crop product or an environment of the crop product during transport), and the like. In embodiments where one or more sensors are used to monitor the condition of the crop product during transport, sensor data may be monitored by one or more of the online agricultural system, the transportation entity, the crop producer, and the prospective acquiring entity. In embodiments where one or more sensors are used to monitor the condition of the crop product during transport, the crop transportation system 150 may modify a selected route for the crop transportation based on the monitored conditions during transport. For example, responsive to a sensor identifying that a temperature of a crop product being transported exceeds a threshold during transport, the crop transportation system 150 modifies the selected route (e.g., through a lower-temperature region) to prevent further increase in temperature during transport.

In some embodiments, the crop transportation system 150 selects a route for a transportation entity 160 transporting a crop based at least in part to minimize risk of crop product degradation. For example, as described above, the crop transportation system 150 selects a route based at least in part on a crop product type (e.g., a crop product type that is more or less susceptible to factors such as weather conditions; a crop product type that is more or less susceptible to breakage, damage, or other degradation due to rough terrain). For transportation of a crop product, the crop transportation system 150 determines one or more factors impacting crop product degradation and modifies a selected route to minimize the risk of crop product degradation.

The crop transportation system 150 generates or modifies a transportation interface to display the selected route to the transportation entity 160. The displayed route may be displayed within a map interface (e.g., static or updated in real-time based on location data from the transportation entity 160) and/or displayed with text instructions for navigation. In some embodiments, the transportation interface is further modified to display identified loading instructions or unloading instructions responsive to location data identifying that the transportation entity 160 is within a threshold distance of the pick-up location or the destination location, respectively. In some embodiments, the transportation interface is further modified to display real-time or estimated wait times for loading or unloading the crop product at the pick-up location or the destination location, respectively.

In some embodiments, the transportation interface is further modified to request user identification or verification, a wait time for loading or unloading, availability of loading or unloading equipment, current or past environmental conditions, local input costs (for example, local fuel prices), local crop product prices (for example, elevator prices of crop products), identification or verification of traffic conditions, etc.

In some embodiments, the transportation interface is modified to display to a transportation entity in progress of fulfilling a transportation opportunity a real-time estimate of the profitability of the current transportation opportunity. In some embodiments, the transportation interface is further modified to display to a transportation entity a cumulative estimate of the transportation entity's profitability over a period of time, for example, over the history of the transportation entity's use of the crop transportation system 150 or over a period of time such as the preceding 30 days.

The crop transportation system 150 additionally receives requests from transportation entities 160 for crop product transportation opportunities and provides one or more crop product transportation opportunities optimized based on transportation prices and logistical preferences specified by the transportation entities. A transportation entity 160 submits to the crop transportation system 150 a request for one or more transportation opportunities, the request including one or both of a transportation time period and a transportation mileage range. A transportation time period specifies a total travel period for which the transportation entity 160 is interested in providing crop transportation services. For example, the transportation time period specifies one or more of an end date and a departure date. A transportation mileage range specifies a maximum mileage range to be traveled while performing the crop product transportation. In some examples, the transportation mileage range is specified in association with a beginning location or end location, such that determinations for transportation mileage account for mileage from the beginning location to a first pick-up or to the end location from a last delivery.

The crop transportation system 150 accesses a set of crop product transactions within the online agricultural system and performs one or more optimization algorithms to determine a subset of crop product transactions. The one or more optimization algorithms maximizes a profit or revenue for the transportation entity 160 while adhering to the transportation time period, transportation mileage range, and any other specified preferences by the transportation entity. In an example wherein the transportation entity 160 specifies a transportation time period, the crop transportation system 150 selects crop product transactions wherein the estimated dates for pick-up, delivery, or total travel time does not exceed the time period. In another example, the transportation entity 160 specifies a transportation mileage range and the crop transportation system 150 selects crop product transactions where the total distance required to transport the crop products does not exceed the maximum mileage range. In some embodiments, the crop transportation system 150 selects crop product transactions wherein a pick-up or delivery location is within a threshold distance from a specified beginning location or end location, respectively. In some embodiments, the crop transportation system 150 selects a first crop product transaction and a second crop product transaction, such that the second crop product transaction is selected based on a distance between the pick-up location of the second crop product transaction and a delivery location of the first crop product transaction.

Figure 19A:
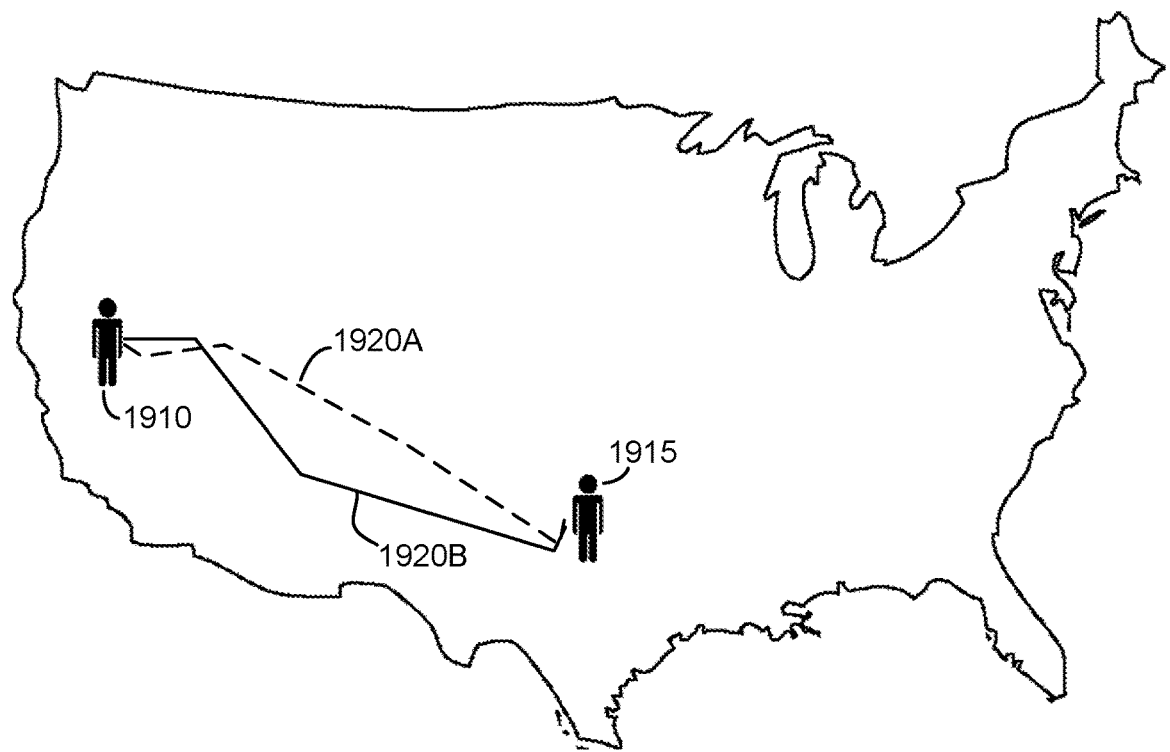
FIGS. 19A-B illustrate examples for determining a route for transporting a crop product based on map data and environmental information, according to various embodiments.
Figure 19B:
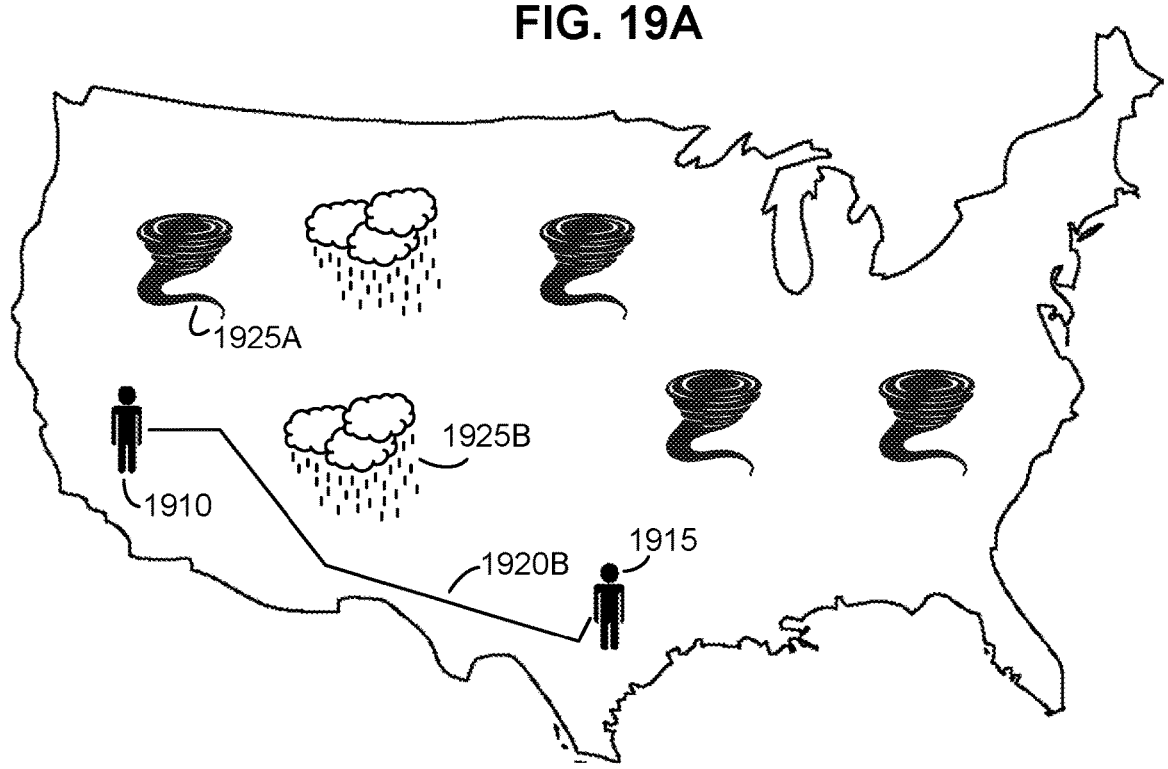

FIGS. 19A-B illustrate examples for determining a route for transporting a crop product based on map data and environmental information, according to various embodiments. FIG. 19A illustrates an example map for a geographic area including a transportation route between a crop producer at an originating location 1910 and a prospective acquiring entity at a destination location 1915. Based on the map data describing the geographic area, the crop transportation system 150 identifies a set of candidate routes 1920 between the originating location 1910 and the destination location 1915. In one embodiment, each route of the set of candidate routes 1920 is associated with a mileage within a threshold similarity to other routes of the set of candidate routes.

FIG. 19B illustrates, for the geographic area of FIG. 19A, environmental data impacting crop transportation. The crop transportation system 150 identifies one or more predicted weather conditions 1925 that may impact the transportation of the crop product from the originating location 1910 to the destination location 1915. In the example of FIG. 19B, weather conditions including high winds 1925A and rain 1925B are identified by the crop transportation system 150 as being predicted for portions of the geographic area. Responsive to determining that one or more weather conditions 1925 may impact transportation of crop product (e.g., cause degradation of one or more quality metrics for the crop product or prevent timely transportation), the crop transportation system 150 identifies a route 1920B of the set of candidate routes that is not expected to travel through the weather conditions 1925. The route 1920B is selected by the crop transportation system 150 for the crop transportation and is transmitted to the requesting transportation entity 160.

Figure 20:
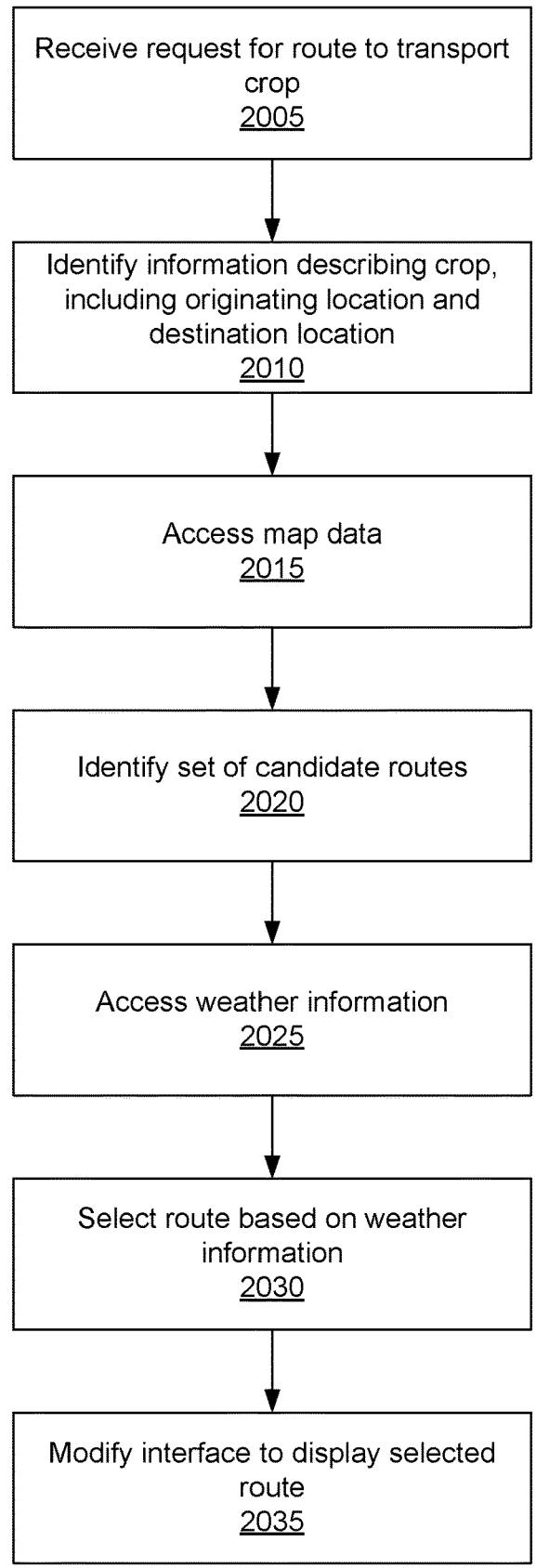
FIG. 20 illustrates an example process for determining a route for transporting a crop product, according to various embodiments.

FIG. 20 illustrates an example process for determining a route for transporting a crop product, according to various embodiments. In an embodiment, the steps of FIG. 20 are performed by the crop transportation system 150. In other embodiments, the steps may be performed by other entities. In various embodiments, the method may include different and/or additional steps, and the steps may be performed in different orders than those described in conjunction with FIG. 20.

The crop transportation system 150 receives 2005, via a transportation interface displayed by a client device of a requesting entity, a request for a route to transport a crop product. In one embodiment, the request identifies a crop product listing associated with the crop product. The crop transportation system 150 identifies 2010 information for the crop product, including a pick-up location of the crop product, a destination location of the crop product, a crop product type, and a crop product quantity.

The crop transportation system 150 accesses 2015 map data. The map data describes a geographic area including the pick-up location and the destination location and includes road information and traffic data. In an embodiment, the map data includes additional information describing the geographic area, including buildings, fueling stations, boundaries between areas, elevation, and the like. The crop transportation system 150 identifies 2020 a set of candidate routes between the pick-up location and the destination location based on the accessed map data. In some embodiments, crop transportation system 150 calculates one or more of the average change of elevation over the sets of candidate routes, the expected fuel consumption over the sets of candidate routes, and the expected to complete delivery over each of the sets of candidate routes.

The crop transportation system 150 accesses 2025 weather information describing expected weather conditions within the geographic area. The crop transportation system 150 selects 2030 a route from the set of candidate routes based on the accessed weather information. For example, the crop transportation system 150 selects a route to navigate around a storm that might impact quality of the crop product being transported. In another example, the crop transportation system 150 determines that there are no weather conditions that impact the crop product in the geographic area and selects a fastest route to complete the crop transportation. The crop transportation system 150 modifies 2035 the transportation interface of the requesting entity to display the selected route.

Figure 21:
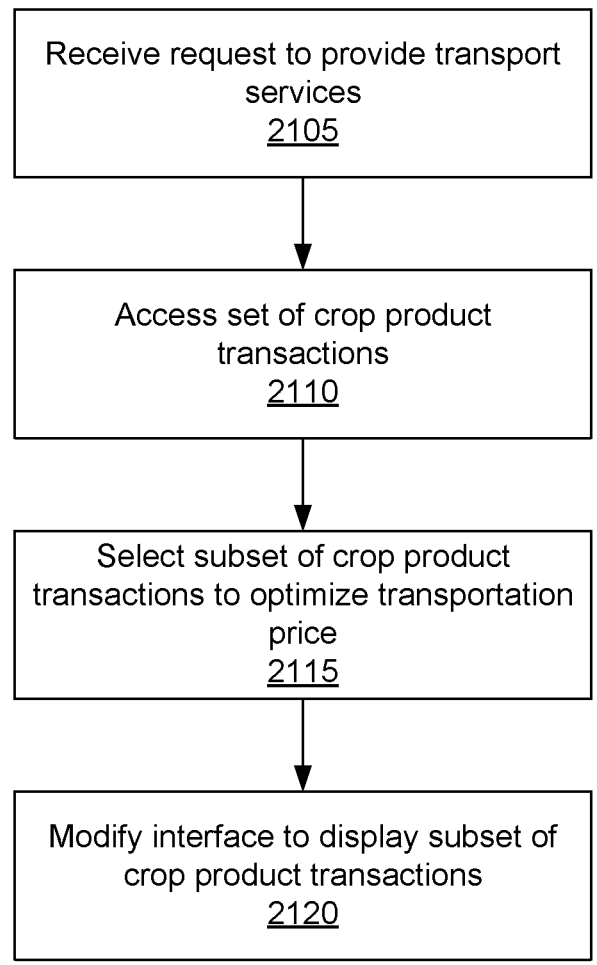
FIG. 21 illustrates an example process for identifying crop product transactions based on maximizing transportation cost, according to various embodiments.

FIG. 21 illustrates an example process for identifying crop product transactions based on maximizing transportation price, according to various embodiments. In an embodiment, the steps of FIG. 21 are performed by the crop transportation system 150. In other embodiments, the steps may be performed by other entities. In various embodiments, the method may include different and/or additional steps, and the steps may be performed in different orders than those described in conjunction with FIG. 21.

The crop transportation system 150 receives 2105, via a transportation interface displayed by a client device of a transportation entity, a request to transport one or more crop products. The request includes one or both of a transportation time period and a transportation mileage range. For example, the request identifies a period of one or more days and a mileage threshold of one hundred miles. The crop transportation system 150 accesses 2110 a set of crop product transactions. Each crop product transaction includes information describing the crop product transaction, such as a pick-up location, a destination location, a pick-up window, a delivery window, a transportation price, and a type of crop product.

Based on the accessed information, the crop transportation system 150 selects 2115 a subset of the crop product transactions that optimizes a sum of transportation prices without exceeding the transportation time period or the transportation mileage range. For example, the crop transportation system 150 identifies one or more crop product transactions from the set of crop product transactions. The crop transportation system 150 modifies 2120 the transportation interface to display the selected subset of one or more crop product transactions. For instance, the crop transportation system 150 can modify a map interface to display a set of routes between each of the pick-up and destination locations associated with the selected subset of crop product transactions. In a further example, each of the displayed set of routes is associated with an estimated profitability. The transportation entity can elect to transport crops associated with the selected subset of crop product transactions, for instance via the transportation interface.

OTHER CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure. For example, while reference is made to the listing of crop products within an online agricultural system, in practice the methods of interaction described herein can apply equally to objects, goods, commodities, or products other than crop products (e.g., non-agricultural goods or products). Likewise, the methods of transportation of crop products described here can apply equally to objects, goods, commodities, or products other than crop products.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, as noted above, the described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus or system for performing the operations herein. Such an apparatus or system may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, computer readable storage medium and may include any embodiment of a computer program product or other data described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
accessing historic and current satellite image data corresponding to one or more locations;
performing an image analysis operation on the accessed satellite image data to determine a type and capacity of production facilities for unprocessed crop products at the one or more locations, and to determine historical crop information and current crop information associated with the one or more locations;
generating a training set of data comprising the determined type and capacity of production facilities, the historic crop information, and the current crop information based on the image analysis operation performed on the satellite image data;
training, by one or more processors, a machine-learning model using the training set of data, the machine-learning model configured to predict a future price for a crop product based at least in part on current satellite image data;
receiving, from each of a plurality of crop producers, a first request to list a crop product within an online agricultural system, each first request identifying a first type of the crop product, a first quantity of the crop product, a first location of the crop product, and a first price of the crop product;
receiving, from a prospective acquiring entity, a second request to acquire a crop product within the online agricultural system, the second request identifying a second type of the crop product, a second quantity of the crop product, a second location to which the crop product is to be delivered, and a second price of the crop product;
applying, for each first request, the machine-learning model to crop information comprising satellite image data for one or more regions including the first location or the second location to predict a future price for processing of the first crop product into the second type of the crop product;
and
modifying an interface corresponding to the second type of the crop product displayed by a client device of the prospective acquiring entity to include the future prices corresponding to a first crop product of one or more first requests.

2. A method comprising:
accessing historic and current satellite image data corresponding to one or more locations;
performing an image analysis operation on the accessed satellite image data to determine a type and capacity of production facilities for unprocessed crop products at the one or more locations, and to determine historical crop information and current crop information associated with the one or more locations;

generating a training set of data comprising the determined type and capacity of production facilities, the historic crop information, and the current crop information based on the image analysis operation performed on the satellite image data;

training, by one or more processors, a machine-learning model using the training set of data, the machine-learning model configured to predict a future price for a crop product based at least in part on current satellite image data;

receiving, from a crop producer, a first request to list a crop product within an online agricultural system, the first request identifying a first type of the crop product, a first quantity of the crop product, a first location of the crop product, and a first price of the crop product;

receiving, from each of a plurality of prospective acquiring entities, a second request to acquire a crop product within the online agricultural system, each second request identifying a second type of the crop product, a second quantity of the crop product, a second location to which the crop product is to be delivered, and a second price of the crop product;

applying, for each second request, the machine-learning model to crop information comprising satellite image data for one or more regions including the first location or the second location to predict a future price for processing of the first crop product into the second type of the crop product;

and modifying an interface corresponding to the first type of the crop product displayed by a client device of the crop producer to include the future prices corresponding to the first crop product.

3. The method of claim 1 wherein the second request identifies a drop-off window, and wherein a future price is further computed based on a crop product identified by a first request being dropped off at the second location identified by the second request during the drop-off window.

4. The method of claim 1 or 2, wherein modifying the interface to include the future prices comprises including a threshold number of the future prices.

5. The method of claim 1, wherein the second type of crop product identified by the second request comprises processed oilseed and wherein the first type of crop product identified by the first request comprises unprocessed oilseed.

6. The method of claim 1, wherein the second type of crop product identified by the second request comprises a type of food-grade oil and wherein the first type of crop product identified by the first request comprises an unprocessed crop capable of being processed into the type of food-grade oil.

7. The method of claim 1, wherein the second type of crop product identified by the second request comprises an oil with a specified fatty acid profile and wherein the first type of crop product identified by the first request comprises an unprocessed crop capable of being processed into an oil with the specified fatty acid profile.

8. The method of claim 1, wherein the second type of crop product identified by the second request comprises a non-GMO crop product and wherein the first type of crop product identified by the first request comprises an organic crop product.

9. The method of claim 1, further comprising: each time a future price is updated, automatically moving offers within the listing of the set of offers to ordered positions within the interface based on the price of each offer.

10. The method of claim 1, wherein the satellite image data includes one or more measurements of land, water, or atmospheric properties using reflected or emitted electromagnetic radiation.

11. The method of claim 1, wherein the future prices displayed in the modified interface are equal to or less than the second price of the second request.

12. The method of claim 1, further comprising monitoring satellite image data corresponding to the second location and or one or more first locations and, when a change in satellite image data is received, applying the machine-learning model to crop information comprising the changed satellite image data to generate an updated future price and updating the interface of the client device of a prospective acquiring entity to include the updated future price.

13. The method of claim 1, wherein the second type of crop product is not the first type of crop product.

14. The method of claim 1, wherein multiple types of first crop products are presented within the modified interface displayed by the client device of the prospective acquiring entity.

15. The method of claim 1, wherein training the machine-learning model comprises training one or more of: a neural network, a k-means clustering machine-learning model, a reinforcement learning model, a linear support vector machine, a logistic regression model, and a decision tree model.

16. The method of claim 1 or 2, wherein a future price is computed based further on one or more of:
- a first price identified by a first request;
- a second price identified by a second request;
- a distance between the first location identified by the first request and the second location identified by the second request;
- a transportation cost to transport the crop product from the first location identified by the first request to the second location identified by the second request;
- the first quantity identified by the first request;
- the second quantity identified by the second request; and
- a price for converting or processing the first type of the crop product into the second type of the crop product.

17. The method of claim 2, wherein a second request identifies a drop-off window, and wherein a future price is further computed based on a crop product identified by a first request being dropped off at the second location identified by the second request during the drop-off window.

18. The method of claim 2, wherein the second type of crop product identified by the second request comprises processed oilseed and wherein the first type of crop product identified by the first request comprises unprocessed oilseed.

19. The method of claim 2, wherein the second type of crop product identified by a second request comprises a type of food-grade oil and wherein the first type of crop product identified by the first request comprises an unprocessed crop capable of being processed into the type of food-grade oil.

20. The method of claim 2, wherein the second type of crop product identified by a second request comprises an oil with a specified fatty acid profile and wherein the first type of crop product identified by the first request comprises an unprocessed crop capable of being processed into an oil with the specified fatty acid profile.

21. The method of claim 2, wherein the second type of crop product identified by a second request comprises a non-GMO crop product and wherein the first type of crop product identified by the first request comprises an organic crop product.

22. A system comprising:
a non-transitory computer-readable storage medium storing executable instructions that, when executed, cause steps to be performed comprising:
- accessing historic and current satellite image data corresponding to one or more locations;
- performing an image analysis operation on the accessed satellite image data to determine a type and capacity of production facilities for unprocessed crop products at the one or more locations, and to determine historical crop information and current crop information associated with the one or more locations;
- generating a training set of data comprising the determined type and capacity of production facilities, the historic crop information, and the current crop information based on the image analysis operation performed on the satellite image data;
- training a machine-learning model using the training set of data, the machine-learning model configured to predict a future price for a crop product based at least in part on current satellite image data;
- receiving, from each of a plurality of crop producers, a corresponding first request to list a crop product within an online agricultural system, each first request identifying a first type of the crop product, a first quantity of the crop product, a first location of the crop product, and a first price of the crop product;
- receiving, from a prospective acquiring entity, a second request to acquire a crop product within the online agricultural system, the second request identifying a second type of the crop product, a second quantity of the crop product, a second location to which the crop product is to be delivered, and a second price of the crop product;
- applying, for each first request, the machine-learning model to crop information comprising satellite image data for one or more regions including the first location or the second location to predict a future price for processing of each first crop product into the second type of the crop product;
and
- causing modification of an interface corresponding to the second type of the crop product displayed by a client device of the prospective acquiring entity to include the future prices corresponding to a first crop product of one or more first requests; and a hardware processor configured to execute the executable instructions.

23. A system for managing real-time interactions in an online agricultural system, comprising:
a non-transitory computer-readable storage medium storing executable instructions that, when executed, cause steps to be performed comprising:
- accessing historic and current satellite image data corresponding to one or more locations;
- performing an image analysis operation on the accessed satellite image data to determine a type and capacity of production facilities for unprocessed crop products at the one or more locations, and to determine historical crop information and current crop information associated with the one or more locations;
- generating a training set of data comprising the determined type and capacity or production facilities, the historic crop information, and the current crop information based on the image analysis operation performed on the satellite image data;
- training a machine-learning model using the training set of data, the machine-learning model configured to predict a future price for a crop product based at least in part on current satellite image data;
- receiving, from a crop producer, a first request to list a crop product within an online agricultural system, the first request identifying a first type of the crop product, a first quantity of the crop product, a first location of the crop product, and a first price of the crop product;
- receiving, from each of a plurality of prospective acquiring entities, a second request to acquire a crop product within the online agricultural system, each second request identifying a second type of the crop product, a second quantity of the crop product, a second location to which the crop product is to be delivered, and a second price of the crop product;
- applying, for each second request, the machine-learning model to crop information comprising satellite image data for one or more regions including the first location or the second location to predict a future price for processing of the first crop product into the second type of the crop product;
and
- causing modification of an interface corresponding to the first type of the crop product displayed by a client device of the crop producer to include the future prices corresponding to the first crop product; and a hardware processor configured to execute the executable instructions.

* * * * *

UNITED STATES PATENT AND TRADEMARK OFFICE
CERTIFICATE OF CORRECTION

| | |
|---|---|
| PATENT NO. | : 11,710,196 B2 |
| APPLICATION NO. | : 16/393329 |
| DATED | : July 25, 2023 |
| INVENTOR(S) | : Perry et al. |

It is certified that error appears in the above-identified patent and that said Letters Patent is hereby corrected as shown below:

On the Title Page

Item (56), in Column 2, under "Other Publications", Line 3, delete "2009, 2009" and insert --2009,--, therefor.

Signed and Sealed this
Seventeenth Day of October, 2023

Katherine Kelly Vidal
*Director of the United States Patent and Trademark Office*